US010173292B2

(12) United States Patent
Fullerton et al.

(10) Patent No.: US 10,173,292 B2
(45) Date of Patent: Jan. 8, 2019

(54) METHOD FOR ASSEMBLING A MAGNETIC ATTACHMENT MECHANISM

(71) Applicant: Correlated Magnetics Research, LLC, Huntsville, AL (US)

(72) Inventors: Larry W. Fullerton, New Hope, AL (US); Mark D. Roberts, Huntsville, AL (US)

(73) Assignee: Correlated Magnetics Research, LLC, Huntsville, AL (US)

( * ) Notice: Subject to any disclaimer, the term of this patent is extended or adjusted under 35 U.S.C. 154(b) by 234 days.

(21) Appl. No.: 15/352,135

(22) Filed: Nov. 15, 2016

(65) Prior Publication Data

US 2017/0120401 A1    May 4, 2017

Related U.S. Application Data

(63) Continuation of application No. 15/188,760, filed on Jun. 21, 2016, now abandoned, which is a continuation of application No. 14/472,945, filed on Aug. 29, 2014, now Pat. No. 9,371,923, and a continuation-in-part of application No. 14/198,226, filed on Mar. 5, 2014, and a continuation-in-part of
(Continued)

(51) Int. Cl.
*H01F 7/02* (2006.01)
*B23P 15/00* (2006.01)
*E04F 13/08* (2006.01)
*F16K 31/08* (2006.01)
*F16K 11/078* (2006.01)

(52) U.S. Cl.
CPC ........ *B23P 15/001* (2013.01); *E04F 13/0883* (2013.01); *F16K 11/0782* (2013.01); *F16K 31/088* (2013.01); *H01F 7/021* (2013.01)

(58) Field of Classification Search
CPC ...... G09F 7/04; G09F 2007/1852; H01F 7/02; E05B 47/0038; E05B 47/0042; E05B 47/0044; E05B 47/0045; A47G 1/17
See application file for complete search history.

(56) References Cited

U.S. PATENT DOCUMENTS 494,146 A * 3/1893 Kintner ............... E05B 47/0044
70/276
2,722,617 A * 11/1955 Cluwen ................ H01F 7/0242
310/103

(Continued)

Primary Examiner — Jason L Vaughan
(74) Attorney, Agent, or Firm — Vector IP Law Group; Robert S. Babayi

(57) ABSTRACT

A magnetic attachment system for attaching a first object to a second object. A first magnet structure is attached to the first object and a second magnet structure is attached to the second object. The first and second objects are attached by virtue of the magnetic attraction between the first magnet structure and second magnet structure. The magnet structures comprise magnetic elements arranged in accordance with patterns based on various codes. In one embodiment, the code has certain autocorrelation properties. In further embodiments the specific type of code is specified. In a further embodiment, an attachment and a release configuration may be achieved by a simple movement of the magnet structures. In a further embodiment, the magnetic field structure may comprise multiple structures based on multiple codes.

20 Claims, 26 Drawing Sheets

Related U.S. Application Data application No. 14/103,760, filed on Dec. 11, 2013, now Pat. No. 9,202,616, which is a continuation-in-part of application No. 13/779,611, filed on Feb. 27, 2013, now Pat. No. 9,202,615, and a continuation-in-part of application No. 14/066,426, filed on Oct. 29, 2013, now Pat. No. 8,957,751, which is a continuation of application No. 13/374,074, filed on Dec. 9, 2011, now Pat. No. 8,576,036, and a continuation-in-part of application No. 14/086,924, filed on Nov. 21, 2013, now Pat. No. 8,779,879, which is a continuation-in-part of application No. 14/035,818, filed on Sep. 24, 2013, now Pat. No. 8,872,608, which is a continuation-in-part of application No. 13/959,649, filed on Aug. 5, 2013, now Pat. No. 8,692,637, which is a continuation-in-part of application No. 13/759,695, filed on Feb. 5, 2013, now Pat. No. 8,502,630, which is a continuation of application No. 13/481,554, filed on May 25, 2012, now Pat. No. 8,368,495, which is a continuation-in-part of application No. 13/351,203, filed on Jan. 16, 2012, now Pat. No. 8,314,671, and a continuation of application No. 13/157,975, filed on Jun. 10, 2011, now Pat. No. 8,098,122, which is a continuation of application No. 12/952,391, filed on Nov. 23, 2010, now Pat. No. 7,961,069, which is a continuation of application No. 12/478,911, filed on Jun. 5, 2009, now Pat. No. 7,843,295, and a continuation of application No. 12/478,950, filed on Jun. 5, 2009, now Pat. No. 7,843,296, and a continuation of application No. 12/478,969, filed on Jun. 5, 2009, now Pat. No. 7,843,297, and a continuation of application No. 12/479,013, filed on Jun. 5, 2009, now Pat. No. 7,839,247, and a continuation-in-part of application No. 12/476,952, filed on Jun. 2, 2009, now Pat. No. 8,179,219, and a continuation-in-part of application No. 12/476,952, filed on Jun. 2, 2009, now Pat. No. 8,179,219, and a continuation-in-part of application No. 12/476,952, filed on Jun. 2, 2009, now Pat. No. 8,179,219, and a continuation-in-part of application No. 12/476,952, filed on Jun. 2, 2009, now Pat. No. 8,179,219, which is a continuation-in-part of application No. 12/322,561, filed on Feb. 4, 2009, now Pat. No. 8,115,581, which is a continuation-in-part of application No. 12/358,423, filed on Jan. 23, 2009, now Pat. No. 7,868,721, and a continuation-in-part of application No. 13/918,921, filed on Jun. 15, 2013, now Pat. No. 8,841,981, which is a continuation of application No. 13/629,879, filed on Sep. 28, 2012, now Pat. No. 8,514,046, which is a continuation of application No. 13/426,909, filed on Mar. 22, 2012, now Pat. No. 8,279,032, which is a continuation-in-part of application No. 13/179,759, filed on Jul. 11, 2011, now Pat. No. 8,174,347, and a continuation-in-part of application No. 14/045,756, filed on Oct. 3, 2013, now Pat. No. 8,810,348, and a continuation-in-part of application No. 13/240,335, filed on Sep. 22, 2011, now Pat. No. 8,648,681, which is a continuation-in-part of application No. 12/476,952, filed on Jun. 2, 2009, now Pat. No. 8,179,219, and a continuation-in-part of application No. 12/895,589, filed on Sep. 30, 2010, now Pat. No. 8,760,250, and a continuation-in-part of application No. 12/476,952, filed on Jun. 2, 2009, now Pat. No. 8,179,219, and a continuation-in-part of application No. 13/246,584, filed on Sep. 27, 2011, now Pat. No. 8,760,251.

(60) Provisional application No. 61/871,689, filed on Aug. 29, 2013, provisional application No. 61/794,427, filed on Mar. 15, 2013, provisional application No. 61/798,233, filed on Mar. 15, 2013, provisional application No. 61/798,453, filed on Mar. 15, 2013, provisional application No. 61/799,507, filed on Mar. 15, 2013, provisional application No. 61/800,377, filed on Mar. 15, 2013, provisional application No. 61/735,460, filed on Dec. 10, 2012, provisional application No. 61/640,979, filed on May 1, 2012, provisional application No. 61/604,376, filed on Feb. 28, 2012, provisional application No. 61/459,994, filed on Dec. 22, 2012, provisional application No. 61/796,863, filed on Nov. 21, 2012, provisional application No. 61/744,342, filed on Sep. 24, 2012, provisional application No. 61/519,664, filed on May 25, 2011, provisional application No. 61/465,810, filed on Mar. 24, 2011, provisional application No. 61/744,864, filed on Oct. 4, 2012, provisional application No. 61/403,814, filed on Sep. 22, 2010, provisional application No. 61/462,715, filed on Feb. 7, 2011, provisional application No. 61/277,214, filed on Sep. 22, 2009, provisional application No. 61/277,900, filed on Sep. 30, 2009, provisional application No. 61/278,767, filed on Oct. 9, 2009, provisional application No. 61/279,094, filed on Oct. 16, 2009, provisional application No. 61/281,160, filed on Nov. 13, 2009, provisional application No. 61/283,780, filed on Dec. 9, 2009, provisional application No. 61/284,385, filed on Dec. 17, 2009, provisional application No. 61/342,988, filed on Apr. 22, 2010, provisional application No. 61/404,147, filed on Sep. 27, 2010.

(56) References Cited

U.S. PATENT DOCUMENTS

| | | | | | |
|---|---|---|---|---|---|
| 3,288,511 | A | * | 11/1966 | Tavano | E05C 19/16 16/87 R |
| 3,468,576 | A | * | 9/1969 | Beyer | E05C 19/16 220/230 |
| 3,665,740 | A | * | 5/1972 | Taniyama | E05B 47/0044 70/276 |
| 3,681,727 | A | * | 8/1972 | Hallmann | E05B 47/004 335/253 |
| 3,790,197 | A | * | 2/1974 | Parker | E05C 19/16 292/251.5 |
| 3,813,624 | A | * | 5/1974 | Deitch | E05B 47/0038 335/206 |
| 4,099,755 | A | * | 7/1978 | Anderson | E05C 19/16 292/251.5 |
| 4,862,128 | A | * | 8/1989 | Leupold | G01R 33/383 335/306 |
| 4,893,103 | A | * | 1/1990 | Leupold | H01F 6/00 315/5.35 |
| 4,994,778 | A | * | 2/1991 | Leupold | H05H 7/04 315/5.28 |
| 5,174,417 | A | * | 12/1992 | Pilsbury | B66B 13/12 187/330 |
| 5,349,258 | A | * | 9/1994 | Leupold | H02K 1/17 310/154.25 |
| 5,367,891 | A | * | 11/1994 | Furuyama | A44C 5/2057 24/303 |
| 5,383,049 | A | * | 1/1995 | Carr | H05G 2/00 359/283 |
| 5,572,887 | A | * | 11/1996 | Geswelli | A44C 5/2071 24/303 |

(56) References Cited

U.S. PATENT DOCUMENTS

| | | | | |
|---|---|---|---|---|
| 5,631,093 A * | 5/1997 | Perry | C21D 1/04 | 148/101 |
| 5,631,618 A * | 5/1997 | Trumper | G03F 7/70758 | 104/286 |
| 5,633,555 A * | 5/1997 | Ackermann | F04D 13/027 | 310/103 |
| 5,782,512 A * | 7/1998 | Cargnoni | E05C 19/16 | 292/251.5 |
| 6,441,514 B1 * | 8/2002 | Markle | G03F 7/70758 | 310/12.06 |
| 6,594,871 B2 * | 7/2003 | Hoffman | A44B 5/00 | 24/102 R |
| 6,707,360 B2 * | 3/2004 | Underwood | B23Q 3/1546 | 269/8 |
| 6,841,910 B2 * | 1/2005 | Gery | H02K 49/106 | 310/103 |
| 7,224,252 B2 * | 5/2007 | Meadow, Jr. | A63B 21/00192 | 104/281 |
| 7,362,018 B1 * | 4/2008 | Kulogo | H02K 21/222 | 310/153 |
| 7,583,500 B2 * | 9/2009 | Ligtenberg | G06F 1/1616 | 361/147 |
| 7,746,205 B2 * | 6/2010 | Fullerton | H01F 7/0284 | 335/306 |
| 7,750,774 B2 * | 7/2010 | Fullerton | F02P 3/02 | 335/285 |
| 7,750,781 B2 * | 7/2010 | Fullerton | H01F 7/0284 | 335/285 |
| 7,755,462 B2 * | 7/2010 | Fullerton | H01F 7/0242 | 335/285 |
| 7,775,567 B2 * | 8/2010 | Ligtenberg | E05C 19/16 | 292/251.5 |
| 7,808,349 B2 * | 10/2010 | Fullerton | H01F 7/0284 | 335/306 |
| 7,812,698 B2 * | 10/2010 | Fullerton | A41D 13/0002 | 2/2.11 |
| 7,817,002 B2 * | 10/2010 | Fullerton | A45F 5/02 | 2/312 |
| 7,817,004 B2 * | 10/2010 | Fullerton | A61C 8/0081 | 335/285 |
| 7,817,005 B2 * | 10/2010 | Fullerton | B25H 3/021 | 220/230 |
| 7,817,006 B2 * | 10/2010 | Fullerton | F41G 11/001 | 335/285 |
| 7,821,367 B2 * | 10/2010 | Fullerton | H01F 7/0215 | 2/102 |
| 7,823,224 B2 * | 11/2010 | Fullerton | A41D 13/1161 | 2/410 |
| 7,823,300 B2 * | 11/2010 | Fullerton | A43B 1/0054 | 280/612 |
| 7,834,729 B2 * | 11/2010 | Fullerton | G01D 1/00 | 24/303 |
| 7,839,247 B2 * | 11/2010 | Fullerton | H01F 7/0284 | 24/303 |
| 7,843,295 B2 * | 11/2010 | Fullerton | G09F 7/04 | 24/303 |
| 7,843,296 B2 * | 11/2010 | Fullerton | G09F 7/04 | 24/303 |
| 7,843,297 B2 * | 11/2010 | Fullerton | G09F 3/00 | 24/303 |
| 7,855,624 B2 * | 12/2010 | Fullerton | H01F 7/0284 | 335/306 |
| 7,889,036 B2 * | 2/2011 | Fiedler | H01F 7/0263 | 292/251.5 |
| 7,893,803 B2 * | 2/2011 | Fullerton | B63C 11/22 | 335/285 |
| 7,956,711 B2 * | 6/2011 | Fullerton | B25G 3/00 | 15/144.3 |
| 7,956,712 B2 * | 6/2011 | Fullerton | H01F 7/0242 | 24/303 |
| 7,963,818 B2 * | 6/2011 | Fullerton | A63H 33/046 | 335/285 |
| 8,174,347 B2 * | 5/2012 | Fullerton | E05C 19/16 | 335/285 |
| 8,179,219 B2 * | 5/2012 | Fullerton | G01D 18/00 | 335/284 |
| 8,242,868 B2 * | 8/2012 | Lauder | G06F 1/1647 | 24/303 |
| 8,279,032 B1 * | 10/2012 | Fullerton | E05C 19/16 | 335/285 |
| 8,344,836 B2 * | 1/2013 | Lauder | H01F 7/04 | 335/219 |
| 8,368,495 B2 * | 2/2013 | Fullerton | B42F 1/00 | 335/285 |
| 8,373,527 B2 * | 2/2013 | Fullerton | H01F 7/021 | 335/285 |
| 8,395,467 B2 * | 3/2013 | Fullerton | G01D 18/00 | 335/285 |
| 8,430,434 B2 * | 4/2013 | Fiedler | A44B 11/258 | 292/251.5 |
| 8,484,809 B2 * | 7/2013 | Fiedler | A45C 13/1069 | 220/230 |
| 8,495,803 B2 * | 7/2013 | Fiedler | A45C 13/1069 | 220/230 |
| 8,638,016 B2 * | 1/2014 | Fullerton | H02K 21/24 | 310/156.35 |
| 8,648,681 B2 * | 2/2014 | Roberts | G01D 18/00 | 335/284 |
| 8,702,316 B2 * | 4/2014 | DiFonzo | G02B 6/3817 | 385/53 |
| 8,704,626 B2 * | 4/2014 | Fullerton | H01F 7/0247 | 335/285 |
| 8,760,251 B2 * | 6/2014 | Roberts | H01F 7/0284 | 335/207 |
| 8,774,577 B2 * | 7/2014 | Benjamin | G02B 6/3886 | 385/15 |
| 8,781,273 B2 * | 7/2014 | Benjamin | G02B 6/3886 | 385/15 |
| 8,850,670 B2 * | 10/2014 | Fiedler | A44B 11/2592 | 24/303 |
| 8,953,310 B2 * | 2/2015 | Smith | G06F 1/16 | 361/679.29 |
| 8,978,213 B2 * | 3/2015 | Hayton | A44B 11/06 | 24/303 |
| 9,105,380 B2 * | 8/2015 | Roberts | B42F 1/00 | |
| 9,219,403 B2 * | 12/2015 | Evans | H02K 49/108 | |
| 9,329,630 B2 * | 5/2016 | Lauder | H01F 7/04 | |
| 9,404,776 B2 * | 8/2016 | Fullerton | H01F 7/021 | |
| 9,711,268 B2 * | 7/2017 | Fullerton | E05C 19/16 | |
| 9,729,685 B2 * | 8/2017 | Ive | G06F 1/1677 | |
| 9,750,309 B2 * | 9/2017 | Xanthos | A43B 13/223 | |
| 9,949,532 B2 * | 4/2018 | Xanthos | A43C 11/008 | |
| 9,997,286 B2 * | 6/2018 | Herman | H01F 7/0205 | |
| 2002/0116794 A1 * | 8/2002 | Hoffman | A44B 5/00 | 24/303 |
| 2004/0003487 A1 * | 1/2004 | Reiter | A41F 1/002 | 24/303 |
| 2004/0244419 A1 * | 12/2004 | Suzuki | A44C 5/2076 | 63/3.1 |
| 2005/0023420 A1 * | 2/2005 | Sadeh | B42F 1/006 | 248/206.5 |
| 2005/0023841 A1 * | 2/2005 | Chen | E05C 19/16 | 292/251.5 |
| 2005/0097711 A1 * | 5/2005 | Halstead | A45C 1/06 | 24/303 |
| 2007/0094902 A1 * | 5/2007 | Petrocy | G09F 7/04 | 40/551 |
| 2007/0138806 A1 * | 6/2007 | Ligtenberg | E05C 19/16 | 292/251.5 |
| 2007/0194187 A1 * | 8/2007 | Amron | B42F 1/04 | 248/206.5 |
| 2008/0047111 A1 * | 2/2008 | Garber | A44C 5/2061 | 24/303 |
| 2008/0282517 A1 * | 11/2008 | Claro | A41F 1/002 | 24/303 |
| 2009/0250575 A1 * | 10/2009 | Fullerton | G09F 7/04 | 248/206.5 |

(56) References Cited

U.S. PATENT DOCUMENTS

| | | | |
|---|---|---|---|
| 2009/0250576 A1* | 10/2009 | Fullerton | G09F 3/00 248/206.5 |
| 2009/0251238 A1* | 10/2009 | Fullerton | H01F 7/0284 335/205 |
| 2009/0251256 A1* | 10/2009 | Fullerton | H01F 7/0284 335/296 |
| 2009/0289090 A1* | 11/2009 | Fullerton | A45F 5/02 224/183 |
| 2009/0289749 A1* | 11/2009 | Fullerton | F41G 11/001 335/306 |
| 2009/0292371 A1* | 11/2009 | Fullerton | A61C 8/0081 623/57 |
| 2011/0279206 A1* | 11/2011 | Fullerton | E05C 19/16 335/306 |
| 2012/0007705 A1* | 1/2012 | Fullerton | E05C 19/16 335/306 |
| 2013/0186473 A1* | 7/2013 | Mankame | F15B 21/065 137/13 |
| 2014/0047742 A1* | 2/2014 | Schloss | G09F 13/18 40/546 |
| 2014/0152252 A1* | 6/2014 | Wood | H02J 50/10 320/108 |

* cited by examiner

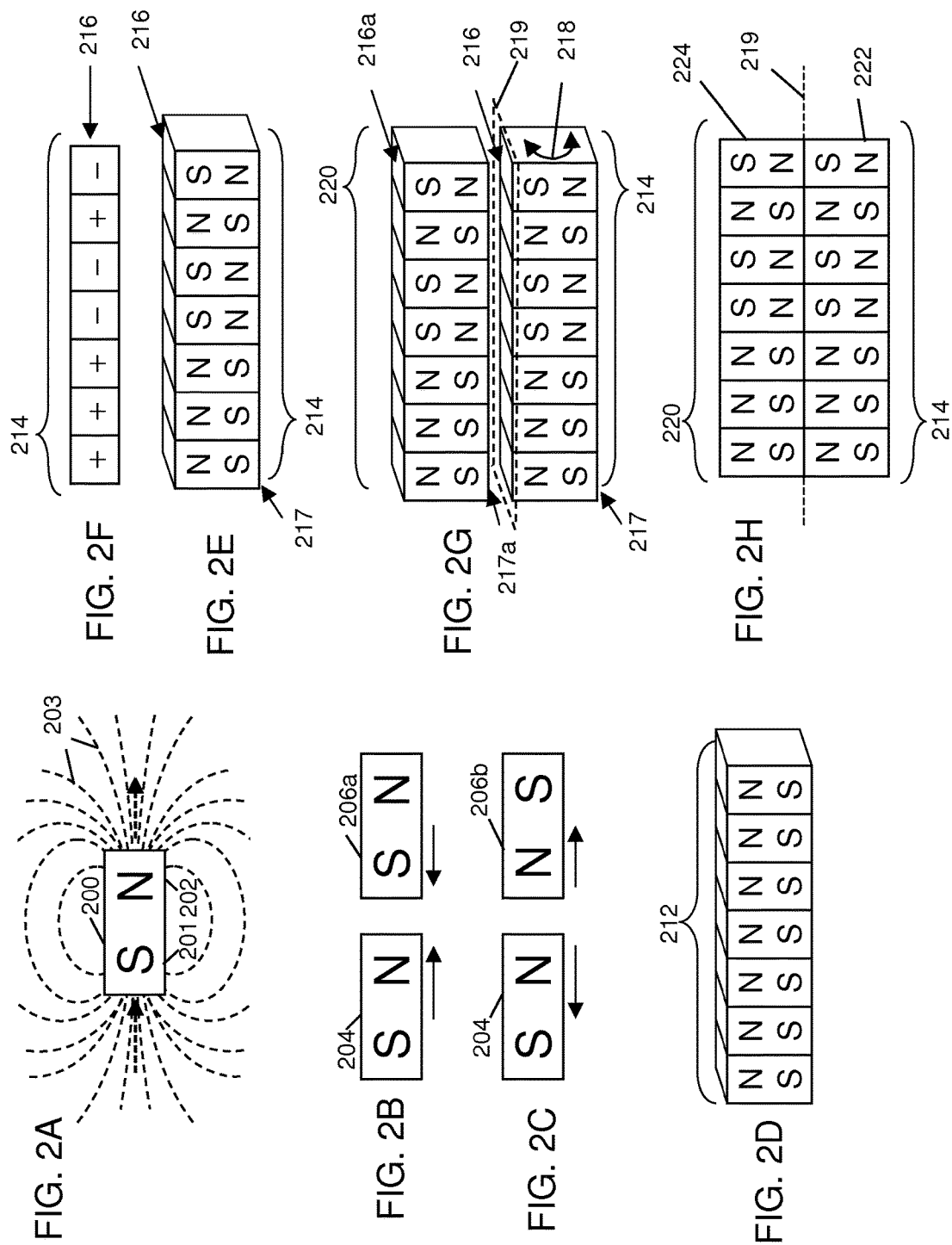

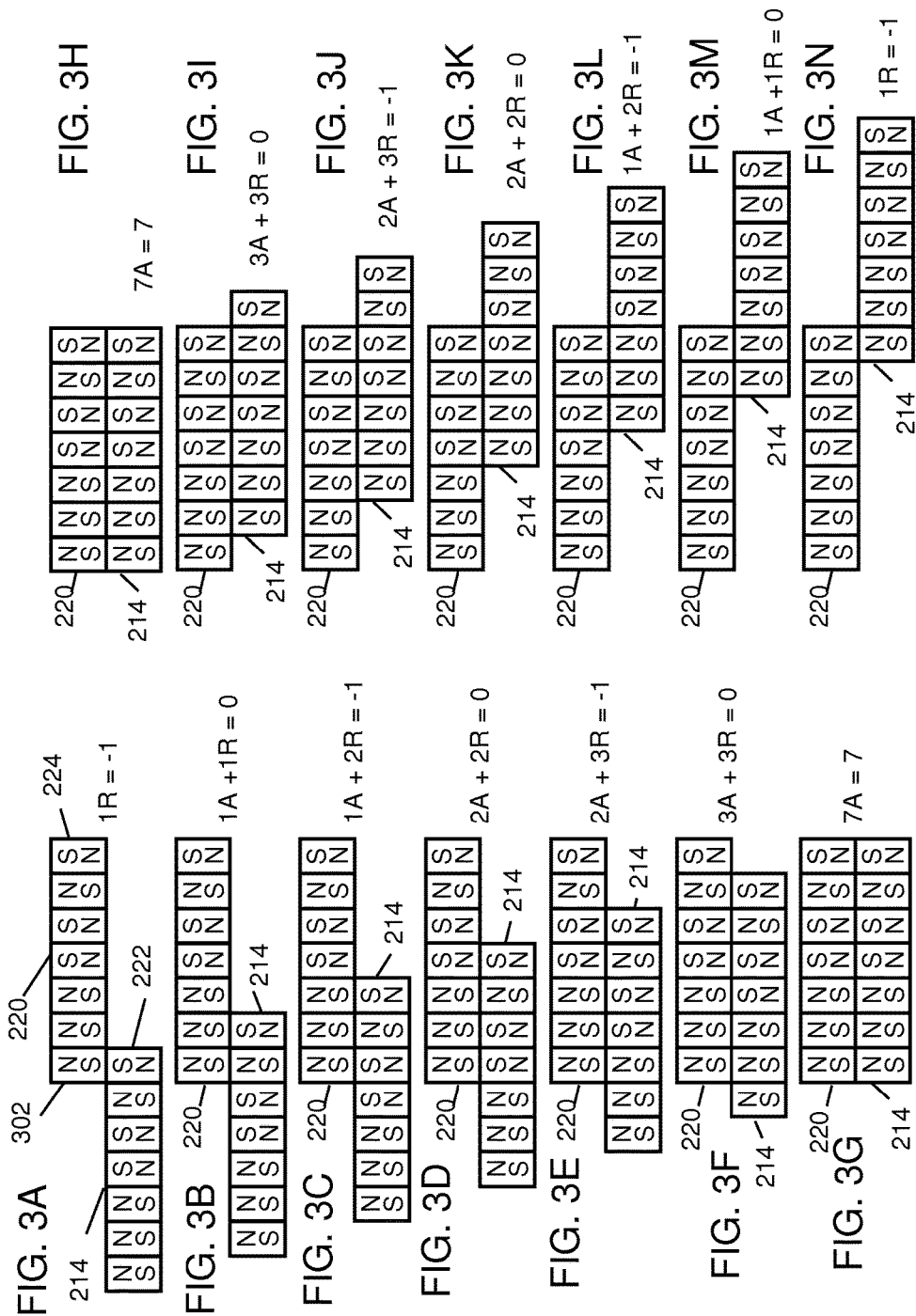

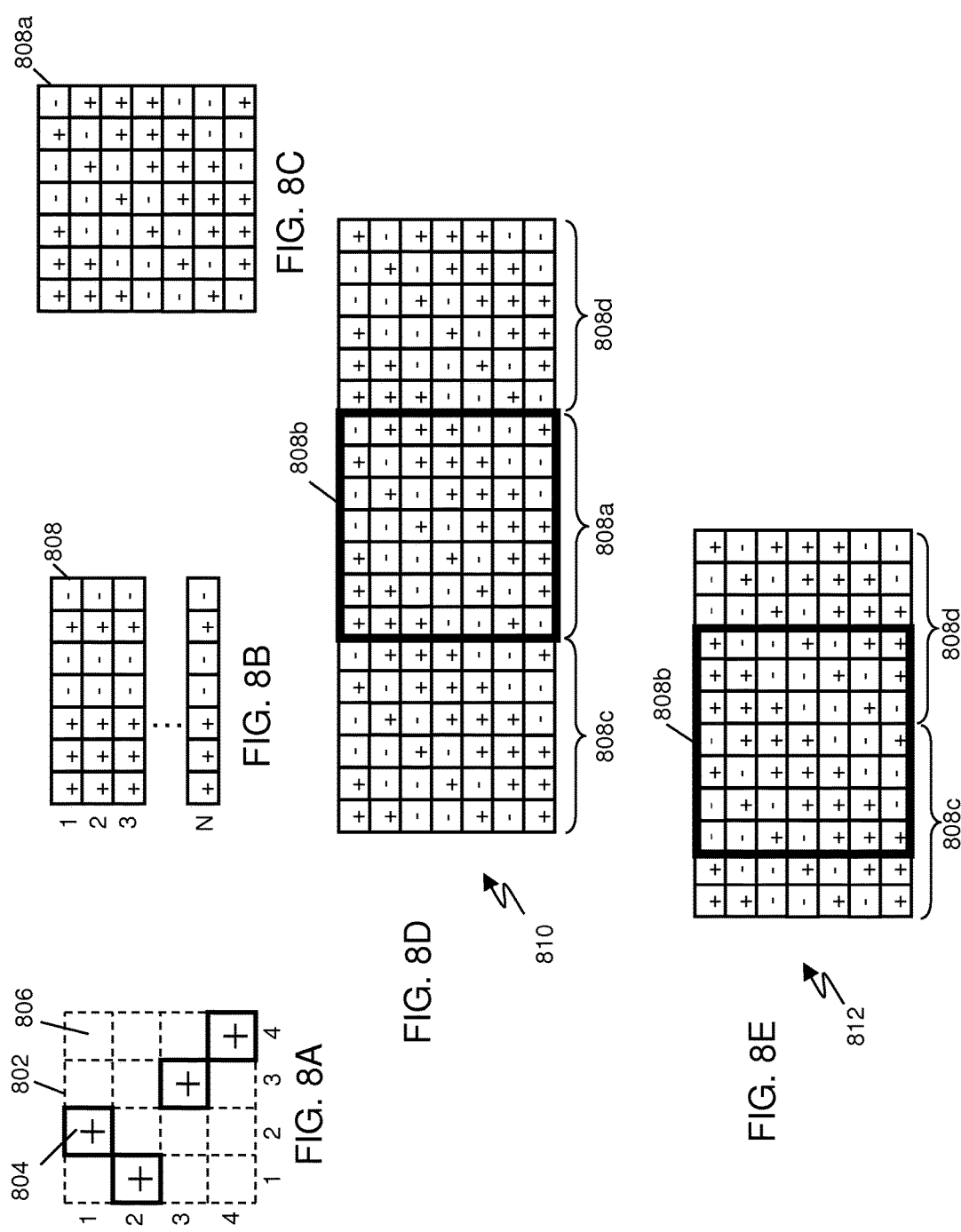

FIG. 9A FIG. 9B FIG. 9C FIG. 9D FIG. 9E FIG. 9F FIG. 9G

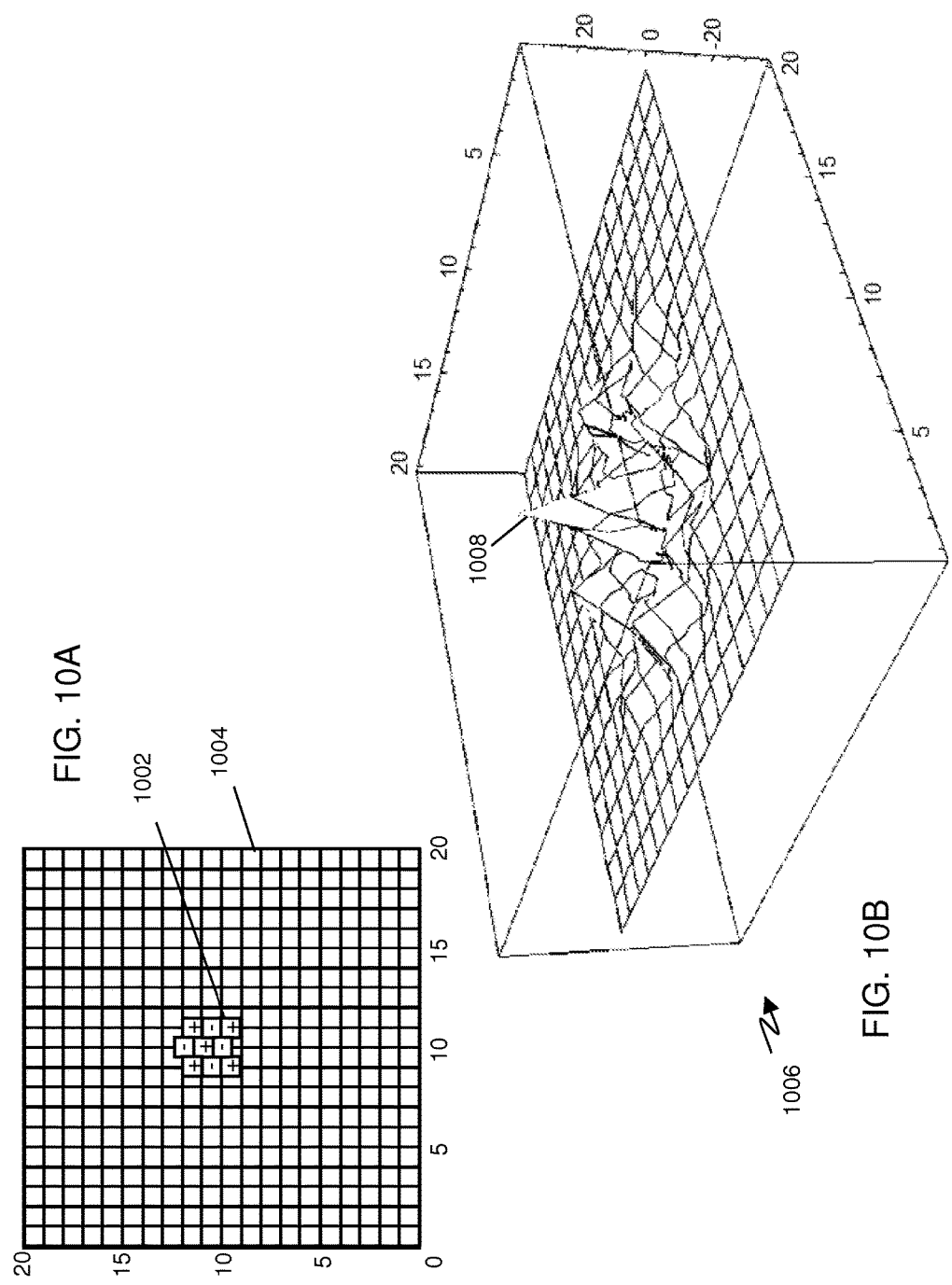

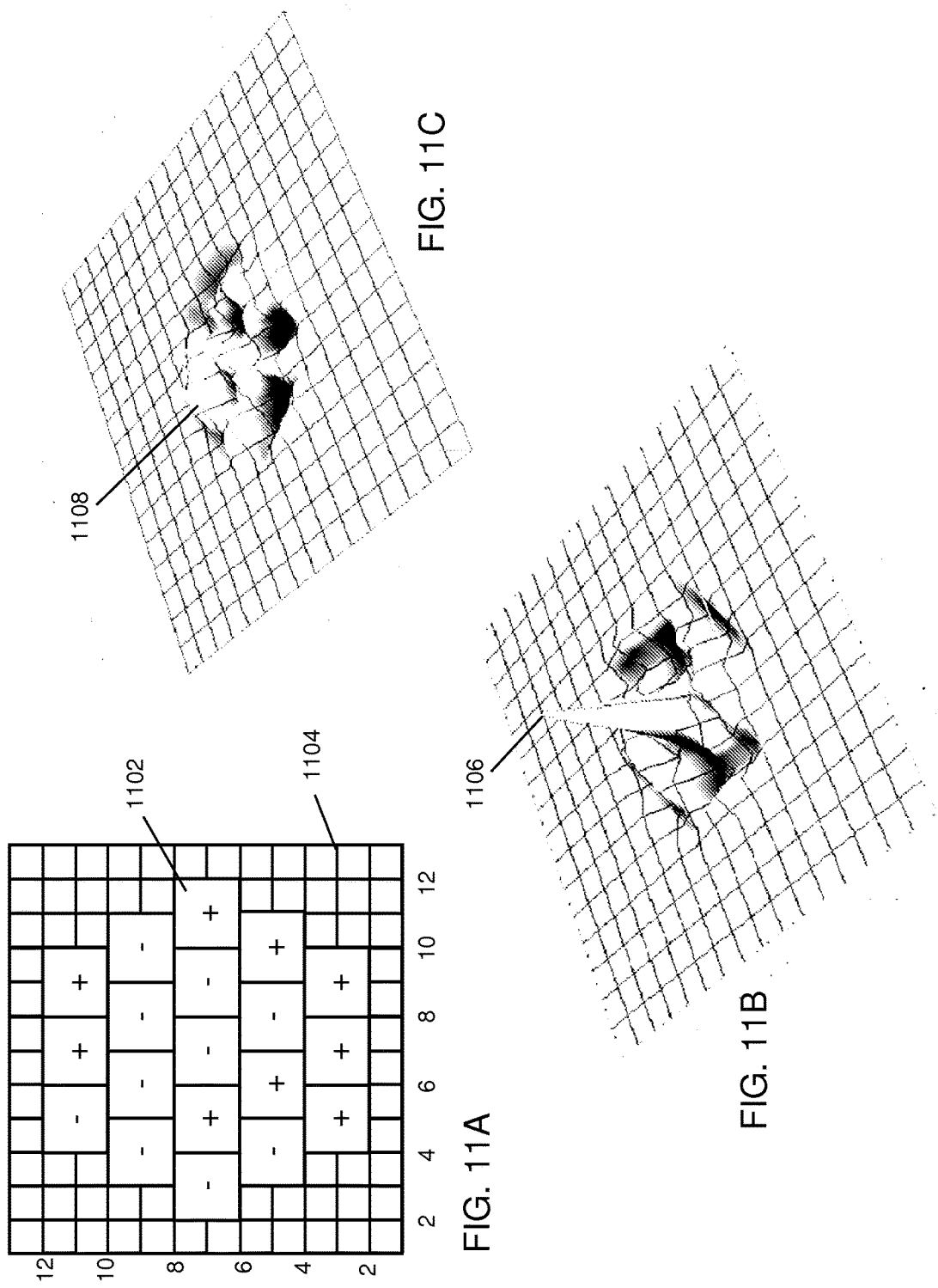

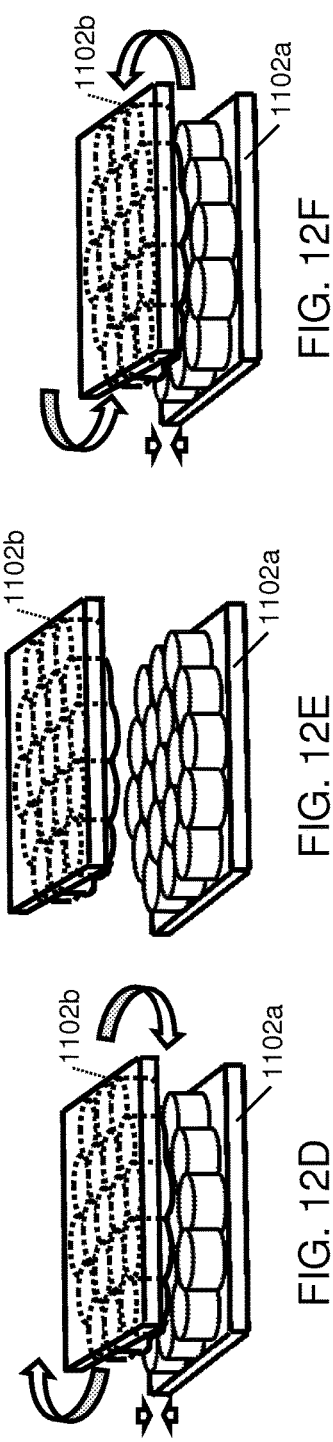

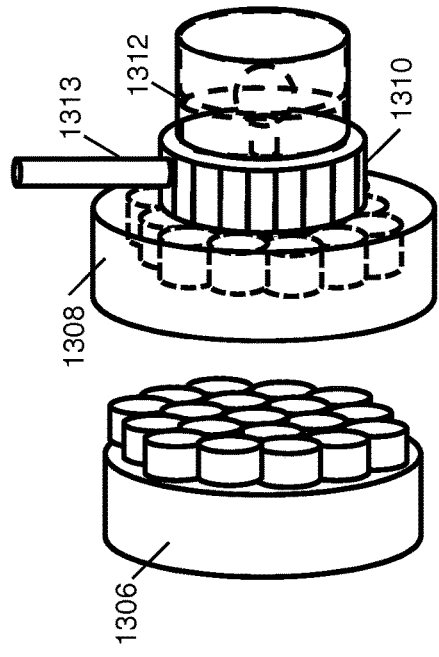
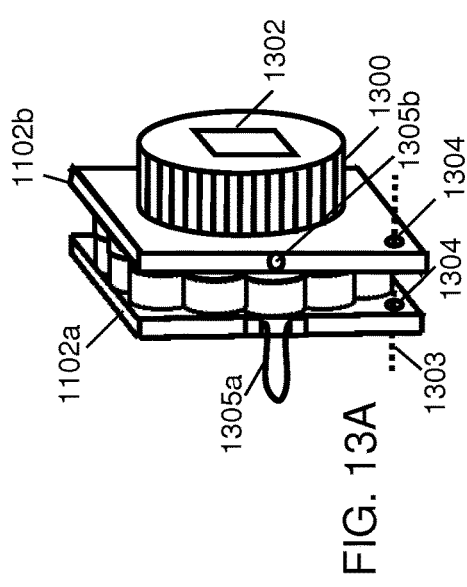
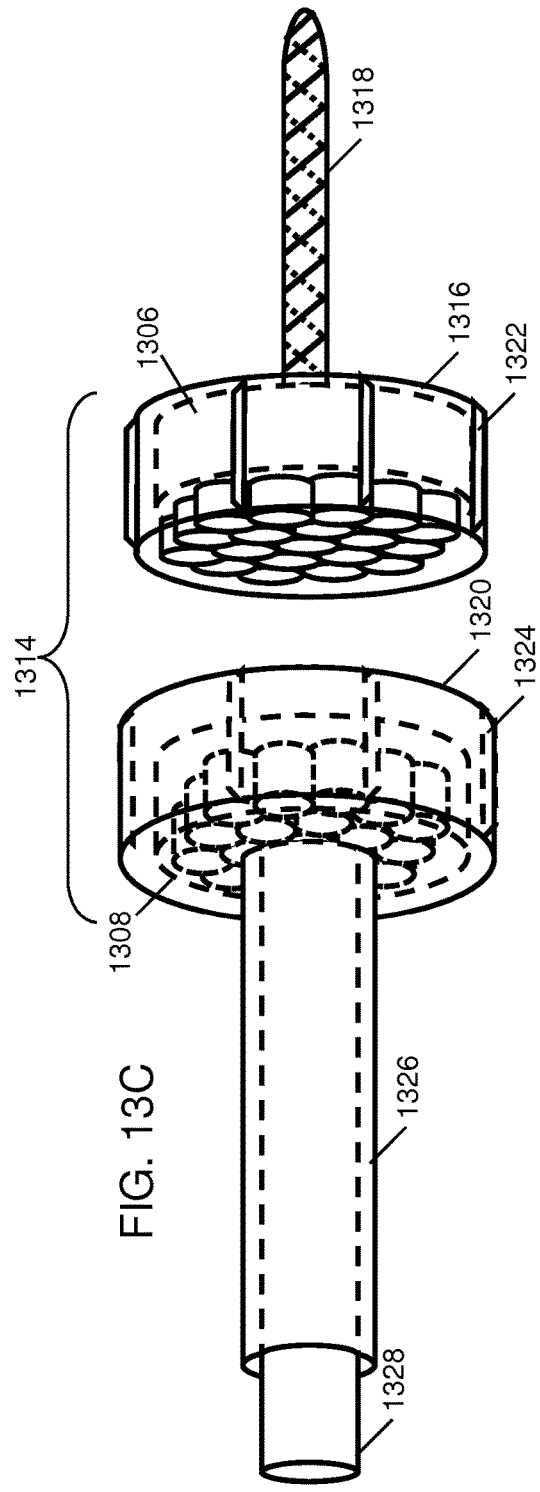
FIG. 13A
FIG. 13B
FIG. 13C

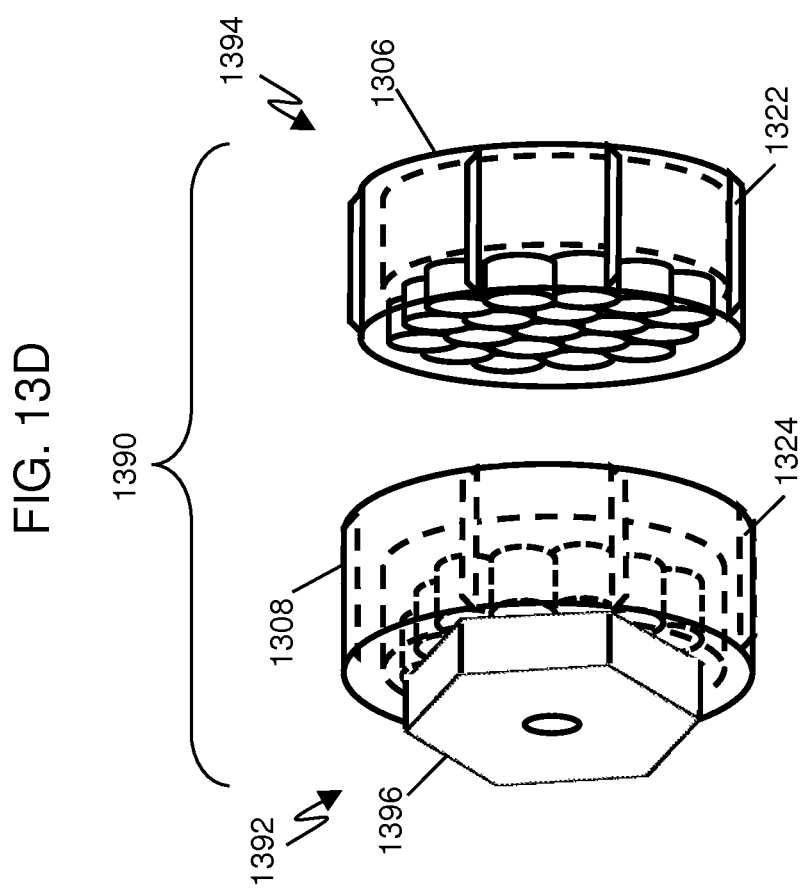

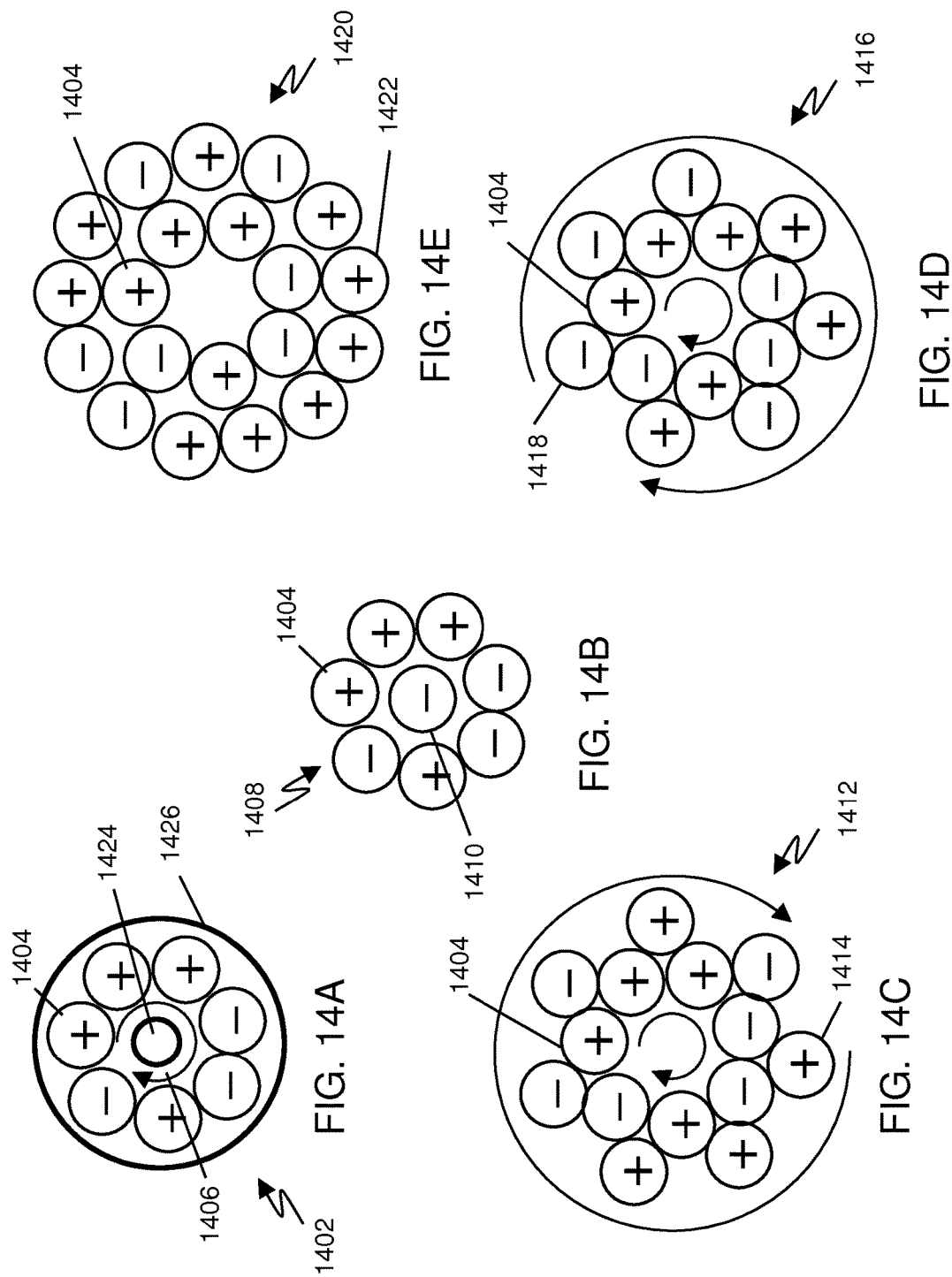

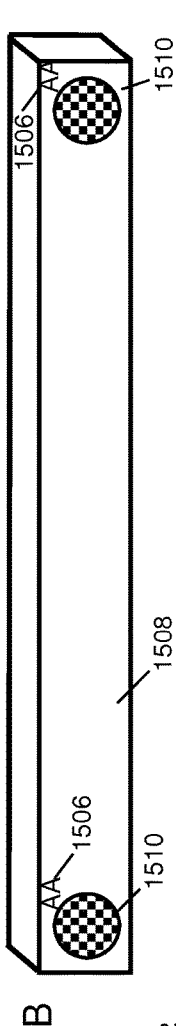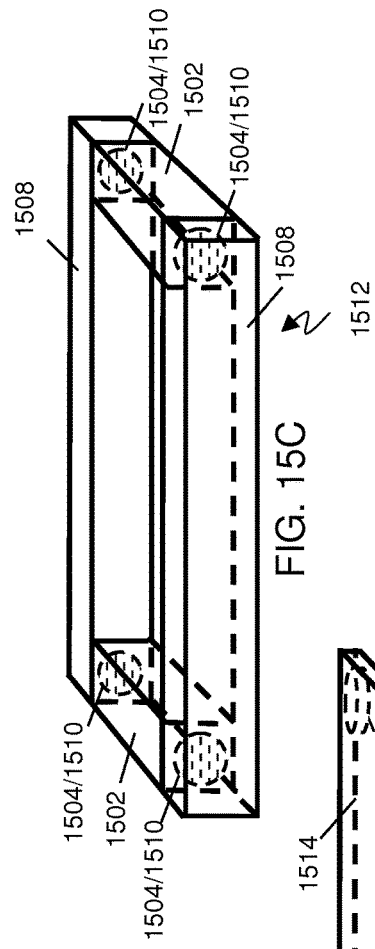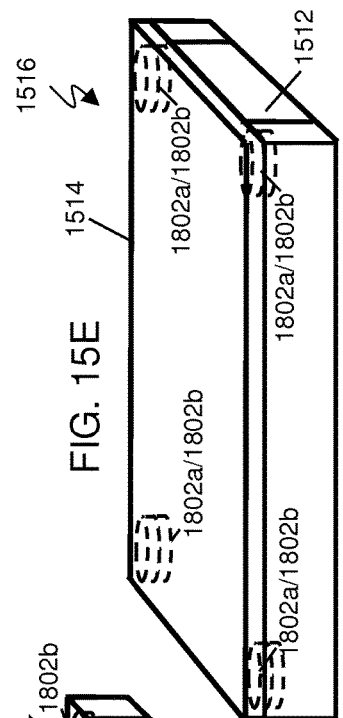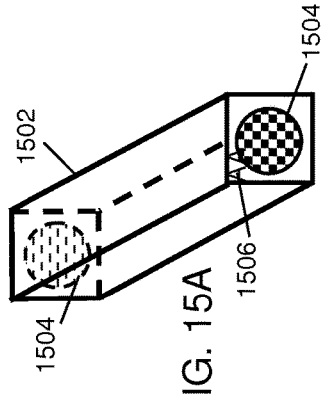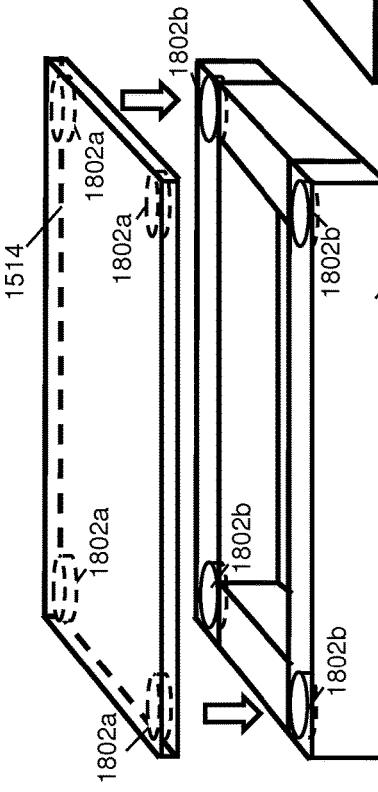
FIG. 15B
FIG. 15A
FIG. 15C
FIG. 15E
FIG. 15D

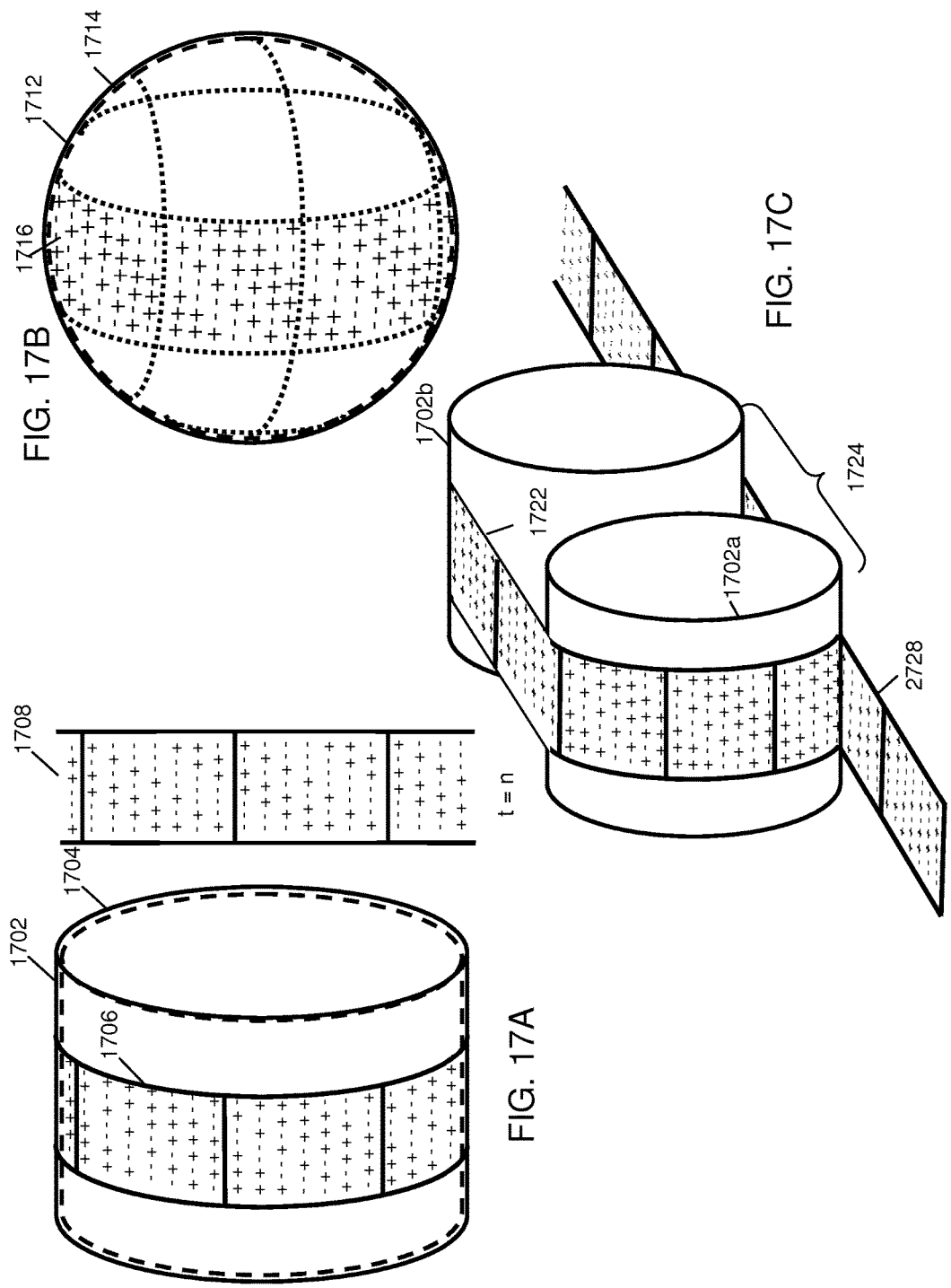

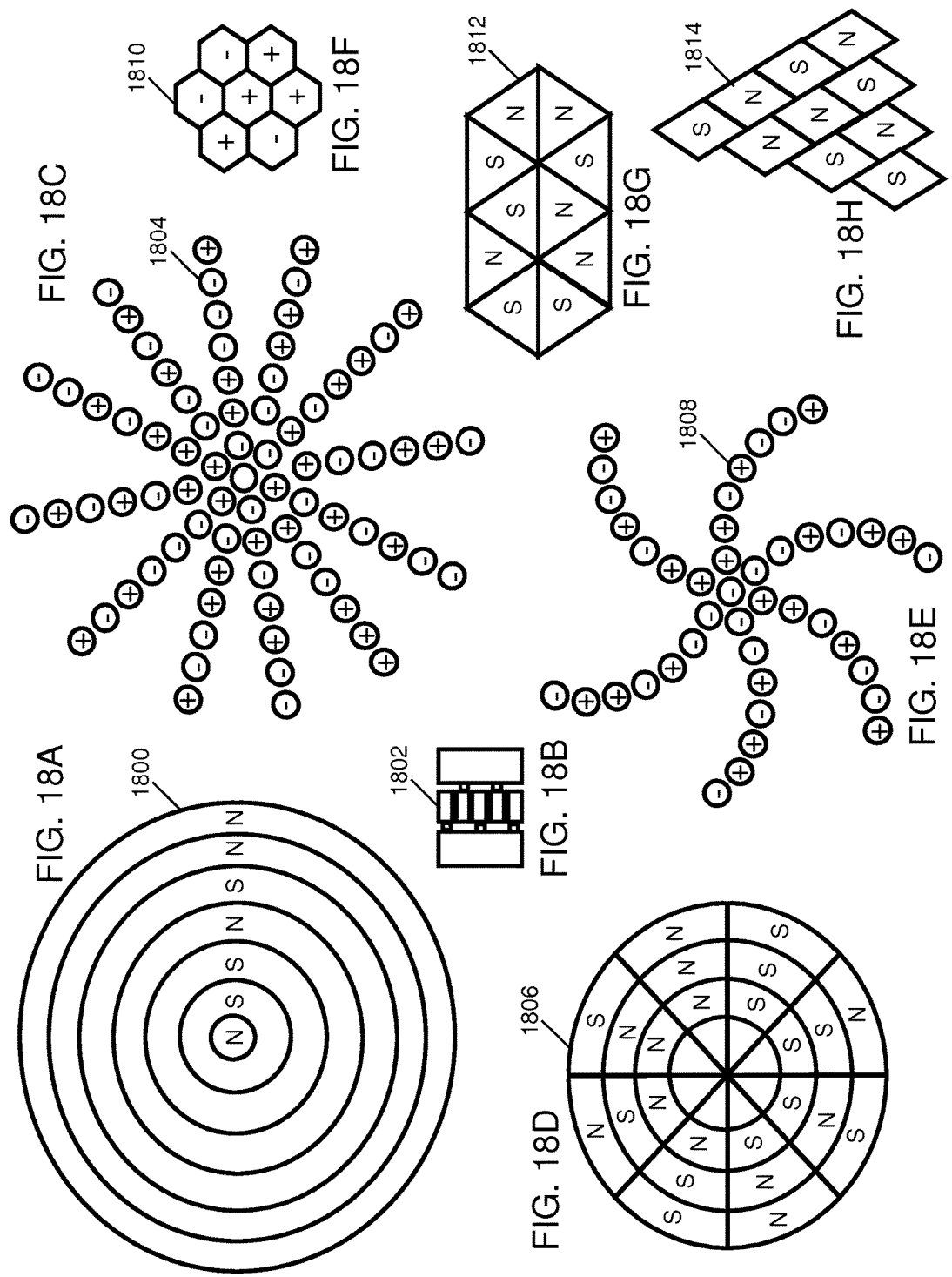

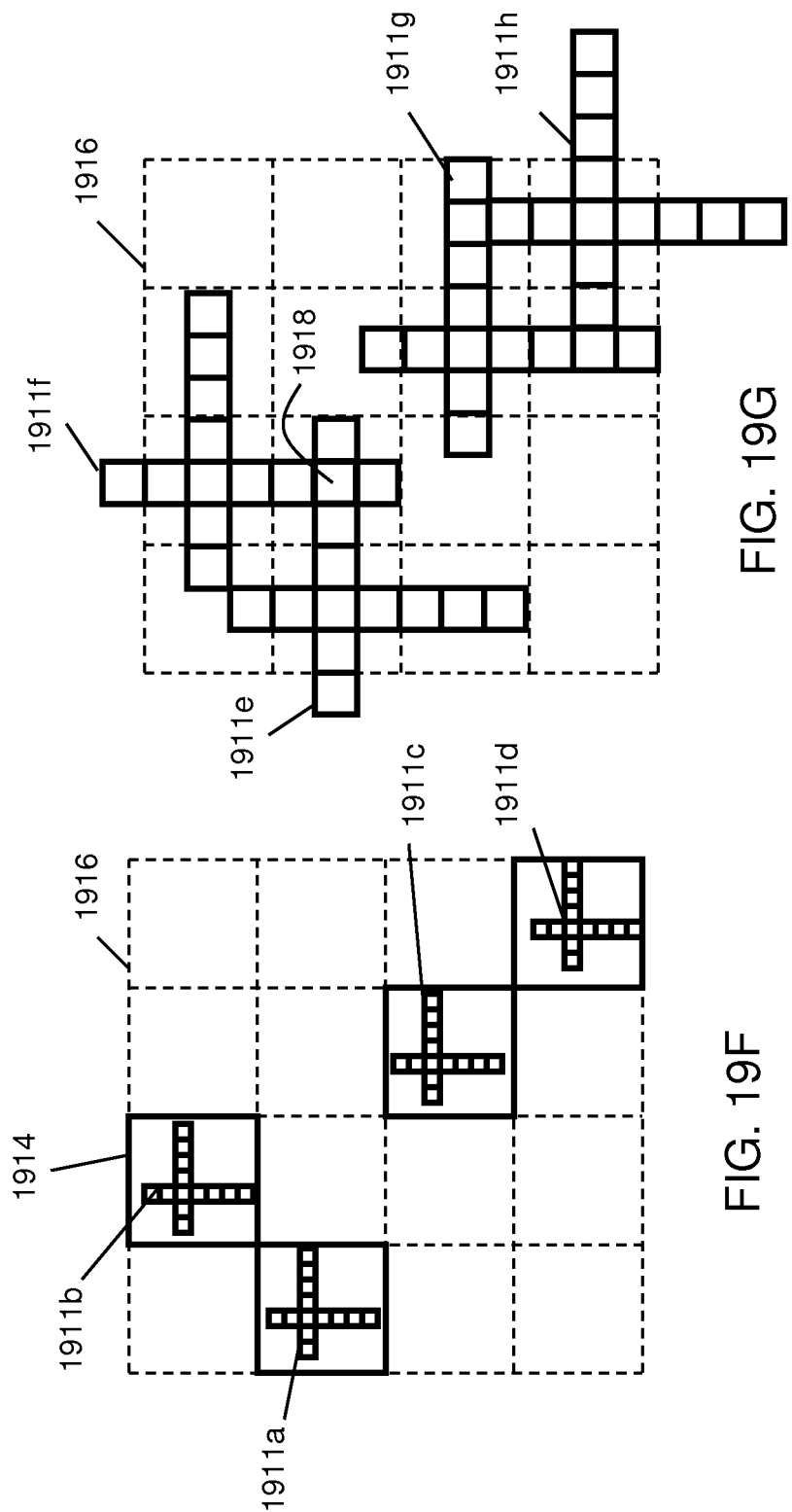

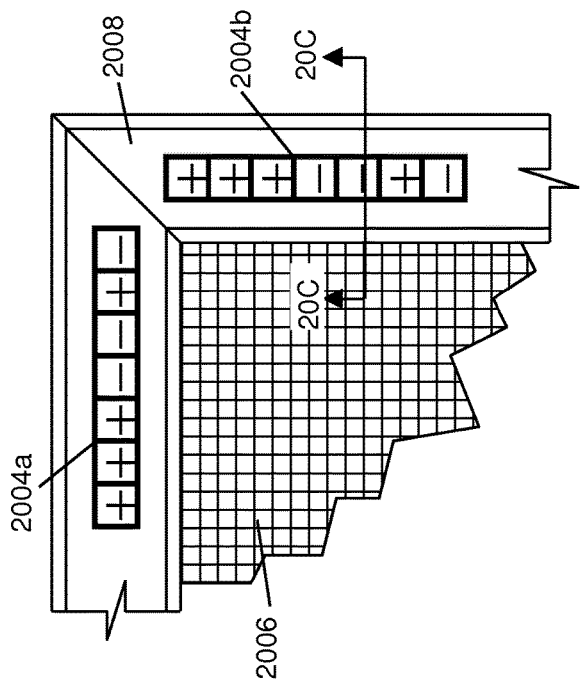
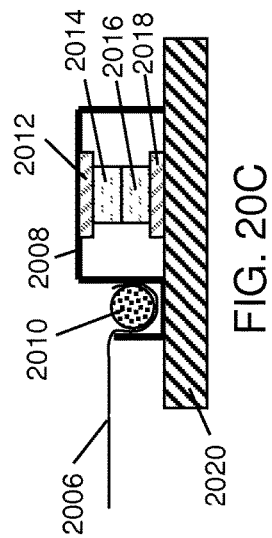
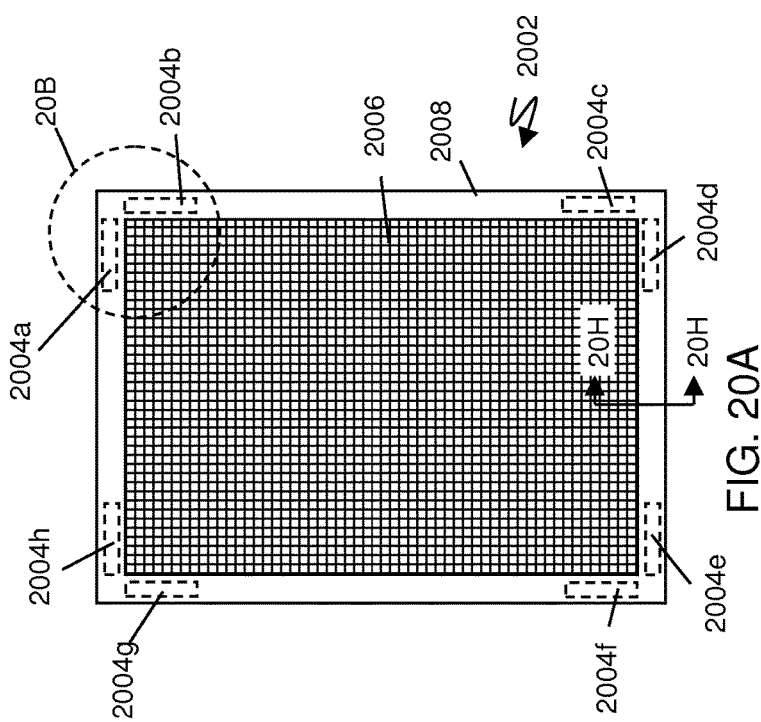

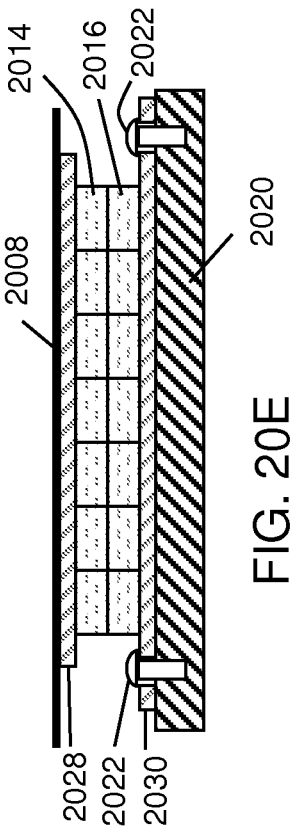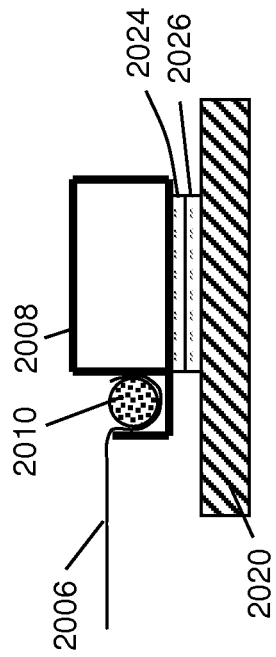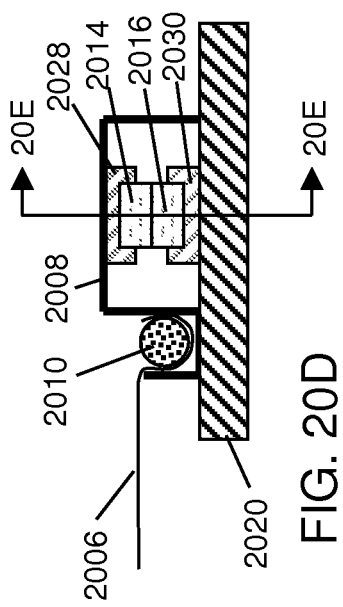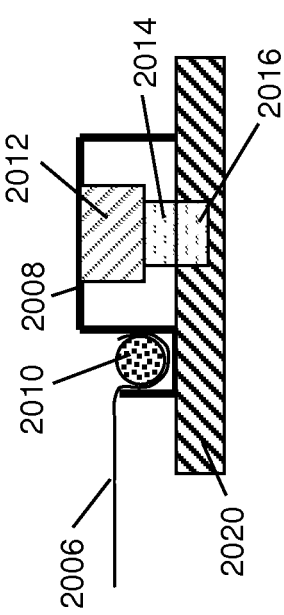

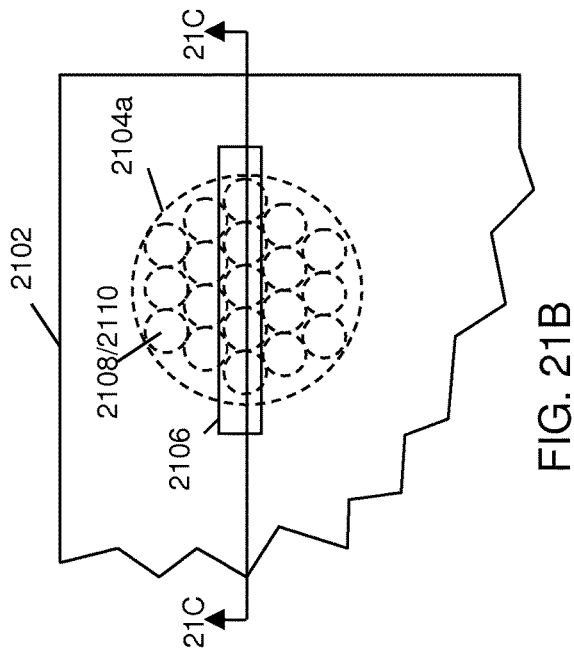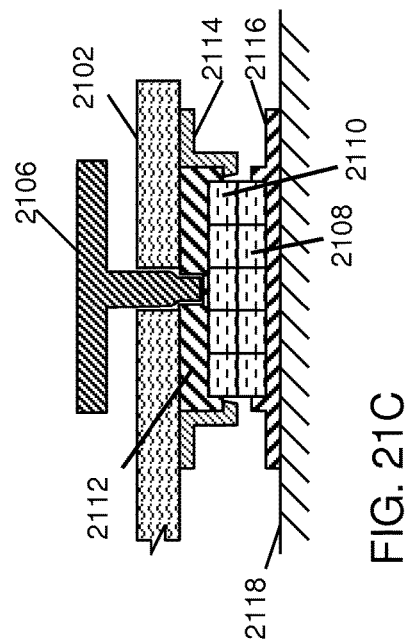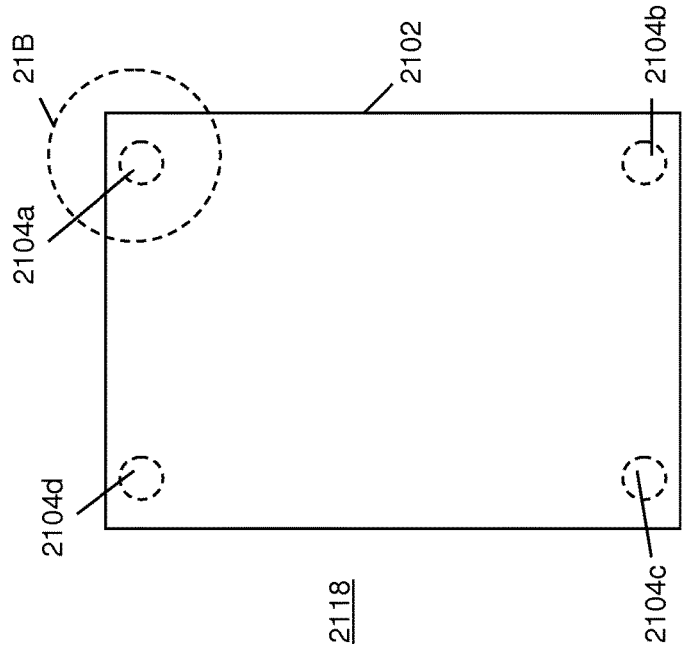
FIG. 21B
FIG. 21C
FIG. 21A

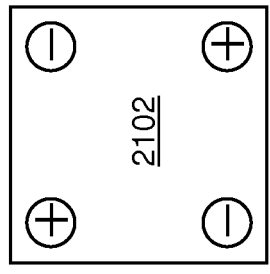
FIG. 22D
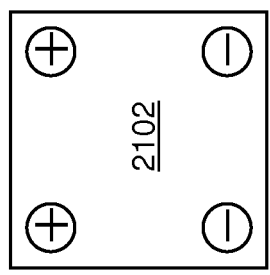
FIG. 22C
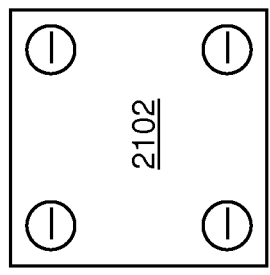
FIG. 22B
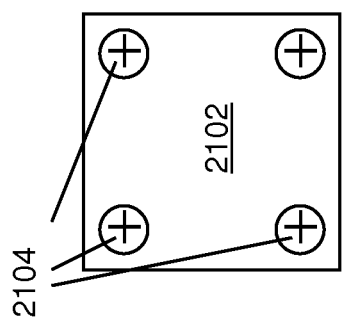
FIG. 22A
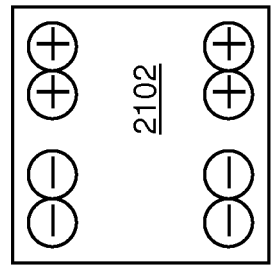
FIG. 22H
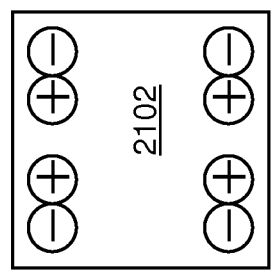
FIG. 22G
FIG. 22F
FIG. 22E

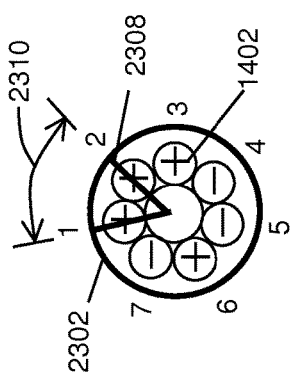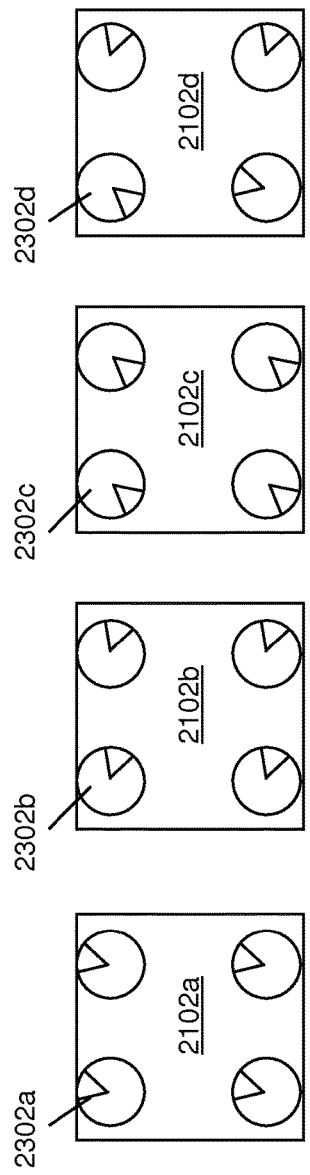

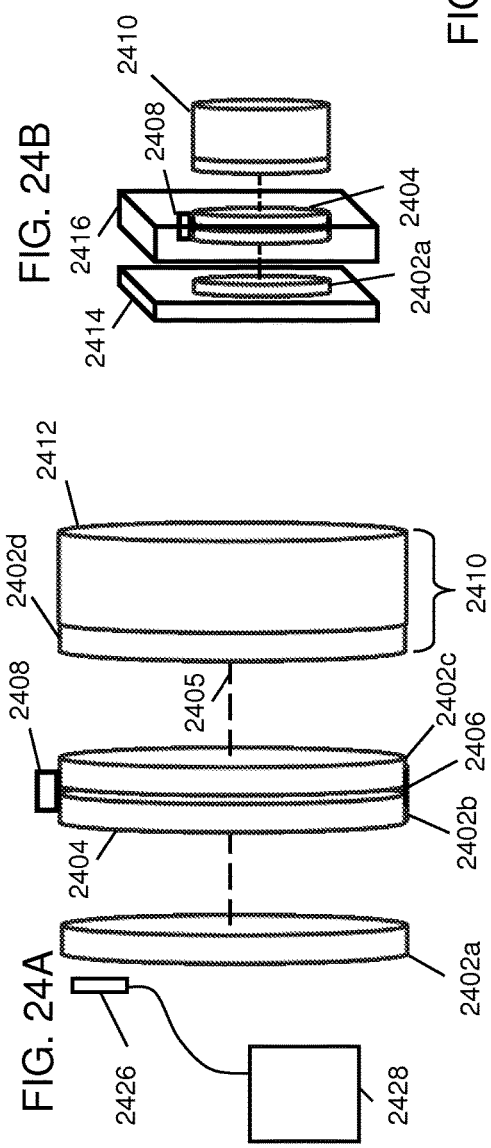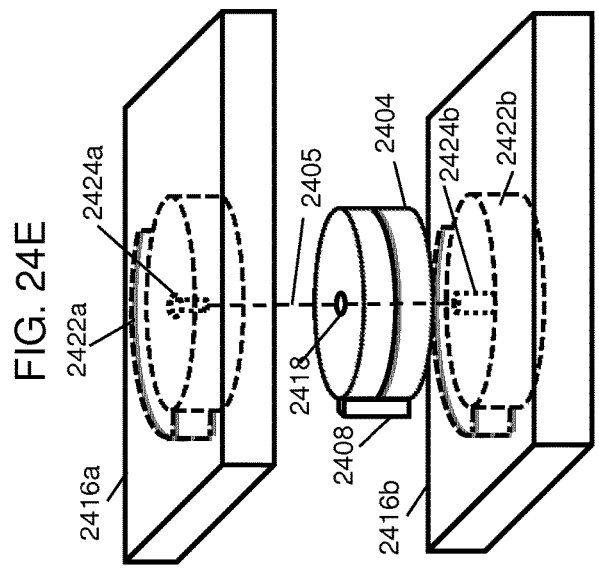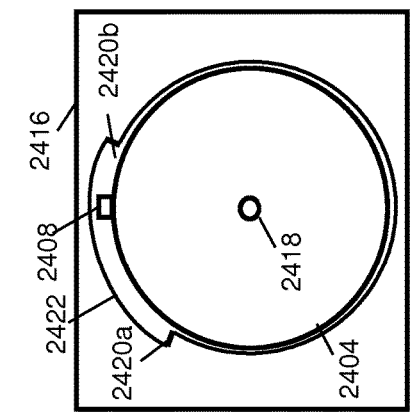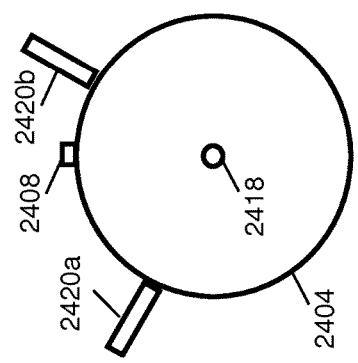

METHOD FOR ASSEMBLING A MAGNETIC ATTACHMENT MECHANISM

RELATED APPLICATIONS

This application is a continuation of non-provisional application Ser. No. 15/188,760 titled "Magnetic Valve Assembly", filed Jun. 21, 2016, by Fullerton et al.

FIELD OF THE INVENTION

The present invention pertains generally to the field of easily installed and removed panels for covering openings, supporting displays, and other purposes, and more particularly to panels that are expected to be repeatedly installed and removed.

BACKGROUND

There are numerous applications where panels are required to be installed on a temporary basis and then removed and potentially installed again for an indefinite number of installation and removal cycles, for example, storm windows, weather panels, hurricane boarding, construction barriers, white boards, sign boards and other panels. Such panels are typically installed with permanent fasteners, such as nails or screws that typically damage or mar the base structure, require tools for installation and removal of the panel, and quickly wear out and need replacement upon repeated installation of the panel while doing further damage to the base structure. Typical longer term solutions may include hanging by hooks or other such fasteners, but hooks and the like may not provide the desired stability and rigidity.

Therefore, there is a need for a repeatedly installable and removable panel that can be quickly and easily repeatedly installed and removed without using tools and that does not damage the base or wear out in normal use, and that provides stability and rigidity upon installation.

BRIEF DESCRIPTION OF THE INVENTION

Briefly, the present invention pertains to a magnetic attachment system for attaching a first object to a second object. A first magnet structure is attached to the first object and a second magnet structure is attached to the second object. The first and second objects are attached by virtue of the magnetic attraction between the first magnet structure and second magnet structure. The magnet structures comprise magnetic elements arranged in accordance with patterns based on various codes. In one embodiment, the code has certain autocorrelation properties. In further embodiments the specific type of code is specified. In a further embodiment, an attachment and a release configuration may be achieved by a simple movement of the magnet structures.

In one embodiment, the system may include a panel having a magnetic mounting that utilizes a plurality of magnets in a magnet structure that allows high magnetic force when the panel is installed and the magnet structure is aligned while permitting removal using relatively light force applied to misalign the magnet structure to allow removal. In one embodiment, the magnet structure can provide precision positioning of the panel to a position on the order of the width of a single component magnet of the magnet structure. In another embodiment, the magnet structure may be misaligned for removal by a rotation of the magnet structure. In a further embodiment, the misalignment may be achieved by a lateral shift of the magnet structure. The invention may be adapted to a wide variety of panels including but not limited to doors, window coverings, storm coverings, seasonal covering panels, baby gates, white boards, and green house panels.

One embodiment employs multiple magnet structures based on multiple unique codes for unambiguous article orientation or selection, where more than one orientation or selection is possible. A further embodiment includes an adhesive backing for quick accurate initial installation. Embodiments are disclosed that require no tools for subsequent removal and installation after an initial installation of the panel. Alternatively, a tool or key may be required for removal to add a degree of difficulty or security to prevent tampering. A further embodiment includes a second coded magnet structure for coupling to a release mechanism providing a unique security code to prevent tampering.

In one embodiment, the panel may include a plurality of magnet structures fixed to the panel, where removal of the panel involves adjustment of the entire panel to reduce magnetic attraction before removing the panel. In another embodiment, the panel may include magnet structures that may be adjusted individually, where removal of the panel may be accomplished by adjusting one or more magnet structures in turn to reduce the magnetic attraction before removing the panel.

The magnetic field components may be defined according to any of a number of polarity or position based patterns. The panel may be removed by first reducing the magnetic attraction, and then separating the panel.

In one embodiment, the magnet structure may be adjusted by shifting laterally to reduce the magnetic attraction. In another embodiment, the magnet structure may be rotated to reduce the magnetic attraction. In a further embodiment, the magnet structure may be demagnetized to reduce the magnetic attraction.

In a further embodiment, the panel may be supplied with an adhesive, for example a pressure sensitive adhesive, to initially fix the complementary magnet structure to a surface during installation. The complementary magnet structure is initially attached to the base magnet structure mounted on the panel. The panel is set in place. Pressure is applied to set the adhesive. The magnet structure is adjusted for low magnetic attraction, whereupon the panel is removed, leaving the complementary magnet structure accurately in place. Screws or other permanent attachments may then be installed in the complementary magnet structure. Alternatively, permanent adhesives may be used in place of the pressure sensitive adhesive to install the complementary magnet structure.

In a further embodiment, the magnetic pattern may be configured to allow installation in a unique direction.

In a further embodiment, the magnetic pattern may be configured to allow installation of a selected panel of a set of panels in a given location while rejecting the remaining panels of the set. In one embodiment, the magnetic pattern is configured using codes with low cross correlation. Alternatively a set of magnet structures may be configured using alternate polarities according to a Walsh code. In a further embodiment, a panel with a magnet structure having limited movement between an attachment and release position may align only with the release span of an incorrect orientation or mounting position.

In a further embodiment, a mechanical limit may be provided in conjunction with magnetic mounting of a panel to assist in supporting the panel, while still allowing a release mechanism requiring less force for release than the holding force of the magnetic mounting.

In several embodiments of the invention, the magnet structure may comprise magnetic components arranged according to a variable code, the variable code may comprise a polarity code and/or a spacing code. The variable code may comprise a random or pseudorandom code, for example, but not limited to a Barker code, an LFSR code, a Kasami code, a Gold code, Golomb ruler code, and a Costas array. The magnetic field components may be individual magnets or different magnetized portions in a single contiguous piece of magnet material.

These and further benefits and features of the present invention are herein described in detail with reference to exemplary embodiments in accordance with the invention.

BRIEF DESCRIPTION OF THE FIGURES

The present invention is described with reference to the accompanying drawings. In the drawings, like reference numbers indicate identical or functionally similar elements. Additionally, the left-most digit(s) of a reference number identifies the drawing in which the reference number first appears.

FIG. 2A-FIG. 2H illustrate various magnet concepts and structures utilized by the present invention.

FIG. 3A-FIG. 3N illustrate a sequence of relative shift positions for a Barker 7 magnet structure and a complementary Barker 7 magnet structure.

FIG. 8A-FIG. 8E show various exemplary two dimensional code structures in accordance with the present invention.

FIG. 9A-FIG. 9F illustrate additional two dimensional codes derived from the single dimension Barker 7 code.

FIG. 9G illustrates a further alternative using four codes of low mutual cross correlation.

FIG. 10A and FIG. 10B depict a magnetic field emission structure comprising nine magnets in three parallel columns of three magnets each with the center column shifted by one half position.

FIG. 11A-FIG. 11C depict an exemplary code intended to produce a magnetic field emission structure having a first stronger lock when aligned with its mirror image magnetic field emission structure and a second weaker lock when rotated 90° relative to its mirror image magnetic field emission structure.

FIGS. 12A-12I depict the exemplary magnetic field emission structure and its mirror image magnetic field emission structure.

FIG. 13A-FIG. 13D depict various exemplary mechanisms that can be used with field emission structures and exemplary tools utilizing field emission structures in accordance with the present invention.

FIG. 14A-FIG. 14E illustrate exemplary ring magnet structures based on linear codes.

FIG. 15A-FIG. 15E depict the components and assembly of an exemplary covered structural assembly.

FIG. 17A-FIG. 17C illustrate several exemplary cylinder and sphere arrangements, some arrangements including coupling with linear track structures.

FIG. 18A through FIG. 18H provide a few more examples of how magnetic field sources can be arranged to achieve desirable spatial force function characteristics.

FIG. 19A through FIG. 19G depict exemplary embodiments of two dimensional coded magnet structures.

FIG. 20A-FIG. 20I illustrate exemplary window covering embodiments in accordance with the present invention.

FIG. 21A-FIG. 21C illustrate the use of a coded magnet structure to detachably attach a panel to a support structure.

FIG. 22A-FIG. 22H depict the use of different magnet patterns distributed over the panel for selective matching of a particular panel to a particular installation or to insure desired orientation of a panel.

FIG. 23A-FIG. 23E illustrates the use of a rotational clasp with limited rotational motion in different sectors to provide selective operation among a set of panels.

FIG. 24A and FIG. 24B depict the use of multiple magnetic structures to enable attachment and detachment of two objects using another object functioning as a key.

FIG. 24C and FIG. 24D depict the general concept of using a tab so as to limit the movement of the dual coded attachment mechanism between two travel limiters.

FIG. 24E depicts exemplary assembly of the second object which is separated into a top part and a bottom part,

DETAILED DESCRIPTION OF THE INVENTION

The present invention pertains to a magnetically attached panel which is held in place by a magnet structure comprising multiple magnets in an arrangement that generates a magnetization pattern that precisely positions the panel as if the strength of all of the magnets were concentrated in just one magnet location. One magnet structure is attached to the panel and is used with a complementary magnet structure that is attached to the support structure where the panel is to be mounted. Any number of magnets can be used as necessary to increase the strength of the holding force to securely hold the panel in place. For example, a holding force of 50 kilograms can be achieved with a magnet structure of 100 magnet pairs, each ½ cm square covering a square 5 centimeters on a side, and the magnet structure can position the panel to within a half centimeter. As a further capability of the invention, the magnet structure can be made to release with relatively light force compared with the holding force. In one embodiment, the magnet structure is rotated to a release angle where the attraction force is minimal or even opposite (repelling) the holding force. In another embodiment, the magnet structure may be shifted slightly laterally to a similar release position. The release position is typically within the width of a single magnet from the holding position. Thus, the magnet structure does not have to be moved a great distance to the release position. A conventional magnet, however, with the same holding force would also occupy 5 cm square, but would hold a significant force 2 to 3 cm off center and would require moving the entire 5 cm to achieve full release. Further, the conventional magnet would not release by rotating the magnet. These principles can be better understood with reference to FIG. 1A and FIG. 1B.

Figure 1B:
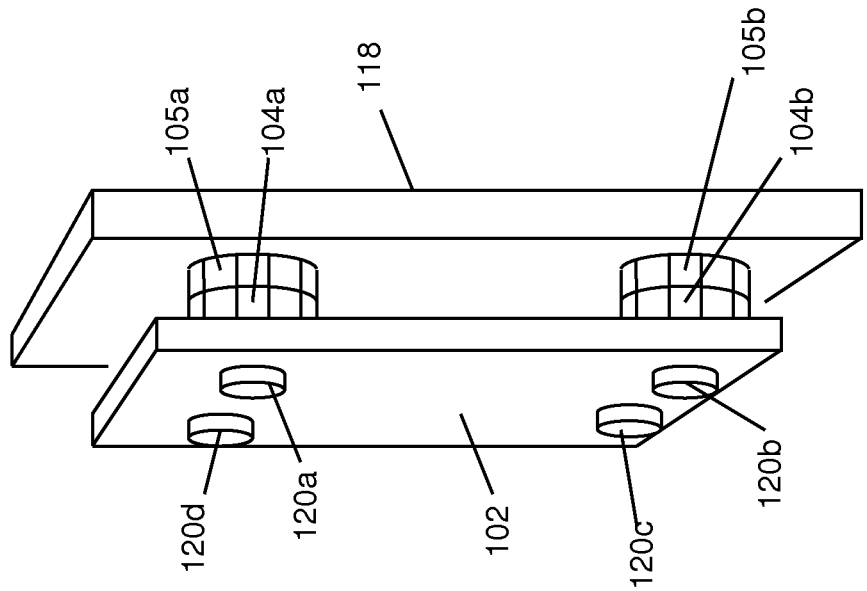
FIG. 1A and FIG. 1B depict an exemplary panel with four magnet structures in accordance with the present invention.
Figure 1A:
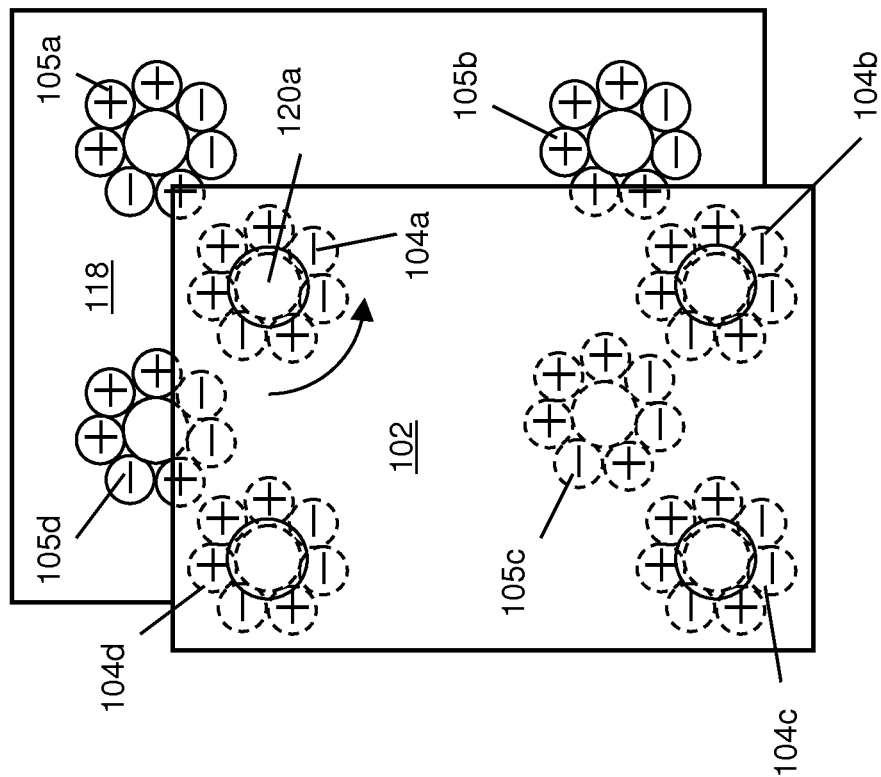

FIG. 1A and FIG. 1B depict an exemplary panel with four magnet structures in accordance with the present invention. Referring to FIG. 1A, panel 102 is attached to a background structure 118 through four exemplary magnet structure pairs 104a-104d, 105a-105d. Each magnet structure pair 104 105 comprises a magnet structure 104a-104d attached to the panel 102 and a complementary magnet structure 105a-105d attached to the background structure 118. When the magnet structures 104 105 are aligned, every magnet in each paired magnet structure 104a-104d is attracting a corresponding magnet 105a-105d in the complementary magnet structure. Thus every magnet is exerting an attracting force. When the magnet structures 104 105 are misaligned, even by one magnet position, the polarity pattern of the magnets is such that the sum of all magnet interactions is to essentially neutralize or reverse the attraction because, for most misaligned positions, about half of the overlapping magnets are attracting and about half are repelling, thus canceling one another.

A further feature illustrated by the exemplary magnet structure 104a and 105a is the ability to rotate one magnet structure to any position other than alignment, and the two magnet structures will repel by one magnet pair. The code describing the magnet polarities is a Barker 7 length code. The details of shifting a Barker 7 coded magnet structure are explained later in this disclosure. The shifting property of the magnet structure is used to release the magnet structure to separate the panel. A knob 120a-120d for each magnet structure 104a-104d is provided to rotate each magnet structure 104a-104d to cancel the magnetic force and release the panel 102.

FIG. 1B is a side perspective view of the panel and background support of FIG. 1A showing magnet structures 104 and 105 in alignment. Knob 120a can be rotated to rotate magnet structure 104a relative to magnet structure 105a and cancel the net magnetic attraction between magnet structure 104a and 105a. Each knob 104a-104d may be rotated to release all magnet structures and remove the panel 102.

Numerous codes of different lengths and geometries are available to suit a wide range of applications. Codes are available for matching particular corresponding magnet structures to insure correct matching of multiple panels to the right location or to insure correct orientation.

Applications for the panel 102 with magnetic attachments include but are not limited to seasonal panels to cover vents or openings during winter or other bad weather, storm windows and doors installed seasonally and/or removable for cleaning, greenhouse panels installed and removed seasonally or daily as needed, baby gates installed as needed, white boards installed when needed in a conference room, advertising panels removed to change a message and then set in place, pictures on a wall may be changed periodically, and numerous other panels may be adapted to utilize coded magnet structures in accordance with the disclosures herein.

Further details on codes and geometries for coded magnet structures as well as details on exemplary applications will now be described with reference to several drawings.

Coded Magnet Structures

Coded magnet structures were first fully disclosed in U.S. Provisional Patent Application 61/123,019, titled "A Field Emission System and Method", filed Apr. 4, 2008. Coded magnet structures are alternatively referred to as field emission structures, coded field emissions, correlated magnets, and coded magnets. The fields from coded magnet structures may be referred to as coded field emissions, correlated field emissions, coded magnetic fields, or correlated magnetic fields. Forces from interacting coded magnet structures may be referred to as a spatial force function or force function resulting from correlated fields.

A coded magnet structure is typically a set of magnets positioned along an interface boundary with the north-south orientation of each individual magnet field at the interface boundary selected to be positive (north-south) or negative (south-north) according to a predefined pattern, alternatively referred to as a code. Alternatively, the spacing between magnets may be defined by the pattern. The pattern typically appears random or pseudorandom; however, the pattern may be carefully designed or selected to have certain properties desired for a given application. These properties include, but are not limited to precise alignment, maximum response at alignment, minimal response out of alignment, the ability to use different codes that prevent alignment between the different codes, but allow alignment for the same code. These properties can be applied to yield a multitude of benefits including but not limited to precise positioning, strong holding force, easy release, unambiguous assembly of multiple parts and/or multiple positions, rolling contact or contact free power transfer (magnetic gears), new types of motors, and magnetic suspension. Note that coded magnet structures may include contiguous magnet material with a spatial and/or polarity pattern of magnetization along the material. Basic coded magnet structures will now be introduced with reference to the Figures.

FIG. 2A depicts an exemplary bar magnet showing the South and North poles and associated magnetic field vectors. Referring to FIG. 2A, a magnet 200 has a South pole 201 and a North pole 202. Also depicted are magnetic field vectors 203 that represent the direction and magnitude of the magnet's moment. North and South poles are also referred to herein as positive (+) and negative (−) poles, respectively. In accordance with the invention, magnets can be permanent magnets, impermanent magnets, electromagnets, involve hard or soft material, and can be superconductive. In some applications, magnets can be replaced by electrets. Magnets can be most any size from very large to very small to include nanometer scale structures. In the case of non-superconducting materials there is a smallest size limit of one domain. When a material is made superconductive, however, the magnetic field that is within it can be as complex as desired and there is no practical lower size limit until you get to atomic scale. Magnets may also be created at atomic scale as electric and magnetic fields produced by molecular size structures may be tailored to have correlated properties, e.g. nanomaterials and macromolecules. At the nanometer scale, one or more single domains can be used for coding where each single domain has a code and the quantization of the magnetic field would be the domain.

FIG. 2B and FIG. 2C illustrate the familiar magnetic principle that unlike poles attract and like poles repel. FIG. 2B shows two magnets, magnet 204 and magnet 206a, arranged to have unlike poles in proximity to one another, the north pole of magnet 204 is near the south pole of magnet 206a, thus the magnetic fields attract and the magnets are drawn together as shown by the arrows. FIG. 2C shows magnet 204 with magnet 206b arranged with the north poles in proximity. The resulting force repels the magnets as shown by the arrows. Coded magnet structures utilize multiple magnets like those shown in FIG. 2B and FIG. 2C. A magnet structure typically includes a parallel array of a number of magnets oriented N-S interspersed with magnets oriented opposite, or S-N. The magnet structure is typically paired with another magnet structure of corresponding magnets. The magnets in the corresponding magnet structure may be selected so that when the two magnet structures are aligned, each magnet of the first structure is attracted to a corresponding magnet of the second structure. Alternatively the magnets may be selected to repel so that when the two magnet structures are aligned, each magnet of the first structure is repelled by a corresponding magnet of the second structure. When the magnet structures are not aligned, the non-aligned forces combine according to the code properties of the particular magnet arrangement. Various codes and their properties as applied to magnet arrangement are further discussed in this disclosure.

FIG. 2D illustrates a linear magnet structure of seven magnets uniformly oriented in the same direction. The seven magnets bonded together in a magnet structure 212 behave essentially as a single magnet. A magnet structure typically refers to a set of magnets rigidly bonded together as if glued or potted to act mechanically as a single piece, although some flexible bonding arrangements are disclosed. The magnets of the magnet structure 212 depicted in FIG. 2D require bonding since without such bonding they would naturally orient themselves such that every magnet would be oriented opposite the orientation of the magnet(s) on either side of it. Such naturally aligned magnets are not coded magnet structures, where at least one magnet is oriented in a manner that requires a bonding or holding mechanism to maintain its orientation. Each of the seven magnets of FIG. 2D and other illustrations of this disclosure may also be referred to as component magnets of the magnet structure, magnetic field sources, magnetic field emission sources, or field emission sources.

FIG. 2E illustrates the linear structure of FIG. 2D with the magnets in an exemplary arrangement to form a variably coded structure 214 so that some of the magnets have the north pole up and some have the south pole up in accordance with the present invention. Due to the placement of side by side magnets of the same polarity, the magnets will require a holding force. As such, FIG. 2D depicts a uniformly coded magnet structure 212 while FIG. 2E depicts a variably coded magnet structure 214, where each of the two coded magnet structures requires a bonding or holding mechanism to maintain the orientation of its magnets. As used herein, a variable code may be a code with both positive and negative polarities, alternatively as will be discussed later, a variable code may be a code with different spacings between adjacent magnets.

FIG. 2F shows the top face of the magnet structure of FIG. 2E. Taking the top face as the reference face 216 of the structure and designating "+" for the north pole and "−" for the south pole, the sequence of magnets may be designated "+ + + − − + −", as shown. Alternatively, the sequence may be written: "+1, +1, +1, −1, −1, +1, −1", where "+1" indicates the direction and strength of the magnet as a direction of north and a strength of one unit magnet. For much of the exemplary discussion in this disclosure, the actual strength of the magnet is arbitrary. Much of the discussion relates to using several magnets of equal strength in complex arrangements. Thus, "one magnet" is the arbitrary magnetic strength of a single magnet. Additional coded magnet structure arrangements for unequal strength or unequal physical size magnets may also be developed in accordance with the teachings herein. The surface of the top face 216 may be referred to as an interface surface since it can be brought into proximity with a corresponding interface surface of a second magnet structure in the operation of the invention to achieve the benefits of the magnet arrangements. Under one arrangement, the surface of the bottom face 217 may also be referred to as a second interface surface 217 since it can be brought into proximity with a corresponding interface surface of another magnet structure (e.g., a third coded magnet structure) in the operation of the invention to achieve the benefits of the magnet arrangements. FIG. 2G illustrates the exemplary magnet structure of FIG. 2E in proximity and in alignment with a complementary magnet structure in accordance with the present invention. Referring to FIG. 2G, magnet structure 214 has the sequence "+, +, +, −, −, +, −" on interface surface 216. Complementary magnet structure 220 has the magnetic arrangement sequence: "−, −, −, +, +, −, +" as viewed on the underside surface 217 interfacing with magnet structure 214. Thus, the sequence is "complementary" as each corresponding opposite magnet across the interface plane 216 forms an attraction pair with the magnet of structure 214. A complementary magnet structure may also refer to a magnet structure where each magnet forms a repelling pair with the corresponding opposite magnet across the interface plane 214. The interface surface 216 is conformal to an interface plane 219 dividing the components of structure 214 and complementary structure 220 and across which 219 the structures 214 and 220 interact. The interface plane 219 may alternatively be referred to as an interface boundary, because the "plane" may take various curved or complex shapes including but not limited to the surface of a cylinder, cone, sphere, or stepped flats when applied to various different magnet structures.

Typically in this disclosure, complementary surfaces of magnet structures are brought into proximity and alignment to produce an attractive force as the exemplary embodiment. However, the like surfaces of magnet structures can be brought into proximity and alignment to produce a repelling force, which can be accomplished by rotating one of the magnet structures 180° (as indicated by arrow 218) so that two like faces 217, 217a (or 216, 216a) are brought into proximity. Complementary structures are also referred to as being the mirror image of each other. As described herein, relative alignments between surfaces of magnet structures can be used to produce various combinations of attraction and repelling forces.

Generally speaking, a given magnet structure is used with a complementary magnet structure to achieve the desired properties. Typically, complementary structures have the same magnetic field magnitude profile across an interface boundary and may have the same or opposite polarity. Special purpose complementary structures, however, may have differing profiles. Complementary magnet structures may also be referred to as having a mirror pattern of each other across an interface boundary, keeping in mind that the magnets of the structures may have opposite polarities or the same polarities causing them to attract or repel each other when aligned, respectively.

FIG. 2H shows an alternate notation illustrating the magnet structures 214 and 216 in alignment. The notation of FIG. 2H illustrates the flat side of each magnet with the N-S indication of polarity. Each structure 214, 220 is a physically bonded unit, i.e., all magnets of a structure move right or left, up or down together. The two structures are shown in sliding contact at the interface boundary 219 (alternatively referred to as the interface plane 219). (Contact is interesting because forces are at maximum when in contact, but contact is not necessary.) Contact generally refers to the condition where the two magnet structures are in contact, whether the magnets themselves are in contact or not. Proximity generally means that the two magnet structures are close to one another within a distance corresponding to a lateral code element spacing, i.e., magnet to magnet spacing, preferably within half of the code element spacing. The two structures 214, 220 are free to move relative to each other and to exert response forces resulting from the interacting magnetic fields. Alignment of a base structure 214 with a complementary structure 220 means that each complementary magnet of the complementary structure is directly across the interface boundary 219 from the corresponding magnet of the base structure 214. Alignment may also refer to alignment of individual magnets, referring then to the alignment of the center of the magnetic field with the center of the magnetic field of the magnet across the interface surface for maximum attraction or repelling force. For example, magnet 222 at the right end of the base structure 214 is aligned with the complementary magnet 224 at the right end of the complementary structure 220. Magnet 224 is across the interface boundary 219 from magnet 222. The designation of base structure and complementary structure is typically a convenience for discussion purposes and the terms can be reversed since the two structures are each complementary structures to each other. Magnets are substantially aligned when the magnet axis centers are within a half width of one of the magnets. Magnet structures are substantially aligned when the component magnets are substantially aligned. Alternatively, substantial alignment may mean that the magnets or structures are within half of the peak force function from best alignment. Alignment is assumed to include and ignore normal mechanical and other construction tolerances in practice. Depending on context, especially when discussing magnet structures of differing codes, alignment may refer to a mechanical alignment of the overall structure and/or individual magnets even though the magnetic fields may not match in a complementary manner and thus the alignment may not generate a strong attracting or repelling force.

Magnet structures may be depicted in this disclosure as containing magnets that entirely fill the space from one position to the next in the coded structure; however, any or all magnet positions may be occupied by magnets of lesser width.

The polarity sequence pattern of exemplary magnet structure 214 corresponds to the polarity sequence of a 7 length Barker code. The sequence of the complementary structure 220 corresponds to the reverse polarity of a Barker 7 code. Barker codes have optimal autocorrelation properties for particular applications, which can result in distinctly useful magnetic attraction (or repelling) properties for magnet structures when applied in accordance with the present invention. In particular, one property is to produce a maximum, or peak, attractive or repelling force when the structures are aligned with greatly reduced force when misaligned, for example, by one or more magnet widths. This property can be understood with reference to FIG. 3A-FIG. 3N.

FIG. 3A-FIG. 3N illustrate a sequence of relative shift positions for a Barker 7 magnet structure and a complementary Barker 7 magnet structure. Referring to FIG. 3A, note first that magnet structures 220 and 214 are no longer aligned (alternatively referred to as misaligned) in contrast with FIG. 2H and complementary magnets 222 and 224 are no longer aligned, also in contrast to FIG. 2H. Instead, magnet 222 is in alignment with corresponding magnet 302 directly across the interface boundary. Referring generally to FIG. 3A-FIG. 3N, a Barker length 7 code (1, 1, 1, −1, −1, 1, −1) is used to determine the polarities and the positions of magnets making up a first magnetic field emission structure 220. Each magnet has the same or substantially the same magnetic field strength (or amplitude), which for the sake of this example is provided a unit of 1 (where A=Attract, R=Repel, A=−R, A=1, R=−1). A second magnetic field emission structure that is identical to the first is shown in 13 different alignments in FIG. 3A through FIG. 3N relative to the first magnetic field emission structure FIG. 3A. (Note that magnet structure 220 is identical to magnet structure 214 in terms of magnet field directions; however the interfacing poles are of opposite polarity.) For each relative alignment, the number of magnets that repel plus the number of magnets that attract is calculated, where each alignment has a total spatial force in accordance with a spatial force function based upon the correlation function and magnetic field strengths of the magnets. In other words, the total magnetic force between the first and second magnet structures is determined as the sum from left to right along the structure of the individual forces, at each magnet position, of each magnet or magnet pair interacting with its directly opposite corresponding magnet in the opposite magnet structure. Where only one magnet exists, the corresponding magnet is zero, and the force is zero. Where two magnets exist, the force is R for equal poles or A for opposite poles. Thus, for FIG. 3A, the first six positions to the left have no interaction. The one position in the center shows two "S" poles in contact for a repelling force of 1. The next six positions to the right have no interaction, for a total force of 1R=−1, a repelling force of magnitude 1. The spatial correlation of the magnets for the various alignments is similar to radio frequency (RF) signal correlation in time, since the force is the sum of the products of the magnet strengths of the opposing magnet pairs over the lateral width of the structure. (Typically, correlation and autocorrelation may be normalized for a maximum peak of 1. This disclosure, however, uses a non-normalized formulation.) Thus, $$f = \sum_{n=1,N} p_n q_n$$

where, f is the total magnetic force between the two structures, n is the position along the structure up to maximum position N, and $p_n$ are the strengths and polarities of the lower magnets at each position n.

$q_n$ are the strengths and polarities of the upper magnets at each position n.

An alternative equation separate strength and polarity variables, as follows:

$$f = \sum_{n=1,N} l_n p_n u_n q_n$$

where, f is the total magnetic force between the two structures, n is the position along the structure up to maximum position N, $l_n$ are the strengths of the lower magnets at each position n, $p_n$ are the polarities (1 or −1) of the lower magnets at each position n, $u_n$ are the strengths of the upper magnets at each position n, and $q_n$ are the polarities (1 or −1) of the upper magnets at each position n, The above force calculations can be performed for each shift of the two structures to plot a force vs. position function for the two structures. The force vs. position function may alternatively be called a spatial force function.

The total magnetic force is computed for each of the figures, FIG. 3A-FIG. 3N and is shown with each figure. With the specific Barker code used, it can be observed from the figures that the spatial force varies from −1 to 7, where the peak occurs when the two magnetic field emission structures are aligned such that their respective codes are aligned, FIG. 3G and FIG. 3H (FIG. 3G and FIG. 3H show the same alignment, which is repeated for continuity between the two columns of figures). The off peak spatial force, referred to as a side lobe force, varies from 0 to −1. As such, the spatial force function causes the magnetic field emission structures to generally repel each other unless they are aligned such that each of their magnets is correlated with a complementary magnet (i.e., a magnet's South pole aligns with another magnet's North pole, or vice versa). In other words, the two magnetic field emission structures substantially correlate when they are aligned such that they substantially mirror each other.

Figure 4B:
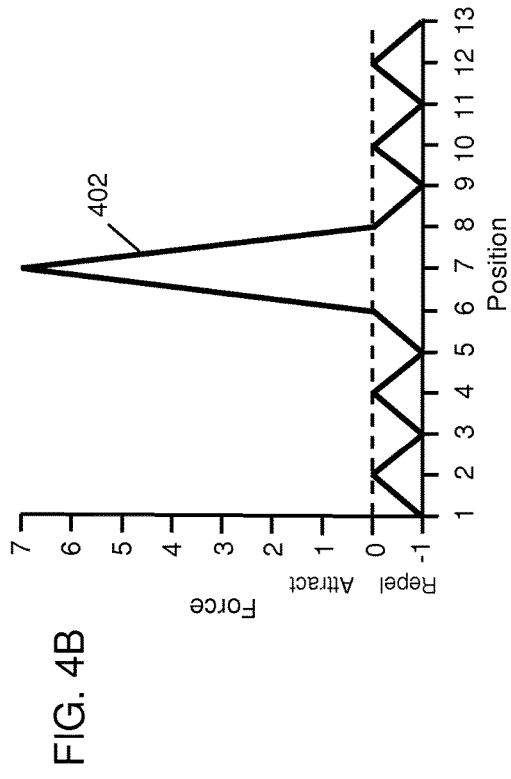
FIG. 4A and FIG. 4B illustrate the normal force between variably coded magnet structures for sliding offsets shown in FIGS. 3A-3N.
Figure 4A:
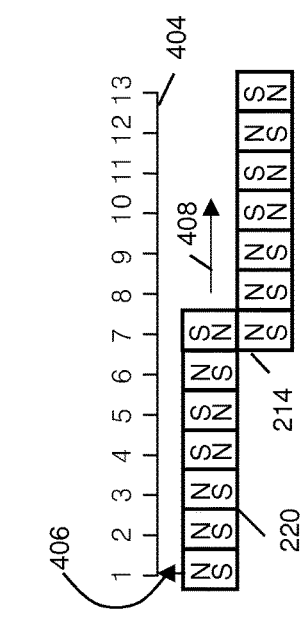

FIG. 4A and FIG. 4B illustrate the normal force between variably coded magnet structures for sliding offsets shown in FIGS. 3A-3N. FIG. 4A depicts the sliding action shown in FIGS. 3A-3N in a single diagram. In FIG. 4A magnet structure 214 is stationary while magnet structure 220 is moved across the top of magnet structure 214 in direction 408 according to scale 404. Magnet structure 220 is shown at position 1 according to indicating pointer 406, which moves with the left magnet of structure 220. As magnet structure 220 is moved from left to right, the total attraction and repelling forces are determined and plotted in the graph of FIG. 4B.

FIG. 4B shows a graph of the normal (perpendicular) magnetic forces between the two magnet structures as a function of position of the magnet structure 220 relative to magnet structure 214. The plot of FIG. 4B summarizes the results of FIGS. 3A-3N. The total normal force 402 acting on all magnets alternates between a value of −1, and 0, indicating a repelling force equal to a single magnet pair acting across the interface boundary or neutral force, to a force of +7 indicating the force of all seven magnet pairs acting in attraction. Note that a movement of one magnet width from position 7 to position 6 changes the force from 7 to 0. One more step to position 5 results in net repelling force of −1. In contrast, note the performance of uniformly coded 7 length magnet structures as shown in FIGS. 5A and 5B.

Figure 5B:
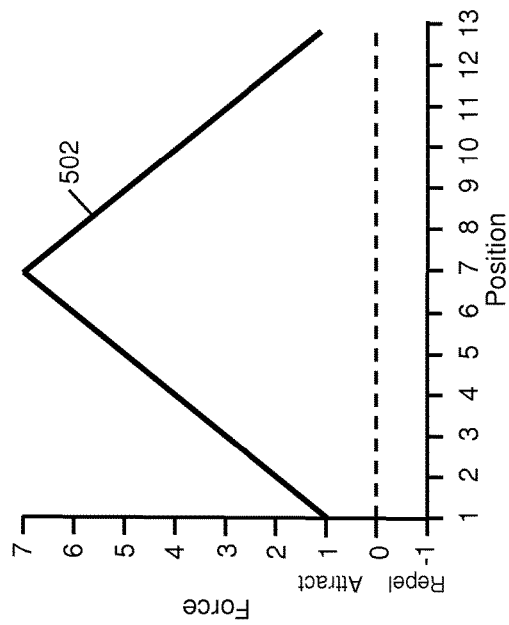
FIG. 5A and FIG. 5B show the normal force produced by a pair of 7 length uniformly coded magnet structures each coded to emulate a single magnet.
Figure 5A:
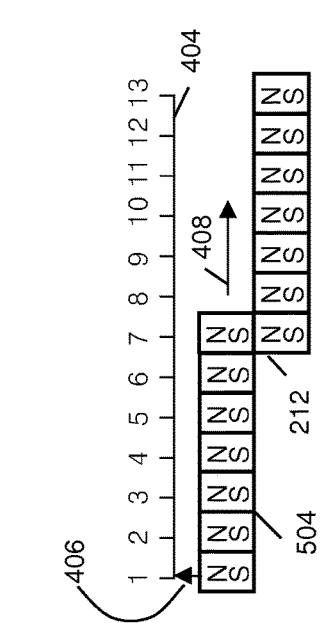

FIG. 5A and FIG. 5B show the normal force produced by a pair of 7 length uniformly coded magnet structures. FIG. 5A depicts the sliding action of the uniformly coded magnet pairs in the manner of FIG. 4A showing the base structure, complementary structure, scale, pointer, and sliding direction. FIG. 5B shows the net normal force 502 as a function of position of structure 504. Note that the force begins at 1 and increments by one for each incremental position to a maximum of 7 and then decreases again. The value does not reach zero or go negative for the overlapping range shown.

Thus, one can appreciate by comparing the performance of FIG. 4B with FIG. 5B that the coded magnet structure pair 214 and 220 may have a much more precise lock-in performance at the alignment position than the uniformly coded structure pair 212 and 504. For example, a disturbance that overcomes half the magnetic force would deviate FIG. 4B by only a half magnet position, whereas, the same disturbance would deflect the structure of FIG. 5B by half of the width of the whole magnet structure. In addition, note the coded magnet structure of FIG. 4B indicates misalignments (positions 1-6 and 8-13) by zero attraction or even repelling forces; whereas the uniformly coded structure of FIG. 5B always attracts. It should be noted that both the variably coded and uniformly coded magnet structures require a holding force since at least one magnet of the structures oriented unnaturally.

The attraction functions of FIG. 4B, FIG. 5B and others in this disclosure are idealized, but illustrate the main principle and primary performance. The curves show the performance assuming equal magnet size, shape, and strength and equal distance between corresponding magnets. For simplicity, the plots only show discrete integer positions and interpolate linearly. Actual force values may vary from the graph due to various factors such as diagonal coupling of adjacent magnets, magnet shape, spacing between magnets, properties of magnetic materials, etc. The curves also assume equal attract and repel forces for equal distances. Such forces may vary considerably and may not be equal depending on magnet material and field strengths. High coercive force materials typically perform well in this regard.

Comparing the variably coded structure of FIG. 4A with the uniformly coded structure of FIG. 5A, one may note that the normal force characteristic as a function of position FIG. 4B for the variably coded magnet structure has a single maximum peak substantially equal in strength to the function (FIG. 5B) for the uniformly coded structure; however the width of the peak for the variably coded magnet structure is less than the width of the peak of the uniformly coded magnet structure, often less than half. The width of the peak may be measured at any convenient level, for example half of the peak strength. The width of the peak in FIG. 4B can be seen to be substantially equal to the width of a peak for a single magnet. Substantially in the context of this paragraph means in view of the considerations of the previous paragraph.

As mentioned earlier, this invention may be used with any magnet, whether permanent, electromagnet, or even with electric fields, however, for embodiments employing permanent magnets, the magnetic materials of interest may include, but are not limited to: Neodymium-Iron-Boron and related materials, Samarium Cobalt, Alnico, and Ceramic ferrites. Neodymium Iron Boron may refer to the entire range of rare earth iron boron materials. One important subset is based on the chemical formula $R_2Fe_{14}B$, where R is Nd, Ce, or Pr. The magnet material may include mixtures of the different rare earth elements. Numerous methods of manufacture are known, each yielding different magnetic properties. Samarium Cobalt, Alnico and ceramic ferrites have been known longer and can also yield magnets suitable for use with the present invention. New materials and variations of the present materials are expected to be developed that may also be used with the present invention.

Codes for use in constructing coded magnet structures may include a number of codes known to mathematics and often applied to subjects such as communication theory, radar and other technologies. A few codes are illustrated and exemplified herein, but many others may be equally applicable. Several codes exemplified herein include Barker codes, Kasami Codes, LFSR sequences, Walsh codes, Golomb ruler codes, and Costas arrays. Information on these codes is, at this time abundantly available on the World Wide Web and in the technical literature. Articles from the site Wikipedia® have been printed and incorporated herein by reference. Thus the articles "Barker Codes" Wikipedia, 2 Aug. 2008, "Linear Feedback Shift Register", Wikipedia, 11 Nov. 2008, "Kasami Code", Wikipedka, 11 Jun. 2008, "Walsh code", Wikipedia, 17 Sep. 2008, "Golomb Ruler", 4 Nov. 2008, and "Costas Array", Wikipedia 7 Oct. 2008 are incorporated herein by reference in their entirety.

The examples so far in FIG. 3A-FIG. 3N, FIG. 4A, and FIG. 4B have used the Barker 7 code to illustrate the principles of the invention. Barker codes have been found to exist in lengths up to 13. Table 1 shows Barker codes up to length 13. Additional Barker codes may be generated by cyclic shifts (register rotations) or negative polarity (multiply by −1) transformations of the codes of Table 1. The technical literature includes Barker-like codes of even greater length. Barker codes offer a peak force equal to the length and a maximum misaligned force of 1 or −1. Thus, the ratio of peak to maximum misaligned force is length/1 or −length/1.

TABLE 1

Barker Codes

| Length | Codes | |
| --- | --- | --- |
| 2 | +1 −1 | +1 +1 |
| 3 | +1 +1 −1 | |
| 4 | +1 −1 +1 +1 | +1 −1 −1 −1 |
| 5 | +1 +1 +1 −1 +1 | |
| 7 | +1 +1 +1 −1 −1 +1 −1 | |
| 11 | +1 +1 +1 −1 −1 −1 +1 −1 −1 +1 −1 | |
| 13 | +1 +1 +1 +1 +1 −1 −1 +1 +1 −1 +1 −1 +1 | |

Numerous other codes are known in the literature for low autocorrelation when misaligned and may be used for magnet structure definition as illustrated with the Barker 7 code. Such codes include, but are not limited to maximal length PN sequences, Kasami codes, Golomb ruler codes and others. Codes with low non-aligned autocorrelation offer the precision lock at the alignment point as shown in FIG. 4B.

Figure 6B:
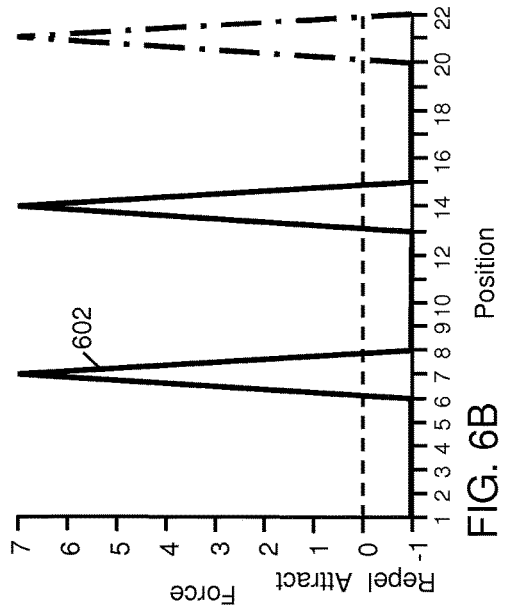
FIG. 6A and FIG. 6B show a cyclic implementation of a Barker 7 code.

Pseudo Noise (PN) and noise sequences also offer codes with low non-aligned autocorrelation. Most generally a noise sequence or pseudo-noise sequence is a sequence of 1 and −1 values that is generated by a true random process, such as a noise diode or other natural source, or is numerically generated in a deterministic (non random) process that has statistical properties much like natural random processes. Thus, many true random and pseudo random process may generate suitable codes for use with the present invention. Random processes, however will likely have random variations in the sidelobe amplitude i.e., non aligned force as a function of distance from alignment; whereas, Barker codes and others may have a constant amplitude when used as cyclic codes (FIG. 6B). One such family is maximal length PN codes generated by linear feedback shift registers (LFSR). LFSR codes offer a family of very long codes with a constant low level non-aligned cyclic autocorrelation. The codes come in lengths of powers of two minus one and several different codes of the same length are generally available for the longer lengths. LFSR codes offer codes in much longer lengths than are available with Barker codes. Table 2 summarizes the properties for a few of the shorter lengths. Extensive data on LFSR codes is available in the literature.

TABLE 2

LFSR Sequences

| Number of Stages | Length of sequences | Number of Sequences | Example feedback |
| --- | --- | --- | --- |
| 2 | 3 | 1 | 1, 2 |
| 3 | 7 | 2 | 2, 3 |
| 4 | 15 | 2 | 3, 4 |
| 5 | 31 | 6 | 3, 5 |
| 6 | 63 | 6 | 5, 6 |
| 7 | 127 | 18 | 6, 7 |
| 8 | 255 | 16 | 4, 5, 6, 8 |
| 9 | 511 | 48 | 5, 9 |
| 10 | 1023 | 60 | 7, 10 |

The literature for LFSR sequences and related sequences such as Gold and Kasami often uses a 0, 1 notation and related mathematics. The two states 0, 1 may be mapped to the two states −1, +1 for use with magnet polarities. An exemplary LFSR sequence for a length 4 shift register starting at 1,1,1,1 results in the feedback sequence: 000100110101111, which may be mapped to: −1, −1, −1, +1, −1, −1, +1, +1, −1, +1, −1, +1, +1, +1, +1. Alternatively, the opposite polarities may be used or a cyclic shift may be used.

Code families also exist that offer a set of codes that may act as a unique identifier or key, requiring a matching part to operate the device. Kasami codes and other codes can achieve keyed operation by offering a set of codes with low cross correlation in addition to low autocorrelation. Low cross correlation for any non-aligned offset means that one code of the set will not match and thus not lock with a structure built according to the another code in the set. For example, two structures A and A*, based on code A and the complementary code A*, will slide and lock at the precision lock point. Two structures B and B* from the set of low cross correlation codes will also slide and lock together at the precision alignment point. However, code A will slide with low attraction at any point but will not lock with code B* because of the low cross correlation properties of the code. Thus, the code can act like a key that will only achieve lock when matched with a like (complementary) pattern.

Kasami sequences are binary sequences of length $2^N$ where N is an even integer. Kasami sequences have low cross-correlation values approaching the Welch lower bound for all time shifts and may be used as cyclic codes. There are two classes of Kasami sequences—the small set and the large set.

The process of generating a Kasami sequence starts by generating a maximum length sequence $a_n$, where n=1 ... $2^N-1$. Maximum length sequences are cyclic sequences so $a_n$ is repeated periodically for n larger than $2^N-1$. Next, we generate another sequence $b_n$ by generating a decimated sequence of $a_n$ at a period of $q=2^{N/2}+1$, i.e., by taking every $q^{th}$ bit of $a_n$. We generate $b_n$ by repeating the decimated sequence q times to form a sequence of length $2^N-1$. We then cyclically shift $b_n$ and add to $a_n$ for the remaining $2^N-2$ non repeatable shifts. The Kasami set of codes comprises $a_n$, $a_n+b_n$, and the cyclically shifted $a_n+(\text{shift } b_n)$ sequences. This set has $2^{N/2}$ different sequences. A first coded structure may be based on any one of the different sequences and a complementary structure may be the equal polarity or negative polarity of the first coded structure, depending on whether repelling or attracting force is desired. Neither the first coded structure nor the complementary structure will find strong attraction with any of the other codes in the $2^{N/2}$ different sequences. An exemplary 15 length Kasami small set of four sequences is given in Table 3 below. The 0,1 notation may be transformed to −1,+1 as described above. Cyclic shifts and opposite polarity codes may be used as well.

TABLE 3

Exemplary Kasami small set sequences.
Sequence

| K1 | 0 | 0 | 0 | 1 | 0 | 0 | 1 | 1 | 0 | 1 | 0 | 1 | 1 | 1 | 1 |
|---|---|---|---|---|---|---|---|---|---|---|---|---|---|---|---|
| K2 | 0 | 1 | 1 | 1 | 1 | 1 | 1 | 0 | 1 | 1 | 1 | 0 | 1 | 0 | 0 |
| K3 | 1 | 1 | 0 | 0 | 1 | 0 | 0 | 0 | 0 | 1 | 1 | 0 | 0 | 0 | 1 |
| K4 | 1 | 0 | 1 | 0 | 0 | 1 | 0 | 1 | 1 | 0 | 0 | 0 | 0 | 0 | 0 |

Other codes, such as Walsh codes and Hadamard codes, offer sets of codes with perfectly zero cross correlation across the set of codes when aligned, but possibly high correlation performance when misaligned. Such codes can provide the unique key function when combined with mechanical constraints that insure alignment. Exemplary Walsh codes are as follows:

Denote W(k, n) as Walsh code k in n-length Walsh matrix. It means the k-th row of Hadamard matrix H(m), where n=2m, m an integer. Here k could be 0, 1, . . . , n−1. A few Walsh codes are shown in Table 4.

TABLE 4

Walsh Codes

| Walsh Code | Code |
|---|---|
| W(0, 1) | 1 |
| W(0, 2) | 1, 1 |
| W(1, 2) | 1, −1 |
| W(0, 4) | 1, 1, 1, 1 |
| W(1, 4) | 1, −1, 1, −1 |
| W(2, 4) | 1, 1, −1, −1 |
| W(3, 4) | 1, −1, −1, 1 |
| W(0, 8) | 1, 1, 1, 1, 1, 1, 1, 1 |
| W(1, 8) | 1, −1, 1, −1, 1, −1, 1, −1 |
| W(2, 8) | 1, 1, −1, −1, 1, 1, −1, −1 |
| W(3, 8) | 1, −1, −1, 1, 1, −1, −1, 1 |
| W(4, 8) | 1, 1, 1, 1, −1, −1, −1, −1 |
| W(5, 8) | 1, −1, 1, −1, −1, 1, −1, 1 |
| W(6, 8) | 1, 1, −1, −1, −1, −1, 1, 1 |
| W(7, 8) | 1, −1, −1, 1, −1, 1, 1, −1 |

In use, Walsh codes of the same length would be used as a set of codes that have zero interaction with one another, i.e., Walsh code W(0,8) will not attract or repel any of the other codes of length 8 when aligned. Alignment should be assured by mechanical constraints because off alignment attraction can be great.

Codes may be employed as cyclic codes or non-cyclic codes. Cyclic codes are codes that may repetitively follow another code, typically immediately following with the next step after the end of the last code. Such codes may also be referred to as wrapping or wraparound codes. Non-cyclic codes are typically used singly or possibly used repetitively but in isolation from adjacent codes. The Barker 7 code example of FIG. 4A and FIG. 4B is a non-cyclic use of the code; whereas the example of FIG. 6A and FIG. 6B is a cyclic use of the same code.

Figure 6A:
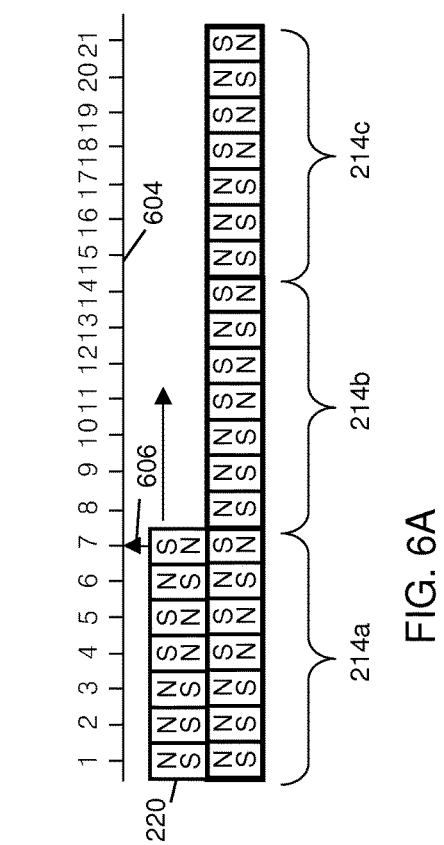

FIG. 6A and FIG. 6B show a cyclic implementation of a Barker 7 code. Referring to FIG. 6A, the base magnet structure comprise three repeated Barker 7 coded magnet structures 214a, 214b, and 214c, where additional Barker 7 coded magnet structures not shown precede and follow the three repeated Barker 7 coded magnet structure 214a, 214b, and 214c. Each Barker code portion 214a, 214b, or 214c, as well as 220 may be termed a code modulo. The span across a single modulo 214a is a modulo span for the magnet structure. Pointer 606 indicates the position of structure 220 with reference to scale 604. The complementary magnet structure 220 slides along the base magnet structure, and the net force is recorded for each position. As shown, complementary magnet structure 220 is located at relative alignment position 7, which corresponds to the first peak force spike in FIG. 6B.

FIG. 6B shows the normal magnetic force 602 as a function of position for FIG. 6A. Note that the total force shows a peak of 7 each time the sliding magnet structure 220 aligns with the underlying Barker 7 pattern in a similar manner as previously described for FIG. 4B. Note however in FIG. 6B, the misaligned positions (positions 1-6 for example) show a constant −1 indicating a repelling force of one magnet pair. In contrast, FIG. 4B alternates between zero and −1 in the misaligned region, where the alternating values are the result of their being relative positions of non-cyclic structures where magnets do not have a corresponding magnet with which to pair up In magnet structures, cyclic codes may be placed in repeating patterns to form longer patterns or may cycle back to the beginning of the code as in a circle or racetrack pattern. As such, cyclic codes are useful on cylindrically or spherically shaped objects.

It may be observed in the embodiment of FIG. 6A that the base magnet structure 214a-214c may be of differing length than the complementary structure 220. Also that the base magnet structure 214a-214c may comprise repeating segments 214a wherein each repeating segment comprises a non-repeating sequence of magnet polarities. It may be further appreciated that the complementary structure may also comprise repeating segments of sequences of non repeating magnet polarities.

Figure 7B:
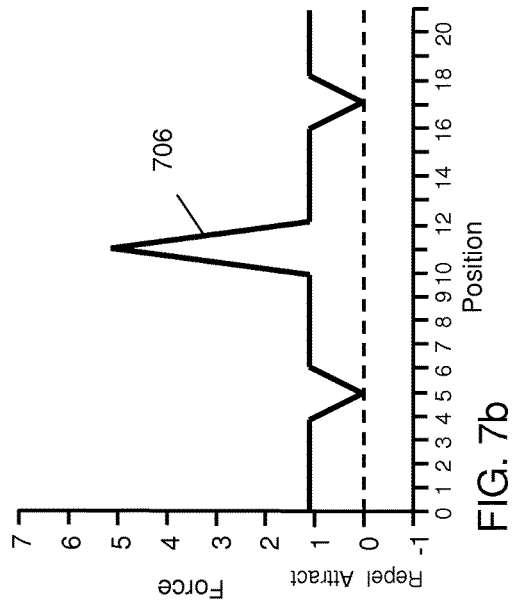
FIG. 7A and FIG. 7B show two magnet structures coded using a Golomb ruler code.
Figure 7A:
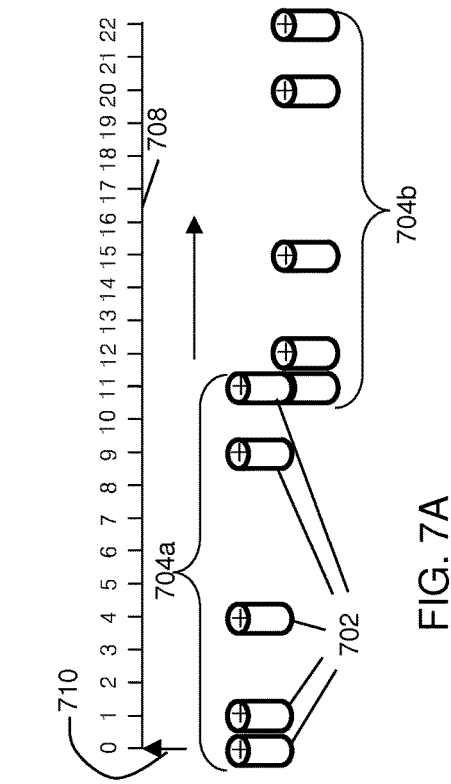

FIG. 7A and FIG. 7B show two magnet structures 704a, 704b coded using a Golomb ruler code. A Golomb ruler is a set of marks on a ruler such that no two marks are the same distance from any other two marks. Two identical Golomb rulers may be slid by one another with only one mark at a time aligning with the other ruler except at the sliding point where all marks align. Referring to FIG. 7A, magnets 702 of structure 704a are placed at positions 0, 1, 4, 9 and 11, where all magnets are oriented in the same polarity direction. Pointer 710 indicates the position of cluster 704a against scale 708. The stationary base structure 704b uses the same relative magnet positioning pattern shifted to begin at position 11.

FIG. 7B shows the normal (perpendicular) magnetic force 706 as a function of the sliding position between the two structures 704a and 704b of FIG. 7A. Note that only one magnet pair lines up between the two structures for any sliding position except at position 5 and 17, where no magnet pairs line up, and at position 11, where all five magnet pairs line up. Because all magnets are in the same direction, the misaligned force value is 1, indicating attraction. Alternatively, some of the magnet polarities may be reversed according to a second code or pattern (with a complementary pattern on the complementary magnet structure) causing the misaligned force to alternate between 1 and −1, but not to exceed a magnitude of 1. The aligned force would remain at 5 if both magnet structures have the same polarity pattern. It may also be appreciated that a magnet substructure spaced according to a Golomb ruler code may be paired with a passive (unmagnetized) ferromagnetic substructure of the same Golomb ruler pattern and the combined structure would have essentially the same force function as if both substructures were magnets. For example, if the top magnet structure of FIG. 7A were a sequence of magnets and the bottom structure were a sequence of soft iron bars, a maximum attraction value of 5 would occur at alignment, the offset attraction would be a maximum of 1, and the system forces would be described by the graph as shown in FIG. 7B. Table 5 shows a number of exemplary Golomb ruler codes. Golomb rulers of higher orders up to 24 can be found in the literature.

TABLE 5

Golomb Ruler Codes

| order | length | marks |
|---|---|---|
| 1 | 0 | 0 |
| 2 | 1 | 0 1 |
| 3 | 3 | 0 1 3 |
| 4 | 6 | 0 1 4 6 |
| 5 | 11 | 0 1 4 9 11 |
|  |  | 0 2 7 8 11 |
| 6 | 17 | 0 1 4 10 12 17 |
|  |  | 0 1 4 10 15 17 |
|  |  | 0 1 8 11 13 17 |
|  |  | 0 1 8 12 14 17 |
| 7 | 25 | 0 1 4 10 18 23 25 |
|  |  | 0 1 7 11 20 23 25 |
|  |  | 0 1 11 16 19 23 25 |
|  |  | 0 2 3 10 16 21 25 |
|  |  | 0 2 7 13 21 22 25 |

Golomb ruler codes offer a force ratio according to the order of the code, e.g., for the order 5 code of FIG. 7A, the aligned force to the highest misaligned force is 5:1. Where the magnets are of differing polarities, the ratio may be positive or negative, depending on the shift value.

Two Dimensional Magnet Structures

The one dimensional magnet structures described so far serve to illustrate the basic concepts, however, it is often desirable to distribute magnets over a two dimensional area rather than in a single line. Several approaches are available. In one approach, known two dimensional codes may be used. In another approach, two dimensional codes may be generated from one dimensional codes. In still another approach, two dimensional codes may be found by numerical methods.

FIG. 8A-FIG. 8E show various exemplary two dimensional code structures in accordance with the present invention. The magnet structures of FIG. 2A through FIG. 7A are shown and described with respect to relative movement in a single dimension, i.e., along the interface boundary in the direction of the code. Some applications utilize such magnet structures by mechanically constraining the relative motion to the single degree of freedom being along the interface boundary in the direction of the code. Other applications allow movement perpendicular to the direction of the code along the interface boundary, or both along and perpendicular to the direction of the code, offering two degrees of freedom. Still other applications may allow rotation and may be mechanically constrained to only rotate around a specified axis, thus having a single degree of freedom (with respect to movement along the interface boundary.) Other applications may allow two lateral degrees of freedom with rotation adding a third degree of freedom. Most applications also operate in the spacing dimension to attract or repel, hold or release. The spacing dimension is usually not a dimension of interest with respect to the code; however, some applications may pay particular attention to the spacing dimension as another degree of freedom, potentially adding tilt rotations for six degrees of freedom. For applications allowing two lateral degrees of freedom special codes may be used that place multiple magnets in two dimensions along the interface boundary.

Costas arrays are one example of a known two dimensional code. Costas Arrays may be considered the two dimensional analog of the one dimensional Golomb rulers. Lists of known Costas arrays are available in the literature. In addition, Welch-Costas arrays may be generated using the Welch technique. Alternatively, Costas arrays may be generated using the Lempel-Golomb technique.

FIG. 8A shows an exemplary Costas array. Referring to FIG. 8A, the grid 802 shows coordinate positions. The "+" 804 indicates a location containing a magnet, blank 806 in a grid location indicates no magnet. Each column contains a single magnet, thus the array of FIG. 8A may be specified as {2,1,3,4}, specifying the row number in each successive column that contains a magnet. Additional known arrays up to order 5 (five magnets in a 5×5 grid) are as follows, where N is the order:

N=1
{1}
N=2
{1,2} {2,1}
N=3
{1,3,2} {2,1,3} {2,3,1} {3,1,2}
N=4
{1,2,4,3} {1,3,4,2} {1,4,2,3} {2,1,3,4} {2,3,1,4} {2,4,3,1}
{3,1,2,4} {3,2,4,1} {3,4,2,1} {4,1,3,2} {4,2,1,3} {4,3,1,2}
N=5
{1,3,4,2,5} {1,4,2,3,5} {1,4,3,5,2} {1,4,5,3,2} {1,5,3,2,4}
{1,5,4,2,3} {2,1,4,5,3} {2,1,5,3,4} {2,3,1,5,4} {2,3,5,1,4}
{2,3,5,4,1} {2,4,1,5,3} {2,4,3,1,5} {2,5,1,3,4} {2,5,3,4,1}
{2,5,4,1,3} {3,1,2,5,4} {3,1,4,5,2} {3,1,5,2,4} {3,2,4,5,1}
{3,4,2,1,5} {3,5,1,4,2} {3,5,2,1,4} {3,5,4,1,2} {4,1,2,5,3}
{4,1,3,2,5} {4,1,5,3,2} {4,2,3,5,1} {4,2,5,1,3} {4,3,1,2,5}
{4,3,1,5,2} {4,3,5,1,2} {4,5,1,3,2} {4,5,2,1,3} {5,1,2,4,3}
{5,1,3,4,2} {5,2,1,3,4} {5,2,3,1,4} {5,2,4,3,1} {5,3,2,4,1}

Additional Costas arrays may be formed by flipping the array (reversing the order) vertically for a first additional array and by flipping horizontally for a second additional array and by transposing (exchanging row and column numbers) for a third additional array. Costas array magnet structures may be further modified by reversing or not reversing the polarity of each successive magnet according to a second code or pattern as previously described with respect to Golomb ruler codes.

FIG. 8B illustrates the generation of a two dimensional magnet structure by replicating a one dimensional code pattern. Referring to FIG. 8B, each row is a linear magnet sequence arranged according to the Barker 7 code. N rows are stacked in parallel to form a 7×N array 808. The 7×N array 808 shown will have Barker 7 code properties (FIG. 4B) when sliding left to right and simple magnet properties (FIG. 5B) when sliding up and down (when paired with a complementary structure). Both left and right movement and up and down movement as shown on the page in a plan view as shown in FIG. 8B or as depicted in other figures may also be referred to as lateral movement.

FIG. 8C illustrates a 7×7 magnet structure with successively rotated Barker 7 codes in each successive row. Referring to FIG. 8C, the 7×7 magnet structure 808a is formed by varying the code pattern from row to row. The top row is the Barker 7 pattern 214. The next row is the Barker pattern shifted left with the value that is shifted out of the left most position shifted into the right most position. This operation is often termed rotation with respect to digital shift register operations. Thus the magnet pattern for each successive row is a rotate 1 position left version of the row immediately above. It may be appreciated that the horizontal performance of the structure of FIG. 8C remains similar to the Barker 7 pattern; whereas; the vertical pattern is no longer the simple uniformly coded pattern of FIG. 8B. In fact, the vertical pattern now comprises various rotations of the Barker 7 pattern.

FIG. 8D illustrates an exemplary slide-lock pattern based on FIG. 8C. Referring to FIG. 8D, a 19×7 two-way (right and left) slide lock code 810 is produced by starting with a copy of the 7×7 code 808a and then by adding the leftmost 6 columns (808c) of the 7×7 code 808a to the right of the code 808a and the rightmost 6 columns (808d) of the 7×7 code 808a to the left of the code 808a. As such, as the mirror image 808b of structure 808a slides from side-to-side, all 49 magnets of 808b are in contact with the base structure 810 producing the force curve of FIG. 6B from positions 1 to 13, with the magnitude scale multiplied by seven due to the seven parallel rows of magnets. Thus, when structure 808b is aligned with the portion 808a of structure 810 corresponding to 808b's mirror image, the two structures will lock with an attractive force of 49, while when the structure 808b is slid left or right to any other position, the two structures 808b, 810 will produce a repel force of −7. If structure 808b were to be replaced with a second structure having the same coding as portion 808a of the structure 810, then when aligned the two structures will repel with a force of −49, while when the second structure 808a is slid left or right to any other position, the two structures 808b, 810 will produce an attractive force of 7.

FIG. 8E illustrates an exemplary hover code. Referring to FIG. 8E the hover code 806 is produced by placing two code modulos of 808a side-by-side and then removing the first and last columns of the resulting structure, i.e., the right most six columns of 808a (808c) are placed to the left of the left most six columns of a second copy of 808a, (808d). As such, a mirror image 808b can be moved across the resulting magnetic field emission structure 812 from one end to the other end and at all times achieve a spatial force function of −7, indicating a repelling force, potentially allowing the structure 808b to hover over the base 812.

Figures 9A, 9B, 9C, 9D, 9E, 9F, 9G:
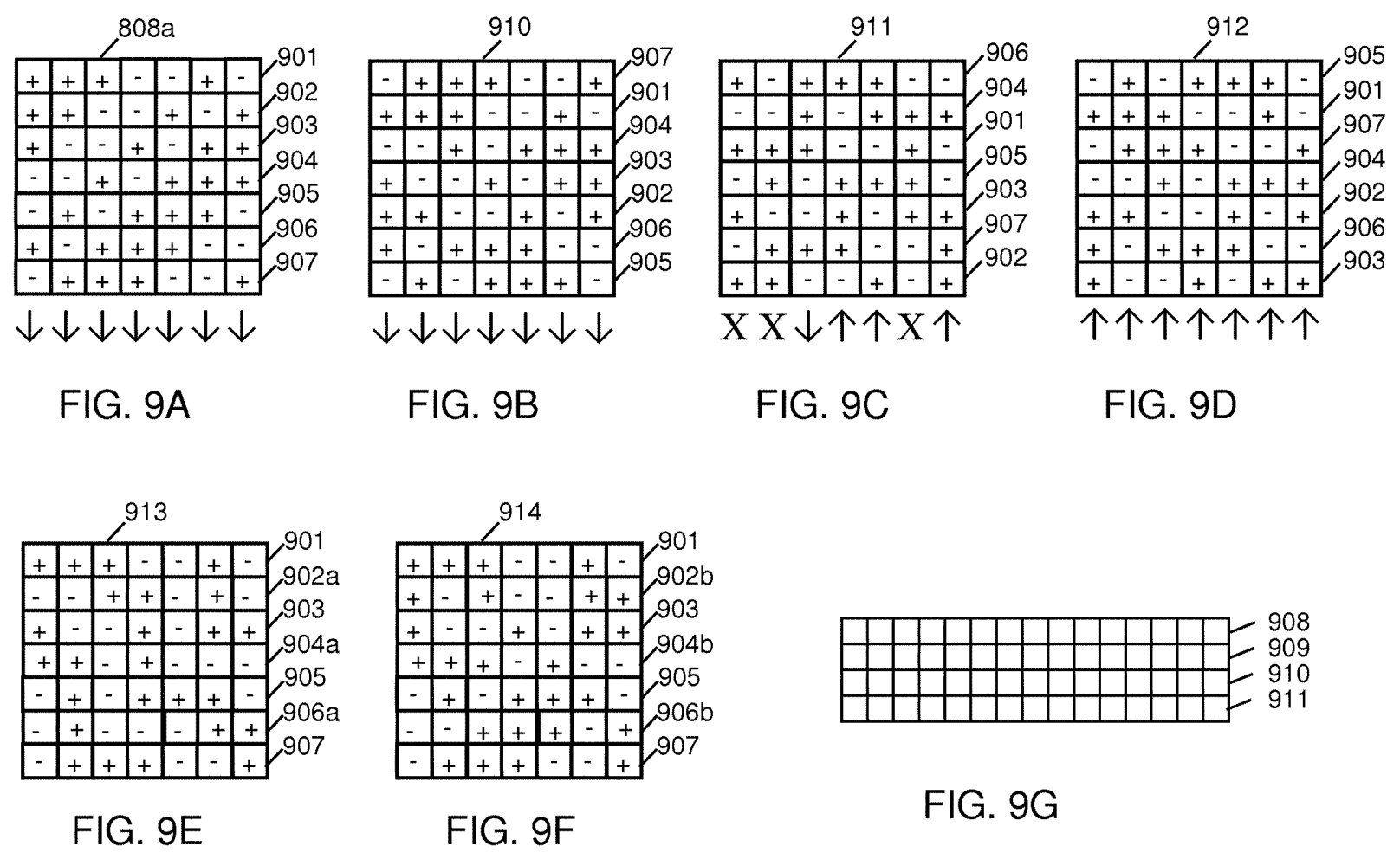

FIG. 9A-FIG. 9F illustrate additional two dimensional codes derived from the single dimension Barker 7 code. Referring to FIG. 9A, The code 808a of FIG. 8C is shown with each row identified by a reference number in sequence 901-907. Also note that each column is a rotation of a Barker 7 code running downward as indicated by the respective down arrows along the bottom of the figure. FIG. 9B illustrates a first variation 910 generated by reordering the rows of FIG. 9A. Observe that the columns are also rotations of Barker 7 codes running in the downward direction, just as in FIG. 9A, but shifted. FIG. 9C illustrates a second variation 911 generated by reordering the rows of FIG. 9A. In FIG. 9C, not all columns form Barker 7 codes (indicated by X). One column is a Barker 7 code running downward, indicated by the down arrow. Three columns are a Barker 7 codes running upward, indicated by the up arrows. FIG. 9D illustrates a third variation 912 generated by reordering the rows of FIG. 9A. In FIG. 9D, all columns form Barker 7 codes running upward, as indicated by the up arrows.

FIG. 9E illustrates a fourth alternative 913 where the of the rows of 808a are multiplied by −1, i.e., reversed in polarity. Row 902A, 904A and 906a are reversed in polarity from rows 902, 904, and 906 respectively. Note that the code of 808a has 28 "+" magnets and 21 "−" magnets; whereas, alternative 913 has 25 "+" magnets and 24 "−" magnets—a nearly equal number. Thus, the far field magnetic field from structure 913 will nearly cancel to zero, which can be valuable in some applications. FIG. 9F illustrates a fifth alternative 914 where three of the rows are reversed in direction. Rows 902b, 904b and 906b are reversed from 902, 904, and 906 respectively.

FIG. 9G illustrates a further alternative using four codes of low mutual cross correlation. Generally, two dimensional codes may be generated by combining multiple single dimensional codes. In particular, the single dimensional codes may be selected from sets of codes with known low mutual cross correlation. Gold codes and Kasami codes are two examples of such codes, however, other code sets may also be used. Referring to FIG. 9G four rows 908-911 of 15 length Kasami codes are used in the example. Because the rows have low cross correlation and low autocorrelation, shifts either laterally or up and down (as viewed on the page) or both will result in low magnetic force.

Additional magnet structures having low magnetic force with a first magnet structure generated from a set of low cross correlation codes may be generated by reversing the polarity of the magnets or by using different subsets of the set of available codes. For example, rows 908 and 909 may form a first magnet structure and rows 910 and 911 may form a second magnet structure. The complementary magnet structure of the first magnet structure will have low force reaction to the second magnet structure, and conversely, the complementary magnet structure of the second magnet structure will have a low force reaction to the first magnet structure. Alternatively, if lateral or up and down movement is restricted, an additional low interaction magnet structure may be generated by shifting (rotating) the codes or changing the order of the rows. Movement may be restricted by such mechanical features as alignment pins, channels, stops, container walls or other mechanical limits.

More generally FIG. 9A-FIG. 9G illustrate that two dimensional codes may be generated from one dimensional codes by assembling successive rows of one dimensional codes and that multiple different two dimensional codes may be generated by varying each successive row by operations including but not limited to changing the order, shifting the position, reversing the direction, and/or reversing the polarity.

FIG. 10A and FIG. 10B depict a magnetic field emission structure 1002 comprising nine magnets in three parallel columns of three magnets each, with the center column shifted by one half position. Referring to FIG. 10A the magnetic field emission structure 1002 is a magnet structure of nine magnets showing the end of each magnet with the polarity marked on each magnet. The positions of the magnets are shown against a coordinate grid 1004. The center column of magnets forms a linear sequence of three magnets each centered on integer grid positions. Two additional columns of magnets are placed on each side of the center column and on adjacent integer column positions, but the row coordinates are offset by one half of a grid position. More particularly, the structure comprises nine magnets at relative coordinates of +1(0,0), −1(0,1), +1(0,2), −1(1,0.5), +1(1,1.5), −1(1,2.5), +1(2,0), −1(2,1), +1(2,2), where within the notation s(x,y), "s" indicates the magnet strength and polarity and "(x,y)" indicates x and y coordinates of the center of the magnet relative to a reference position (0,0). The magnet structure, according to the above definition is then placed such that magnet +1(0,0) is placed at location (9,9.5) in the coordinate frame 1004 of FIG. 10A.

When paired with a complementary structure, and the force is observed for various rotations of the two structures around the center coordinate at (10, 11), the structure 1002 has a peak spatial force when (substantially) aligned and has relatively minor side lobe strength at any rotation off alignment.

FIG. 10B depicts the spatial force function 1006 of the magnetic field emission structure 1002 with respect to lateral translations of the complementary magnetic field emission structure. The graph 1006 of FIG. 10B shows the force for lateral translations of the two structures with no rotation. The peak force 1008 occurs when substantially aligned.

FIG. 11A-FIG. 11C depict an exemplary code 1102 intended to produce a magnetic field emission structure having a first stronger lock when aligned with its mirror image magnetic field emission structure and a second weaker lock when rotated 90° relative to its mirror image magnetic field emission structure. FIG. 11A shows magnet structure 1102 is against a coordinate grid 1104. The magnet structure 1102 of FIG. 11A comprises magnets at positions: −1(3,7), −1(4,5), −1(4,7), +1(5,3), +1(5,7), −1(5,11), +1(6, 5), −1(6,9), +1(7,3), −1(7,7), +1(7,11), −1(8,5), −1(8,9), +1(9,3), −1(9,7), +1(9,11), +1(10,5), −1(10,9)+1(11,7). Additional field emission structures may be derived by reversing the direction of the x coordinate or by reversing the direction of the y coordinate or by transposing the x and y coordinates.

FIG. 11B depicts spatial force function 1106 of a magnetic field emission structure 1102 interacting with its mirror image (complementary) magnetic field emission structure. The peak occurs when substantially aligned.

FIG. 11C depicts the spatial force function 1108 of magnetic field emission structure 1102 interacting with its mirror magnetic field emission structure after being rotated 90°. FIG. 11C shows the force function for lateral translations without further rotation. The peak occurs when substantially aligned but one structure rotated 90°.

FIGS. 12A-12I depict the exemplary magnetic field emission structure 1102a and its mirror image magnetic field emission structure 1102b and the resulting spatial forces produced in accordance with their various alignments as they are twisted relative to each other, i.e., rotated around an axis perpendicular to the interface plane and through the center of the structures 1102a and 1102b. In FIG. 12A, the magnetic field emission structure 1102a and the mirror image magnetic field emission structure 1102b are aligned producing a peak spatial force. In FIG. 12B, the mirror image magnetic field emission structure 1102b is rotated clockwise slightly relative to the magnetic field emission structure 1102a and the attractive force reduces significantly. In FIG. 12C, the mirror image magnetic field emission structure 1102b is further rotated and the attractive force continues to decrease. In FIG. 12D, the mirror image magnetic field emission structure 1102b is still further rotated until the attractive force becomes very small, such that the two magnetic field emission structures are easily separated as shown in FIG. 12E. Given the two magnetic field emission structures held somewhat apart as in FIG. 12F, the structures can be moved closer and rotated towards alignment producing a small spatial force as in FIG. 12F. The spatial force increases as the two structures become more and more aligned in FIGS. 12G and 12H and a peak spatial force is achieved when aligned as in FIG. 12I. It should be noted that the direction of rotation was arbitrarily chosen and may be varied depending on the code employed. Additionally, the mirror image magnetic field emission structure 1102b is the mirror of magnetic field emission structure 1102a resulting in an attractive peak spatial force. The mirror image magnetic field emission structure 1102b could alternatively be coded such that when aligned with the magnetic field emission structure 1102a the peak spatial force would be a repelling force in which case the directions of the arrows used to indicate amplitude of the spatial force corresponding to the different alignments would be reversed such that the arrows faced away from each other.

Computer Search for Codes

Additional codes including polarity codes, ruler or spacing codes or combinations of ruler and polarity codes of one or two dimensions may be found by computer search. The computer search may be performed by randomly or pseudorandomly or otherwise generating candidate patterns, testing the properties of the patterns, and then selecting patterns that meet desired performance criteria. Exemplary performance criteria include, but are not limited to, peak force, maximum misaligned force, width of peak force function as measured at various offset displacements from the peak and as determined as a force ratio from the peak force, polarity of misaligned force, compactness of structure, performance of codes with sets of codes, or other criteria. The criteria may be applied differently for different degrees of freedom.

Additional codes may be found by allowing magnets to have different strengths, such as multiple strengths (e.g., 2, 3, 7, 12) or fractional strengths (e.g. ½, 1.7, 3.3).

In accordance with one embodiment, a desirable coded magnet structure generally has a non-regular pattern of magnet polarities and/or spacings. The non-regular pattern may include at least one adjacent pair of magnets with reversed polarities, e.g., +, −, or −, +, and at least one adjacent pair of magnets with the same polarities, e.g., +, + or −, −. Quite often code performance can be improved by having one or more additional adjacent magnet pairs with differing polarities or one or more additional adjacent magnet pairs with the same polarities. Alternatively, or in combination, the coded magnet structure may include magnets having at least two different spacings between adjacent magnets and may include additional different spacings between adjacent magnets. In some embodiments, the magnet structure may comprise regular or non-regular repeating subsets of non-regular patterns.

Exemplary Uses for Magnet Structures

FIG. 13A-FIG. 13D depict various exemplary mechanisms that can be used with field emission structures and exemplary tools utilizing field emission structures in accordance with the present invention. FIG. 13A depicts two magnetic field emission structures 1102a and 1102b. One of the magnetic field emission structures 1102b includes a turning mechanism 1300 that includes a tool insertion slot 1302. Both magnetic field emission structures include alignment marks 1304 along an axis 1303. A latch mechanism such as the hinged latch clip 1305a and latch knob 1305b may also be included preventing movement (particularly turning) of the magnetic field emission structures once aligned. Under one arrangement, a pivot mechanism (not shown) could be used to connect the two structures 1102a, 1102b at a pivot point such as at pivot location marks 1304 thereby allowing the two structures to be moved into or out of alignment via a circular motion about the pivot point (e.g., about the axis 1303).

FIG. 13B depicts a first circular magnetic field emission structure housing 1306 and a second circular magnetic field emission structure housing 1308 configured such that the first housing 1306 can be inserted into the second housing 1308. The second housing 1308 is attached to an alternative turning mechanism 1310 that is connected to a swivel mechanism 1312 that would normally be attached to some other object. Also shown is a lever 1313 that can be used to provide turning leverage.

FIG. 13C depicts an exemplary tool assembly 1314 including a drill head assembly 1316. The drill head assembly 1316 comprises a first housing 1306 and a drill bit 1318. The tool assembly 1314 also includes a drill head turning assembly 1320 comprising a second housing 1308. The first housing 1306 includes raised guides 1322 that are configured to slide into guide slots 1324 of the second housing 1308. The second housing 1308 includes a first rotating shaft 1326 used to turn the drill head assembly 1316. The second housing 1308 also includes a second rotating shaft 1328 used to align the first housing 1306 and the second housing 1308.

FIG. 13D depicts an exemplary clasp mechanism 1390 including a first part 1392 and a second part 1394. The first part 1392 includes a first housing 1308 supporting a first magnetic field emission structure. The second part 1394 includes a second housing 1306 used to support a second magnetic field emission structure. The second housing 1306 includes raised guides 1322 that are configured to slide into guide slots 1324 of the first housing 1308. The first housing 1308 is also associated with a magnetic field emission structure slip ring mechanism 1396 that can be turned to rotate the magnetic field emission structure of the first part 1392 so as to align or misalign the two magnetic field emission structures of the clasp mechanism 1390. Generally, all sorts of clasp mechanisms can be constructed in accordance with the present invention whereby a slip ring mechanism can be turned to cause the clasp mechanism to release. Such clasp mechanisms can be used as receptacle plugs, plumbing connectors, connectors involving piping for air, water, steam, or any compressible or incompressible fluid. The technology is also applicable to Bayonette Neil-Concelman (BNC) electronic connectors, Universal Serial Bus (USB) connectors, and most any other type of connector used for any purpose.

The gripping force described above can also be described as a mating force. As such, in certain electronics applications this ability to provide a precision mating force between two electronic parts or as part of a connection may correspond to a desired characteristic, for example, a desired impedance. Furthermore, the invention is applicable to inductive power coupling where a first magnetic field emission structure that is driven with AC will achieve inductive power coupling when aligned with a second magnetic field emission structure made of a series of solenoids whose coils are connected together with polarities according to the same code used to produce the first magnetic field emission structure. When not aligned, the fields will close on themselves since they are so close to each other in the driven magnetic field emission structure and thereby conserve power. Ordinary inductively coupled systems' pole pieces are rather large and cannot conserve their fields in this way since the air gap is so large.

FIG. 14A-FIG. 14E illustrate exemplary ring magnet structures based on linear codes. Referring to FIG. 14A, ring magnet structure 1402 comprises seven magnets arranged in a circular ring with the magnet axes perpendicular to the plane of the ring and the interface surface is parallel to the plane of the ring. The exemplary magnet polarity pattern or code shown in FIG. 14A is the Barker 7 code. One may observe the "+, +, +, −, −, +, −" pattern beginning with magnet 1404 and moving clockwise as indicated by arrow 1406. A further interesting feature of this configuration is that the pattern may be considered to then wrap on itself and effectively repeat indefinitely as one continues around the circle multiple times. Thus, one could use cyclic linear codes arranged in a circle to achieve cyclic code performance for rotational motion around the ring axis. The Barker 7 base pattern shown would be paired with a complementary ring magnet structure placed on top of the magnet structure face shown. As the complementary ring magnet structure is rotated, the force pattern can be seen to be equivalent to that of FIGS. 6A and 6B because the complementary magnet structure is always overlapping a head to tail Barker 7 cyclic code pattern.

FIG. 14A also illustrates exemplary optional mechanical restraints that may be used with ring magnet structures. In one embodiment, a central spindle 1424, alternatively referred to as a shaft or pin may be installed with the first magnet structure and a mating bearing or socket may be provided with the complementary magnet structure to constrain the motion to rotation only without lateral motion. The pin may be short so that the restraint is operative only when the magnet structures are in proximity and the pin is coupled to the socket. Alternatively, a shell 1426 or housing may be provided with the first magnet structure that mates with a circular plug surrounding the ring with the complementary magnet structure. See FIG. 13D for additional shell structures. The pin 1424 and/or shell 1426 may also be used to provide greater lateral load bearing capability for the assembly.

FIG. 14B shows a magnet structure based on the ring code 1402 of FIG. 14A with an additional magnet in the center. Magnet structure 1408 has an even number of magnets. At least two features of interest are modified by the addition of the magnet 1410 in the center. For rotation about the ring axis, one may note that the center magnet pair (in the base and in the complementary structure) remain aligned for all rotations. Thus, the center magnet pair add a constant attraction or repelling force. Thus, the graph of FIG. 6B could be shifted from a repelling force of −1 and attracting force of 7 to a repelling force of zero and an attracting force of 8. In other words, yielding a neutral force when not aligned. Note also that the central magnet pair may be any value, for example −3, yielding an equal magnitude repelling and attracting force of −4 and +4, respectively.

In a further alternative, a center magnet 1410 may be paired in the complementary structure with a non-magnetized ferromagnetic material, such as a magnetic iron or steel piece. The center magnet would then provide attraction, no matter which polarity is chosen for the center magnet.

A second feature of the center magnet of FIG. 14B is that for a value of −1 as shown, the total number of magnets in the positive direction is equal to the total number of magnets in the negative direction. Thus, in the far field, the magnetic field approaches zero, minimizing disturbances to such things as magnetic compasses and the like. More generally the total strength of magnets in one direction may be cancelled by the total strength of magnets in the opposite direction, regardless of the number of magnets. (For example, the center magnet may have any desired strength.)

FIG. 14C illustrates two concentric rings, each based on a linear cyclic code, resulting in magnet structure 1412. An inner ring 1402 is as shown in FIG. 14A, beginning with magnet 1404. An outer ring is also a Barker 7 code beginning with magnet 1414. Beginning the outer ring on the opposite side as the inner ring keeps the plusses and minuses somewhat laterally balanced.

FIG. 14D illustrates the two concentric rings of FIG. 14C wherein the outer ring magnets are the opposite polarity of adjacent inner ring magnets resulting in magnet structure 1416. The inner ring Barker 7 begins with magnet 1404. The outer ring Barker 7 is a negative Barker 7 beginning with magnet 1418. Each outer ring magnet is the opposite of the immediate clockwise inner ring adjacent magnet. Since the far field magnetic field is cancelled in adjacent pairs, the field decays as rapidly as possible from the equal and opposite magnet configuration. More generally, linear codes may be constructed of opposite polarity pairs to minimize far field magnetic effects.

FIG. 14E illustrates a Barker 7 inner ring and Barker 13 outer ring. The Barker 7 begins with magnet 1404 and the Barker 13 begins with magnet 1422. The result is composite ring magnet structure 1420.

Although Barker codes are shown in FIGS. 14A-14E, other codes may be uses as alternative codes or in combination with Barker codes, particularly in adjacent rings. Maximal Length PN codes or Kasami codes, for example, may form rings using a large number of magnets. One or two rings are shown, but any number of rings may be used. Although the ring structure and ring codes shown are particularly useful for rotational systems that are mechanically constrained to prevent lateral movement as may be provided by a central shaft or external sleeve, the rings may also be used where lateral position movement is permitted. It may be appreciated that a single ring, in particular, has only one or two points of intersection with another single ring when not aligned. Thus, non-aligned forces would be limited by this geometry in addition to code performance.

In one embodiment, the structures of FIG. 14A-14E may be used for a releasable magnetic attachment. The number and strength of component magnets may be selected as needed or desired to establish the magnetic attachment strength for a given application. The attachment strength is the total magnetic attraction when in the attachment configuration, i.e., when the component magnets of the magnet structure and complementary magnet structure are aligned and most or all magnet pairs are attracting. The number of magnets and code as well as additional magnets (such as magnet 1410 in FIG. 14B) may be selected to set the release strength and release characteristic function (for example, the side lobe portion of FIG. 4B). The release strength is typically a normal force that allows convenient removal of the magnetic structure. The release configuration is a position, typically in the side lobe portion of a characteristic function (e.g., FIG. 4B) that allows for release. The release strength may be a reduced attraction force, a repelling force, or zero. The release strength is typically less than the attachment strength, preferably less than half the attachment strength, and often substantially equal to a single component magnet of the magnet structure. Typically, a release configuration is characterized by having sufficient numbers magnets in the magnet structure opposing the polarity of the magnets in the complementary magnet structure so that the total attraction force is reduced to allow separation of the two magnet structures.

FIG. 15A-FIG. 15E depict the components and assembly of an exemplary covered structural assembly. FIG. 15A depicts a first elongated structural member 1502 having magnetic field emission structures 1504 on each of two ends and also having an alignment marking 1506 ("AA"), which could also be "aa". FIG. 15B also depicts a second elongated structural member 1508 having magnetic field emission structures 1510 on both ends of one side. The magnetic field emission structures 1504 and 1510 are configured such that they can be aligned to attach the first and second structural members 1502 and 1508. FIG. 15C further depicts a structural assembly 1512 including two of the first elongated structural members 1502 attached to two of the second elongated structural members 1508 whereby four magnetic field emission structure pairs 1504/1510 are aligned. FIG. 15D includes a cover panel 1514 having four magnetic field emission structures 1102a that are configured to align with four magnetic field emission structures 1102b to attach the cover panel 1514 to the structural assembly 1512 to produce a covered structural assembly 1516 shown in FIG. 15E.

Generally, the ability to easily turn correlated magnetic structures such that they disengage is a function of the torque easily created by a person's hand by the moment arm of the structure. The larger it is, the larger the moment arm, which acts as a lever. When two separate structures are physically connected via a structural member, as with the cover panel 1514, the ability to use torque is defeated because the moment arms are reversed. This reversal is magnified with each additional separate structure connected via structural members in an array. The force is proportional to the distance between respective structures, where torque is proportional to force times radius. As such, in one embodiment, the magnetic field emission structures of the covered structural assembly 1516 include a turning mechanism enabling one of the paired field emission structures to be rotated to be aligned or misaligned in order to assemble or disassemble the covered structural assembly. In another embodiment, the magnetic field emission structures do not include a turning mechanism and thus require full force for decoupling.

Figure 16B:
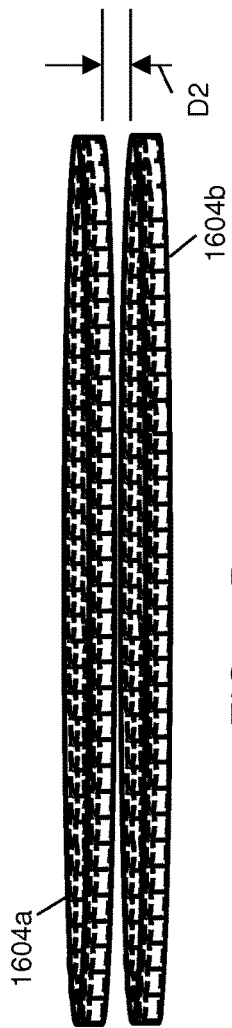
FIG. 16A and FIG. 16B illustrate relative force and distance characteristics of large magnets as compared with small magnets.
Figure 16A:
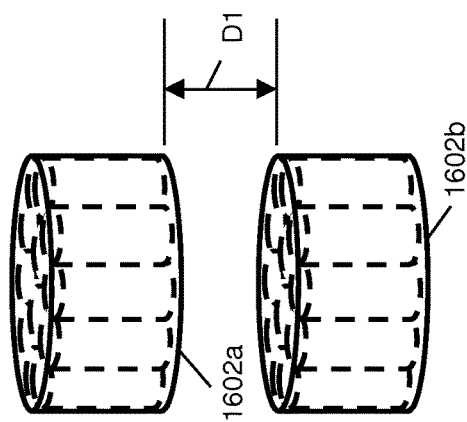

FIG. 16A and FIG. 16B illustrate relative force and distance characteristics of large magnets as compared with small magnets. FIG. 16A depicts an oblique projection of a first pair of magnetic field emission structures 1602a and 1602b. FIG. 16B depicts a second pair of magnetic field emission structures 1604a and 1604b each having internal magnets indicated by dashed lines.

As shown, the first pair of magnetic field emission structures 1602a and 1602b have a relatively small number of relatively large (and stronger) magnets when compared to the second pair of magnetic field emission structures 1604a and 1604b that have a relatively large number of relatively small (and weaker) magnets. For this figure, the peak spatial force for each of the two pairs of magnetic field emission structures 1602a/1602b and 1604a/1604b are the same. However, the distances D1 and D2 at which the magnetic fields of each of the pairs of magnetic field emission structures substantially interact depends on the strength of the magnets and the area over which they are distributed. As such, the much larger surface of the second magnetic field emission structure 1604a/1602b having much smaller magnets will not substantially attract until much closer than that of first magnetic field emission structure 1602a/1602b. In addition, it can be appreciated that, for a substantially random coded magnet structure, adjacent magnets will likely be of opposite polarity. Thus, when the distance D1 or D2 becomes significant relative to the magnet width or lateral spacing, the magnet begins to interact with magnets of the opposite polarity, further reducing the attracting force of the structure. This magnetic strength per unit area attribute as well as a magnetic spatial frequency (i.e., the number of magnetic reversals per unit area) can be used to design structures to meet safety requirements. For example, two magnetic field emission structures 1604a/1604b can be designed to not have unsafe attraction at a spacing equal to the width of a finger to prevent damage from clamping a finger between the magnets.

Figure 16C:
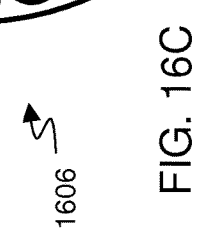
FIG. 16C depicts an exemplary magnetic field emission structure made up of a sparse array of large magnetic sources combined with a large number of smaller magnetic sources.

FIG. 16C depicts an exemplary magnetic field emission structure 1606 made up of a sparse array of large magnetic sources 1608 combined with a large number of smaller magnetic sources 1610 whereby alignment with a mirror image magnetic field emission structure would be provided by the large sources and a repel force would be provided by the smaller sources. Generally, as was the case with FIG. 16A, the larger (i.e., stronger) magnets achieve a significant attraction force (or repelling force) at a greater separation distance than smaller magnets. Because of this characteristic, combinational structures having magnetic sources of different strengths can be constructed that effectively have two (or more) spatial force functions corresponding to the different levels of magnetic strengths employed. As the magnetic field emission structures are brought closer together, the spatial force function of the strongest magnets is first to engage and the spatial force functions of the weaker magnets will engage when the magnetic field emission structures are moved close enough together at which the spatial force functions of the different sized magnets will combine. Referring back to FIG. 16B, the sparse array of stronger magnets 1608 is coded such that it can correlate with a mirror image sparse array of comparable magnets. However, the number and polarity of the smaller (i.e., weaker) magnets 1610 can be tailored such that when the two magnetic field emission structures are substantially close together, the magnetic force of the smaller magnets can overtake that of the larger magnets 1608 such that an equilibrium will be achieved at some distance between the two magnetic field emission structures. As such, alignment can be provided by the stronger magnets 1608 but contact of the two magnetic field emission structures can be prevented by the weaker magnets 1610. Similarly, the smaller, weaker magnets can be used to add extra attraction strength between the two magnetic field emission structures.

One skilled in the art may recognize based on the teachings herein that many different combinations of magnets having different strengths can be oriented in various ways to achieve desired spatial forces as a function of orientation and separation distance between two magnetic field emission structures. For example, a similar aligned attract—repel equilibrium might be achieved by grouping the sparse array of larger magnets 1608 tightly together in the center of magnetic field emission structure 1606. Moreover, combinations of correlated and non-correlated magnets can be used together, for example, the weaker magnets 1610 of FIG. 16B may all be uncorrelated magnets. Furthermore, one skilled in the art will recognize that such equilibrium enables frictionless traction (or hold) forces to be maintained and that such techniques could be employed for many of the exemplary drawings provided herein.

FIG. 17A-FIG. 17C illustrate several exemplary cylinder and sphere arrangements, some arrangements including coupling with linear track structures. FIG. 17A depicts two concentric cylinders for concentric rotational alignment. The two cylinders each have a field emission structure and the complementary field emission structure disposed around the cylinder surface and directed across an interface gap between the two cylinders. The cylinders will see a relative torque related to the slope of the force graph (for example FIG. 6B). Thus, one cylinder may be used to couple to and drive the other. Any number of code repeat segments may be provided. In particular, the code may be chosen to have only one non-repeated segment (sequence of magnets) and thus only one lock point. In a second embodiment, one of the cylinders may have permanent magnets forming the field emission structure and the second cylinder may utilize electromagnets. The electromagnets may be driven to position or move the code pattern around the cylinder and thus drive the first cylinder synchronous with the electromagnet code position. Again, the electromagnets may have any number of code segments around the cylinder down to including one segment, which is typically difficult to achieve with common synchronous or stepping type motors.

In a further alternative, cylinder 1706 may couple to a flat track 1708. Neglecting cylinder 1704 for the moment, cylinder 1706 may have a field emission structure on the outside and 1708 may have a complementary structure. Cylinder 1706 may then grip track 1708 and roll along track 1708 as a guide, or may drive or be driven by track 1708. Again the track or cylinder may utilize electromagnets to move the pattern to effect a moving drive. Since the hold-down force equals the traction force, these gears can be loosely connected and still give positive, non-slipping rotational accuracy. Correlated surfaces can be perfectly smooth and still provide positive, non-slip traction. As such, they can be made of any substance including hard plastic, glass, stainless steel or tungsten carbide. In contrast to legacy friction-based wheels the traction force provided by correlated surfaces is independent of the friction forces between the traction wheel and the traction surface and can be employed with low friction surfaces. Devices moving about based on magnetic traction can be operated independently of gravity for example in weightless conditions including space, underwater, vertical surfaces and even upside down.

FIG. 17B depicts an arrangement where a first magnetic field emission structure 1722 wraps around two cylinders 1702a and 1702b such that a much larger portion 1724 of the first magnetic field emission structure 1722 is in contact with a second magnetic field emission structure 1728 by comparison with the contact of 1702 with 1708 of FIG. 17A. As such, the larger portion 1724 directly corresponds to a larger gripping force.

If the surface in contact with the cylinder is in the form of a belt, then the traction force can be made very strong and still be non-slipping and independent of belt tension. It can replace, for example, toothed, flexible belts that are used when absolutely no slippage is permitted. In a more complex application the moving belt can also be the correlating surface for self-mobile devices that employ correlating wheels. If the conveyer belt is mounted on a movable vehicle in the manner of tank treads then it can provide formidable traction to a correlating surface or to any of the other rotating surfaces described here.

FIG. 17C illustrates two spheres, an outer sphere 1712 containing an inner sphere 1714. The outer sphere has a field emission structure 1716 and the inner sphere has a complementary field emission structure. Thus, the two spheres may be coupled and synchronized. One may utilize electromagnets to drive the other.

FIGS. 18A through 18H provide a few more examples of how magnetic field sources can be arranged to achieve desirable spatial force function characteristics. FIG. 18A depicts an exemplary magnetic field emission structure 1800 made up of rings about a circle. As shown, each ring comprises one magnet having an identified polarity. Similar structures could be produced using multiple magnets in each ring, where each of the magnets in a given ring is the same polarity as the other magnets in the ring, or each ring could comprise correlated magnets. Generally, circular rings, whether single layer or multiple layer, and whether with or without spaces between the rings, can be used for electrical, fluid, and gas connectors, and other purposes where they could be configured to have a basic property such that the larger the ring, the harder it would be to twist the connector apart. As shown in FIG. 18B, one skilled in the art would recognize that a hinge 1802 could be constructed using alternating magnetic field emission structures attached two objects where the magnetic field emission structures would be interleaved so that they would align (i.e., effectively lock) but they would still pivot about an axis extending though their innermost circles. FIG. 18C depicts an exemplary magnetic field emission structure 1804 having sources resembling spokes of a wheel. FIG. 18D depicts an exemplary magnetic field emission structure 1806 resembling a rotary encoder where instead of on and off encoding, the sources are encoded such that their polarities vary. The use of a magnetic field emission structure in accordance with the present invention instead of on and off encoding should eliminate alignment problems of conventional rotary encoders.

FIG. 18E depicts an exemplary magnetic field emission structure having sources arranged as curved spokes 1808. FIG. 18F depicts an exemplary magnetic field emission structure made up of hexagon-shaped sources 1810. FIG. 18G depicts an exemplary magnetic field emission structure made up of triangular sources 1812. FIG. 18H depicts an exemplary magnetic field emission structure made up of arrayed diamond-shaped sources 1814. Generally, the sources making up a magnetic field emission structure can have any shape and multiple shapes can be used within a given magnetic field emission structure. Under one arrangement, one or more magnetic field emission structures correspond to a Fractal code.

Figures 19A, 19B, 19C, 19D, 19E:
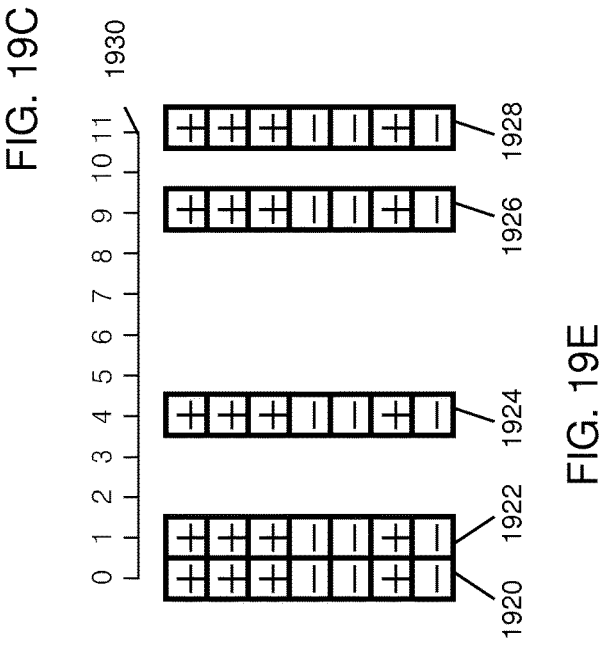

FIG. 19A through FIG. 19G depict exemplary embodiments of two dimensional coded magnet structures. Referring to FIG. 19A, the exemplary magnet structure 1900 comprises two Barker coded magnet substructures 214 and 1902. Substructure 214 comprises magnets with polarities determined by a Barker 7 length code arranged horizontally (as viewed on the page). Substructure 1902 comprises magnets with polarities also determined by a Barker 7 length code, but arranged vertically (as viewed on the page) and separated from substructure 214. In use, structure 1900 is combined with a complementary structure of identical shape and complementary magnet polarity. It can be appreciated that the complementary structure would have an attracting (or repelling, depending on design) force of 14 magnet pairs when aligned. Upon shifting the complementary structure to the right one magnet width substructure 214 and the complementary portion would look like FIG. 3F and have a force of zero. Substructure 902 would be shifted off to the side with no magnets overlapping producing a force of zero. Thus, the total from both substructures 214 and 902 would be zero. As the complementary structure is continued to be shifted to the right, substructure 214 would generate alternately zero and −1. The resulting graph would look like FIG. 4B except that the peak would be 14 instead of 7. It can be further appreciated that similar results would be obtained for vertical shifts due to the symmetry of the structure 1900. Diagonal movements where the complementary structure for 1902 overlaps 214 can only intersect one magnet at a time. Thus, the peak two dimensional nonaligned force is 1 or −1. Adding rotational freedom can possibly line up 1902 with 214 for a force of 7, so the code of FIG. 19A performs best where rotation is limited.

FIG. 19B depicts a two dimensional coded magnet structure comprising two codes with a common end point component. Referring to FIG. 19B, the structure 1903 comprises structure 214 based on a Barker 7 code running horizontally and structure 1904 comprising six magnets that together with magnet 1906 form a Barker 7 code running vertically. Magnet 1906 being common to both Barker sequences. Performance can be appreciated to be similar to FIG. 19A except the peak is 13.

FIG. 19C depicts a two dimensional coded magnet structure comprising two one dimensional magnet structures with a common interior point component. The structure of FIG. 19C comprises structure 214 based on a Barker 7 code running horizontally and structure 1908 comprising six magnets that together with magnet 1910 form a Barker 7 code running vertically. Magnet 1910 being common to both Barker sequences. Performance can be appreciated to be similar to FIG. 19A except the peak is 13. In the case of FIG. 19C diagonal shifts can overlap two magnet pairs.

FIG. 19D depicts an exemplary two dimensional coded magnet structure based on a one dimensional code. Referring to FIG. 214, a square is formed with structure 214 on one side, structure 1904 on another side. The remaining sides 1912 and 1914 are completed using negative Barker 7 codes with common corner components. When paired with an attraction complementary structure, the maximum attraction is 24 when aligned and 2 when not aligned for lateral translations in any direction including diagonal. Further, the maximum repelling force is −7 when shifted laterally by the width of the square. Because the maximum magnitude non-aligned force is opposite to the maximum attraction, many applications can easily tolerate the relatively high value (compared with most non-aligned values of 0, ±1, or ±2) without confusion. For example, an object being placed in position using the magnet structure would not stick to the −7 location. The object would only stick to the +1, +2 or +24 positions, very weakly to the +1 or +2 positions and very strongly to the +24 position, which could easily be distinguished by the installer.

FIG. 19E illustrates a two dimensional code derived by using multiple magnet substructures based on a single dimension code placed at positions spaced according to a Golomb Ruler code. Referring to FIG. 19E, five magnet substructures 1920-1928 with polarities determined according to a Barker 7 code are spaced according to an order 5 Golomb ruler code at positions 0, 1, 4, 9, and 11 on scale 1930. The total force in full alignment is 35 magnet pairs. The maximum non-aligned force is seven when one of the Barker substructures lines up with another Barker 7 substructure due to a horizontal shift of the complementary code. A vertical shift can result in −5 magnet pairs. Diagonal shifts are a maximum of −1.

The exemplary structures of FIG. 19A-FIG. 19E are shown using Barker 7 codes, the structures may instead use any one dimension code, for example, but not limited to random, pseudo random, LFSR, Kasami, Gold, or others and may mix codes for different legs. The codes may be run in either direction and may be used in the negative version (multiplied by −1.) Further, several structures are shown with legs at an angle of 90 degrees. Other angles may be used if desired, for example, but not limited to 60 degrees, 45 degrees, 30 degrees or other angles. Other configurations may be easily formed by one of ordinary skill in the art by replication, extension, substitution and other teachings herein.

FIG. 19F and FIG. 19G illustrate two dimensional magnet structures based on the two dimensional structures of FIG. 19A through FIG. 19E combined with Costas arrays. Referring to FIG. 19F, the structure of FIG. 19F is derived from the structure 1911 of FIG. 19C replicated 1911a-1911d and placed at code locations 1914 based on a coordinate grid 1916 in accordance with exemplary Costas array of FIG. 8A. The structure of FIG. 19G is derived using FIG. 19C and FIG. 8A as described for FIG. 19F except that the scale (relative size) is changed. The structure 1911 of FIG. 19C is enlarged to generate 1911e-1911h, which have been enlarged sufficiently to overlap at component 1918. Thus, the relative scale can be adjusted to trade the benefits of density (resulting in more force per area) with the potential for increased misaligned force.

Summary of Coded Magnet Patterns

Magnet patterns have been shown for basic linear and two dimensional arrays. Linear codes may be applied to generate linear magnet arrays arranged in straight lines, curves, circles, or zigzags. The magnetic axes may be axial or radial to the curved lines or surfaces. Two dimensional codes may be applied to generate two dimensional magnet arrays conforming to flat or curved surfaces, such as planes, spheres, cylinders, cones, and other shapes. In addition, compound shapes may be formed, such as stepped flats and more.

Magnet applications typically involve mechanical constraints such as rails, bearings, sleeves, pins, etc that force the assembly to operate along the dimensions of the code. Several known types of codes can be applied to linear, rotational, and two-dimensional configurations. Some configurations with lateral and rotational and vertical and tilt degrees of freedom may be satisfied with known codes tested and selected for the additional degrees of freedom. Computer search can also be used to find special codes.

Thus, the application of codes to generate arrangements of magnets with new interaction force profiles and new magnetic properties enables new devices with new capabilities, examples of which will now be disclosed.

Magnetically Attachable and Detachable Panel System and Method

FIG. 20A-FIG. 20G illustrate exemplary window covering embodiments in accordance with the present invention. FIG. 20A depicts an exemplary temporary window covering 2002, such as a window screen, which may be installed in the spring and removed in the fall. Alternatively the window covering may be a storm window with a panel of glass or plastic installed for the winter season. The invention may be adapted to a variety of panels that cover openings for a period of time and are then removed and stored for an alternate period of time.

The magnetic attachment structure in accordance with the present invention allows the panel to be installed with substantial holding force to maintain a secure hold on the panel while permitting removal of the panel with much less force than the holding force. Further, installation and removal each season may be achieved with no tools required whatsoever in some embodiments and simple tools in non-precision operations in other embodiments.

Referring to FIG. 20A, the exemplary window covering 2002 comprises a frame 2008 and a covering material 2006. The frame 2008 includes several magnetic attachment structures 2004a-2004h. Eight attachment structures are shown. Any number may be used. Alternatives include, but are not limited to: one at each corner, one at the top only, several distributed on one or more sides, a single long magnet structure extending along the entire length of one or more sides. Further, the magnets may be used in combination with other holders, such as channels or clamps. The upper right corner of FIG. 20A is seen in greater detail in FIG. 20B.

FIG. 20B illustrates greater detail of one corner of the window covering of FIG. 20A. FIG. 20B shows two magnetic structures 2004a and 2004b installed in the frame at the corner. The exemplary magnet structures 2004a and 2004b (depicted symbolically in FIG. 20A) comprise seven magnets of equal size and strength in a linear arrangement with polarities defined by an exemplary Barker 7 length sequence. The two structures run parallel to two respective sides of the frame at the corner. Thus, the two magnet structures are disposed at an angle of 90 degrees with respect to one another. A section through one side is shown in FIG. 20C.

FIG. 20C illustrates a cross section view through one side of the window cover panel of FIG. 20B. FIG. 20C shows the window cover magnet structure bonded to an optional backing that is bonded to the window cover frame. Alternative methods of attachment may be used. The window cover frame includes a channel for holding the window screen, which is typically held in the channel by a rubber bead. The window cover is held to the window frame by the attraction of a complementary magnet structure bonded to a backing, which is bonded to the window frame. The two magnet structures are not bonded to one another, but are held by magnetic attraction alone.

Referring to FIG. 20C and also FIG. 20B, there are 14 magnets in the frame at this corner (seven each in two structures 2004a and 2004b) and 14 magnets in the complementary structures bonded to the window. Using exemplary neodymium magnets ¼ inch diameter and 0.100 thick and having a 1 lb holding force between two such magnets, each corner in this arrangement will have a holding force of 14 lbs, which totals 56 lbs for the window frame, easily sufficient for many window screen installations. More or fewer magnets may be utilized, as desired.

The window cover panel is held in one unambiguous location as a result of the properties of the coded magnetic fields. As previously explained, when the magnet structures of the panel frame are aligned with the magnet structures of the window frame, the magnet structures have an attracting force of 14 magnet pairs. In accordance with the Barker 7 code, a shift of one magnet width right or left, or up or down, results in essentially zero magnetic attraction. One additional shift results in a repelling force of one magnet pair. Additional shifts are either zero or repelling. Thus, only the alignment position has a strong attraction force. The result is that although the magnet structures have a length of seven magnets in both the vertical and horizontal directions, the magnet structures behave as if the effective size of the total magnet structure is the size of a single magnet—providing precision positioning of the window cover while allowing the use of multiple magnets to multiply the holding power. Thus, the magnet structure has the strength and precision location much like a single magnet of strength 14 (with the added feature of actually repelling close misalignments). No permanent magnet material presently known to the inventors can provide fourteen times the strength of neodymium-iron-boron magnets. Alternatively, attempting to achieve strength 14 by stacking 14 magnets can be difficult because as the stack is formed by adding magnets to the stack, each additional magnet is farther and farther from the complementary stack and contributes less and less force.

Removal of the window panel can be achieved with much less force than the normal (perpendicular) holding force. To remove the panel, one may push the panel laterally at the top to move the panel at least one magnet width. The force required to push the panel is reduced by the coefficient of friction, which may be made small. Neodymium magnets typically have a nickel plating for corrosion protection. Nickel to nickel coefficient of friction is typically very small, 10% to 20%. The lateral magnetic attraction is also much less than the perpendicular force. Thus, a few pounds may move the top laterally, at which point the top may be lifted. The bottom may then be pushed laterally as well or alternatively; the top may simply be lifted further using the leverage of the frame to separate the bottom magnets.

In storage, the magnets may attract magnets from other panels, keeping panels of like size together for easier handling and storage.

Thus the panel is easily installed and held securely in a precisely located unique position corresponding to a single code component of the multiple code component magnet structure. The panel is just as easily removed, with no tools required for installation or removal.

FIG. 20D illustrates a cross section view showing an alternative embodiment of the panel of FIG. 20B. Referring to FIG. 20D, the magnets 2014 and 2016 are bonded to ferromagnetic channels 2028 and 2030 respectively. The use of a ferromagnetic base, which may be formed into a channel as shown, can help to reduce external magnetic fields and thus reduce problems of unwanted items sticking to the panel. A lateral section view is provided in FIG. 20E.

FIG. 20E shows a lateral cross section view of the magnet structure of FIG. 20D. Referring to FIG. 20E, the magnets 2014 of the frame are bonded to the upper channel 2028, which is bonded to the window cover frame 2008. The complementary magnet structure 2016 is bonded to the lower channel 2030, which is attached with screws 2022 to the window frame 2020. Screws or other fasteners may be used to assemble any of the parts of the magnet assembly, including the magnets. The upper channel 2028 and/or lower channel 2030 is optional.

FIG. 20F shows a cross section view of an exemplary alternative where the complementary magnet structure 2016 is embedded in the window frame 2020. The backing 2012 for the cover frame magnet structure 2014 is thickened for proper positioning of the cover frame magnet structure 2014.

FIG. 20G shows an exemplary alternative using an alternative magnet material for the magnet structures. Referring to FIG. 20G the window cover frame 2008 is tubular having a closed back side (side next to the window frame). The panel magnet structure 2024 and the complementary magnet structure are shown bonded to the panel frame back side and the window frame respectively. The magnet structures 2024 and 2026 are thin strips, which may be rubberized magnet material based on typically neodymium or ceramic ferrite magnetic material. Typical ceramic ferrite magnetic material is not as strong as typical neodymium material, thus a longer strip may be desired. For a very long strip, a long PN code, such as a LFSR code, Gold code, Kasami code, or other long code may be used. LFSR codes are available in 2N−1 lengths into the millions if desired. Where the magnet material is not used along the panel frame, window stripping material or other material may be used to seal the gap against insects or weather.

Figure 20I:
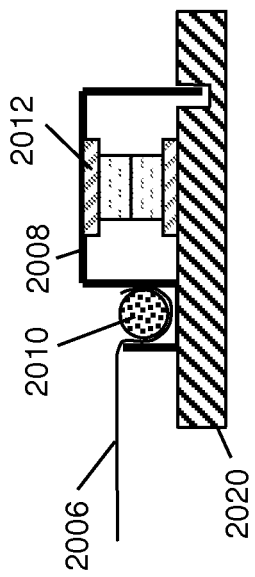
Figure 20H:
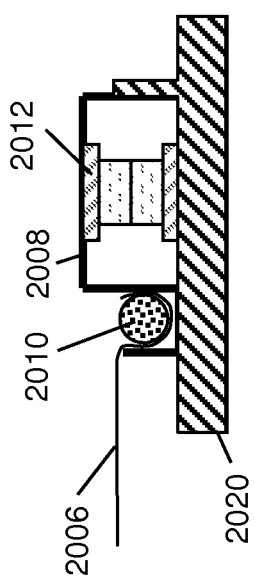

FIG. 20H and FIG. 20I illustrate an exemplary alternative cross section for one side of FIG. 20A. In some applications, it may be desirable to provide additional support in one lateral direction. For example a glass window covering may weigh enough to displace the panel and reduce the holding power. Thus, the addition of a mechanical support in the down direction will insure maximum magnetic holding power while allowing lateral displacement to remove the panel.

Referring to FIG. 20H, a ledge is provided to support the window covering panel at the bottom of the panel. The sides and top do not require the ledge. In particular, the sides may allow space for moving the panel laterally to cancel the magnetic attraction and remove the panel.

Referring to FIG. 20I, a notch is provided as an alternative to support a heavy panel. Further alternatives include but are not limited to a pin in a slot, or a channel and runner.

As a further feature of the invention, the codes may be varied to insure correct orientation and matching of panels to the installation. In one exemplary embodiment the panel of FIG. 20A may use positive parker codes (+, +, +, −, −, +, −) at the top positions 2004g, 2004h, 2004a, and 2004b, and use negative Barker codes (−, −, −, +, +, −, +) at the bottom positions 2004f, 2004e, 2004d, and 2004c. Each code would have a complementary code structure on the window frame. When installed correctly, the alignment force would be 56 magnet pairs as described above; however if one were to attempt to install the panel upside down, the maximum attraction would be 4 and the force at alignment would be a repelling force of 56 pounds. Thus, one could not find a strong lock-in position in the upside down position. Thus, by changing the code between two alternative orientations to use incompatible codes at the two orientations, installation in the correct orientation can be insured.

In a further feature, two panels may be matched to two different locations by using positive Barker codes at one location and negative Barker codes at a second location. Thus, only the correctly matched panel would install at each location.

FIG. 21A-FIG. 21C illustrate the use of a coded magnet structure to detachably attach a panel to a support structure. Referring to FIG. 21A, a panel 2102 is shown with four magnet structures 2104a-2104d, one at each corner. Each magnet structure attached to the panel 2102 is paired with a complementary magnet structure attached to a support structure 2118. The panel 2102 may be, for example, a storm panel to be attached to a house to cover a window during a hurricane. The storm panel needs to be set in place quickly and reliably and needs to hold considerable force. In another embodiment, the panel may be a white board placed on a wall in a conference room and removed when no longer needed. Further detail of one exemplary corner is shown in FIG. 21B.

FIG. 21B shows more detail of the corner and the releasable magnet structure 2104a. FIG. 21B shows the panel 2102 with the magnet structure placed back from the corner. The magnet structure and holder are shown as dashed lines because they are behind the panel in this view. An exemplary two dimensional magnet pattern like that of FIG. 11A is shown. Magnet structure 1102 of FIG. 11A is well suited for the releasable clasp application because the complementary structure may be rotated from an angle providing maximum attraction to another angle providing near zero attraction to effect release. A T-handle key is provided to rotate the magnets structure. Details of this operation may be better understood with reference to FIG. 21C.

FIG. 21C illustrates a cross section view of the releasable magnetic clasp of FIG. 21B. Referring to FIG. 21C, the panel 2102 is held to the support structure 2118 through the magnetic attraction of a coded magnet structure 2108 and its complementary magnet structure 2110. The coded magnet structure 2108 is bonded to a base plate 2116 that is affixed to the support structure 2118. The complementary magnet structure 2110 is bonded to a backing plate 2112 that may rotate within a housing 2114. The housing 2114 is affixed to the panel 2102. The T-handle 2106 operates a key wrench through an opening in the panel 2112 to couple to a keyed recess in the backing plate 2112 to allow the T-handle wrench 2106 to turn the complementary magnet structure 2110. The T-handle wrench 2106 may use a square, hex, spline, or other drive as desired.

In practice, the magnet structures are first installed in the panel and the supporting structure. Once installed, the complementary magnet structures may be rotated to a non attracting position and the panel may then be lifted into position. When near position, one of the magnet structures may be rotated to the holding position to grasp the panel on one corner. The remaining magnets may then be rotated to the holding position to fully secure the panel. To release the panel, the reverse procedure is used. Each corner magnet structure is rotated to release each corner in turn, and then the panel may be removed. With neodymium magnets a two inch diameter (5 cm) magnet pattern may generate 100 pounds (45 kg) holding force. Thus, a panel with four magnet patterns may potentially hold 400 pounds (180 kg).

In one embodiment, a pressure sensitive adhesive may be applied to the base plate for initial installation. The complementary magnet structures are installed in the panel. Next, the base plates are attached to the complementary magnet structures, allowing the magnetic force to hold the base plate. The adhesive is then exposed by pealing a protective covering. The complementary magnets are then rotated to the desired position with base plate magnets magnetically attached. Then the assembly is placed in position, pressing the base plate magnets to the support and attaching the base plate to the support by virtue of the adhesive. The complementary magnets may then be rotated to release position and the panel removed. At this point, if additional fasteners (e.g., screws) are desired for the base plate, the fasteners may be applied.

Adhesives that may be used include pressure sensitive tape adhesives and other quick adhesives for initial installation. Alternatively, permanent adhesives may be used including but not limited to cyanoacrylate, epoxy, and polyurethane based adhesives, in particular two part formulations typically made for rear view mirror installation in an automobile.

In a further embodiment, the housing 2114 may include a shell (not shown) and extend over a mating portion of the base plate 2116 to locate the coded magnet structure laterally relative to the complementary magnet structure and to provide additional lateral load bearing support. FIG. 13A-FIG. 13D illustrate exemplary concentric shell structures. Alternatively, a center pin and mating locating hole may be used for such location and load bearing capability.

FIG. 22A-FIG. 22H depict the use of different magnet patterns distributed over the panel for selective matching of a particular panel to a particular installation or to insure desired orientation of a panel. FIG. 22A shows an exemplary panel 2102 with four magnetic clasps 2104. In FIG. 22A-FIG. 22H a circle with a "+" indicates a selected code comprising a plurality of magnets of + and − orientation, and a circle with a "−" indicates the opposite polarity code of the selected code, i.e. all magnets reversed. Thus, the panel of FIG. 22A, with four identical codes, may be rotated upside down and will still attach. Likewise two panels of the same design will interchangeably operate with their respective support structures. The panel of FIG. 22A, however will not install in the support for the panel of FIG. 22B because the panel of 22A will find a strong repelling force at the support for panel 22B. The panel of 22C can only be installed right side up. If the panel of 22C is rotated upside down, there will be a strong repelling force when aligned and neutral when not aligned—no strong attraction. Similarly, the panel of FIG. 22D can be installed upside down, but not at 90 degrees rotation.

FIG. 22E-FIG. 22H illustrate a set of four panels with clasp arrangements that will not interchange. Each panel will install in its own matching support structure, but when each is aligned in the support structure of another, the forces will cancel or repel. For example, the panel of FIG. 22E placed in the support for panel 22F will find half of the magnets structures attracting, "+" with "+," and half of the magnet structures repelling "+" with "−." The same result is obtained for FIG. 22E with FIG. 22G or FIG. 22H. An additional four panels with inverted polarities from those in FIG. 22E-FIG. 22H would also reject the complementary structures of the panels of FIG. 22E-FIG. 22H. Note the similarity of the four polarities of the magnet structures of FIG. 22E-22H to the order four Walsh codes of Table 4. Thus, magnet structures from one panel to the next may be placed in different Walsh code patterns and different polarity patterns from the first panel to the next to insure each panel is installed in the correct location. Further, Walsh code patterns and inverted polarity patterns may be used to insure correct orientation of the panel by providing a polarity mismatch for magnet structure alignment at the incorrect panel orientation.

FIG. 23A-FIG. 23E illustrates the use of a rotational clasp with limited rotational motion in different sectors to provide selective operation among a set of panels. Referring to FIG. 23A, a clasp, such as in FIG. 21C, is schematically depicted with a magnet structure according to a rotational Barker 7 code 1402 as in FIG. 14A. Seven rotational positions are marked around the outside. A pie shaped section 2308 is shown that indicates a limited range 2310 of rotation allowed between the base magnet structure and the complementary magnet structure. The range of motion 2308 includes an alignment position, position 1 and a non-alignment position, position 2. The range of motion may be established by a mechanical stop such as a pin moving in a slot or other type of mechanical limit.

FIG. 23B-FIG. 23E depict four different panels having clasp devices set at four different angular ranges of motion to insure proper matching of panels with support structures. FIG. 23B shows a panel with four clasp devices installed with rotation as shown in FIG. 23A, i.e., the locked position at position 1. FIG. 23C shows a panel with four clasp devices rotated so that the locked position is at position 3 and unlocked position is at position 4. FIG. 23D shows a panel with four clasp devices rotated so that the locked position is at position 5, and the unlocked position is at position 6. FIG. 23E shows a panel with the four clasp devices at various different rotations. It can be appreciated that the panel of FIG. 23B placed on the support structure of the panel of FIG. 23C would not lock because both positions within the range of rotation clasp 2302a cover unlocked positions in the code of clasp 2302b. Thus panel 2102a cannot lock to support 2102b and likewise for support 2102c. Panel 2102a matches one of the clasps of 2102d, but may be found defective, depending on the application. Additional variations may be generated by adding panels with negative codes (all magnets reversed). Longer codes and concentric rings of codes, independently rotatable, can further extend and multiply the number of positions available.

FIG. 24A and FIG. 24B depict the use of multiple magnetic structures to enable attachment and detachment of two objects using another object functioning as a key. It is noted that attachment of the two objects does not necessarily require another object functioning as a key. Referring to FIG. 24A, a first magnetic field structure 2402a is coded using a first code. A two-sided attachment mechanism 2404 has a second magnetic field structure 2402b also coded using the first code such that it corresponds to the mirror image of the second magnetic field structure 2402a, and has a third magnetic field structure 2402c coded using a second code. The dual coded attachment mechanism 2404 is configured so that it can turn about axis 2405 allowing it to be moved so as to allow attachment to and detachment from the first magnetic field structure. The dual coded attachment mechanism 2404 may include a separation layer 2406 comprising a high permeability material that keeps the magnetic fields of the second magnetic field structure 2402b from interacting with the magnetic fields of the third magnetic field structure 2402c. The dual coded attachment mechanism 2404 also includes at least tab 2408 used to stop the movement of the dual coded attachment mechanism. A key mechanism 2410 includes a fourth magnetic field structure 2402d also coded using the second code such that it corresponds to the mirror image of the third magnetic field structure 2402c, and includes a gripping mechanism 2412 that would typically be turned by hand. The gripping mechanism 2412 could however be attached to or replaced by an automation device. As shown, the key mechanism 2410 can be attached to the dual coded attachment mechanism 2404 by aligning substantially the fourth magnetic field structure 2402d with the third magnetic field structure 2402c. The gripping mechanism can then be turned about axis 2405 to turn the dual coded attachment mechanism 2404 so as to align the second magnetic field structure 2402b with the first magnetic field structure 2402a, thereby attaching the dual coded attachment mechanism 2404 to the first magnetic field structure 2402a. Typically, the first magnetic field structure would be associated with a first object 2414, for example, a window frame, and the dual coded attachment mechanism 2404 would be associated with a second object 2416, for example, a storm shutter, as shown in FIG. 24B. For the example depicted in FIG. 24B, the dual coded attachment mechanism 2404 is shown residing inside the second object 2416 thereby allowing the key mechanism to be used to attach and/or detach the two objects 2414, 2416 and then be removed and stored separately. Once the two objects are attached, the means for attachment would not need to be visible to someone looking at the second object.

FIG. 24C and FIG. 24D depict the general concept of using a tab 2408 so as to limit the movement of the dual coded attachment mechanism 2404 between two travel limiters 2420a and 2420b. Dual coded attachment mechanism is shown having a hole through its middle that enables is to turn about the axis 2405. Referring to FIG. 24C, the two travel limiters 2420a and 2420b might be any fixed object placed at desired locations that limit the turning radius of the dual coded attachment mechanism 2404. FIG. 24D depicts an alternative approach where object 2416 includes a travel channel 2422 that is configured to enable the dual coded attachment mechanism 2404 to turn about the axis 2405 using hole 2418 and has travel limiters 2420a and 2420b that limit the turning radius. One skilled in the art would recognize that the tab 2408 and at least one travel limiter is provided to simplify the detachment of key mechanism 2412 from the dual coded attachment mechanism 2404.

FIG. 24E depicts exemplary assembly of the second object 2416 which is separated into a top part 2416a and a bottom part 2416b, with each part having a travel channel 2422a (or 2422b) and a spindle portion 2424a (or 2424b). The dual coded attachment mechanism 2404 is placed over the spindle portion 2422b of the bottom part 2416b and then the spindle portion 2424a of the top part 2416 is placed into the spindle portion 2422b of the bottom part 2416b and the top and bottom parts 2416a, 2416b are then attached in some manner, for example, glued together. As such, once assembled, the dual coded attachment mechanism is effectively hidden inside object 2416. One skilled in the art would recognize that many different designs and assembly approaches could be used to achieve the same result.

In one embodiment, the attachment device may be fitted with a sensor, e.g., a switch or magnetic sensor 2426 to indicate whether the panel is attached or separated. The sensor may be connected to a security alarm 2428 to indicate tampering or intrusion or other unsafe condition. An intrusion condition may arise from someone prying the panel off, or another unsafe condition may arise from someone forgetting to replace the panel after access. The sensor may operate when the top part 2416a and bottom part 2416b are separated by a predetermined amount, e.g., 2 mm or 1 cm, essentially enough to operate the switch. In a further alternative, the switch may be configured to disregard normal separations and report only forced separations. For this, a second switch may be provided to indicate the rotation position of the top part 2416a. If there is a separation without rotating the top part, an intrusion condition would be reported. The separation switch and rotation switch may be connected together for combined reporting or may be separately wired for separate reporting. The switches may be connected to a controller which may operate a local alarm or call the owner or authorities using a silent alarm in accordance with the appropriate algorithm for the location.

In one embodiment, the sensor may be a hall effect sensor or other magnetic sensor. The magnetic sensor may be placed behind one of the magnets of magnet structure 2402a or in a position not occupied by a magnet of 2402a but near a magnet of 2402b. The magnetic sensor would detect the presence of a complementary magnet in 2402b by measuring an increase in field from the field of the proximal magnet of 2402a and thus be able to also detect loss of magnet structure 2402b by a decrease of magnetic field. The magnetic sensor would also be able to detect rotation of 2402b to a release configuration by measuring a double decrease in magnetic field strength due to covering the proximal magnet of 2402a with an opposite polarity magnet from magnet structure 2402b. Upon removing the panel from the release configuration, the magnetic field strength would then increase to the nominal level. Since about half of the magnets are paired with same polarity and half with opposite polarity magnets when in the release configuration, the sensor position would preferably be selected to be a position seeing a reversal in polarity of magnet structure 2402b.

In operation using mechanical switches, when the key mechanism 2412 is used to rotate the dual coded attachment mechanism 2404, the stop tab 2408 operates the rotation switch indicating proper entry so that when the panel is separated and the separation switch is operated, no alarm is sounded In an intrusion situation, the separation switch may be operated without operating the rotation switch. The operation of the rotation switch may be latched in the controller because in some embodiments, separation may release the rotation switch. For switch operation, the stop tab 2408 or another switch operating tab may extend from the dual coded magnet assembly to the base where the first coded magnet assembly 2402a resides so that the switch may be located with the base rather than with the panel.

In operation using the magnetic sensor, a normal panel removal will first be observed by a double decrease (for example 20%) in magnetic field strength due to the rotation of the magnet structure 2404b followed by a single increase (for example 10%) due to the removal of the panel. An intruder or other direct removal of the panel would be observed by a single decrease (for example 10%) in the measured magnetic field strength. Thus, a single decrease of the expected amount, especially without a subsequent increase would be detected as an alarm condition.

Alternatively, a magnetic sensor may be placed in an empty position (not having a magnet) in the pattern of 2402a. Upon rotation of 2402b to the release position, the previously empty position would see the full force of a magnet of 2402b to detect rotation.

Panel Applications

Coded magnet structures may find beneficial use for a wide range of closures in typical buildings. The dual coded magnet structures are well suited for temporary closures, such as storm panels, storm doors, storm windows or coverings of a seasonal nature, such as to close basements, crawl spaces or attics for winter or summer.

The availability of the dual coded magnet structure attachment device may enable entirely new architectural functionality, such as temporary wall panels that may be assembled to partition a space for a party, convention, office use or other use and then converted back by moving the panel.

The coded magnet structure may be used for otherwise conventional doors, windows, or cabinets, providing new operational features and characteristics. For example, a door may be attached by using coded magnet structures on each hinge and on the latch. The door may be then operated by the latch as a normal door or may be removed entirely. In another embodiment, the door may be affixed by using coded magnet structures on hinges on both sides and may be opened from either side or removed entirely. Such dual hinged panel may be used as a baby gate, kitchen cabinet or other closure.

In one embodiment, the panel may be supplied as part of a finished item, such as a kitchen cabinet, refrigerator, baby gate, standard size door or other assembled item. Alternatively, the magnet structure and attachment assembly may be supplied to be installed by the end user. The magnet structure and attachment assembly may be packaged with glue, adhesive, screws, clips, templates, and other items facilitating the installation as a kit. Each magnet structure may be supplied with a custom keyed complementary magnet structure to form a working kit. In some embodiments, a single coded magnet structure and base assembly may be sold separately from the complementary magnet structure to allow many panels to be interchanged on the same mounting. For embodiments using multiple coded magnet structures having different codes to ensure proper matching and alignment of multiple panels in a set, the magnet structures may be sold in sets or as individual items marked with a designation for the built in code so that matching complementary structures may be correctly ordered and installed for each panel.

In further variations, typically for specialized applications, panel magnets may be used in applications where the release mechanism involves demagnetizing the magnets (kill mechanisms) such as resistance heaters that heat the magnets to destroy the magnetic field, or by using demagnetizing coils. Further, one or more magnets may be electromagnets or may be a combination permanent electromagnet that is magnetized and/or demagnetized by a pulse defining the strength and polarity of the permanent magnet as needed.

Generally, with respect to the drawings used herein, it should be understood that the drawings are exemplary in the sense of representing one of many possible variations. The field emission structures could have many different configurations and could be many different types including those comprising permanent magnets, electromagnets, and/or electro-permanent magnets where the size, shape, source strengths, coding, and other characteristics can be tailored to meet different correlated magnetic application requirements. Field emission structures can also be detached by applying a pull force, lateral shear force, rotational force, or any other force sufficient to overcome the attractive peak spatial force between the substantially aligned first and second field emission structures.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

The invention claimed is:

1. A method for assembling a magnetic attachment mechanism, said method comprising: affixing to a holding structure one or more magnetic structures, each magnetic structure comprising a plurality of magnetic field sources on one or more pieces of permanent magnet material, each magnetic structure having three or more magnetic regions, each magnetic regions creating a polarity pattern having a respective autocorrelation function characterized by a plurality of alignment positions of each magnetic structure, said plurality of alignment positions comprising a peak force alignment position and a plurality of off-peak force alignment positions, wherein a peak force is produced at the peak force alignment position, and wherein a plurality of off-peak forces are produced at said plurality of off-peak alignment positions, and wherein one or more of said plurality of off-peak forces are the result of cancellation of an attract force by a repel force.

2. The method of claim 1, wherein the magnitude of said peak force is more than twice the magnitude of any off-peak force.

3. The method of claim 1, wherein the magnitude of said peak attractive force is less than or equal to twice the magnitude of any off-peak attractive force.

4. The method of claim 1, wherein the peak force comprises a peak attract force and said plurality of off-peak forces comprise a plurality of off-peak attract forces.

5. The method of claim 1, wherein said peak force comprises a peak repel force and said plurality of off-peak forces comprise a plurality of off-peak repel forces.

6. The method of claim 1, wherein the peak force comprises a peak attract force and said plurality of off-peak forces comprise a plurality of off-peak repel forces.

7. The method of claim 1, wherein the peak force comprises a peak repel force and said plurality of off-peak forces comprise a plurality of off-peak attract forces.

8. The method of claim 1, further comprising a non-magnetic region between two magnetic regions.

9. The method of claim 8, wherein said non-magnetic region comprises permanent magnetic material that is not magnetized.

10. The method of claim 8, wherein said two magnetic regions comprise the same polarity.

11. The method of claim 8, wherein said two magnetic regions comprise opposite polarities.

12. A method for assembling a magnetic attachment mechanism, said method comprising: assembling one or more magnetic structures, each magnetic structure comprising one or more pieces of permanent magnet material having three or more magnetic regions, each magnetic structure having three or more magnetic regions creating a polarity pattern having a respective autocorrelation function characterized by a plurality of alignment positions of each magnetic structure, said plurality of alignment positions comprising a peak force alignment position and a plurality of off-peak force alignment positions, wherein a peak force is produced at the peak force alignment position, and wherein a plurality of off-peak forces are produced at said plurality of off-peak alignment positions, and wherein one or more of said plurality of off-peak forces are the result of cancellation of an attract force by a repel force.

13. The method of claim 12, wherein the magnitude of said peak force is more than twice the magnitude of any off-peak force.

14. The method of claim 12, wherein the magnitude of said peak attractive force is less than or equal to twice the magnitude of any off-peak attractive force.

15. The method of claim 12, further comprising a non-magnetic region between two magnetic regions.

16. The method of claim 12, wherein said pieces of permanent magnet material are affixed to a holding structure.

17. The method of claim 16, further comprising, applying glue to said pieces of permanent magnet material or to said holding structure prior to affix said pieces of permanent magnet material to said holding structure.

18. The method of claim 16, wherein said holding structure comprises ferromagnetic material.

19. The method of claim 16, wherein said autocorrelation function comprises a barker code autocorrelation function.

20. A method for assembling a magnetic attachment mechanism, said method comprising: affixing to a holding structure one or more magnetic structures, each magnetic structure comprising one or more pieces of permanent magnet material, wherein each magnetic structure having three or more magnetic regions, each of said magnetic regions comprising a polarity, said one or more magnetic structures creating a polarity pattern having a respective autocorrelation function characterized by a plurality of alignment positions of each magnetic structure, said plurality of alignment positions comprising a peak force alignment position and a plurality of off-peak force alignment positions, wherein a peak force is produced at the peak force alignment position, and wherein a plurality of off-peak forces are produced at said plurality of off-peak alignment positions, and wherein one or more of said plurality of off-peak forces are the result of cancellation of an attract force by a repel force.

* * * * *